United States Patent
Satoh et al.

(10) Patent No.: US 9,291,812 B2
(45) Date of Patent: Mar. 22, 2016

(54) LIGHT-MODULATING PANEL AND LIGHT MODULATOR

(71) Applicant: Sharp Kabushiki Kaisha, Osaka (JP)

(72) Inventors: Eiji Satoh, Osaka (JP); Kohzoh Nakamura, Osaka (JP); Hisashi Watanabe, Osaka (JP); Takahiro Nakahara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 59 days.

(21) Appl. No.: 14/386,201

(22) PCT Filed: Mar. 19, 2013

(86) PCT No.: PCT/JP2013/057857
§ 371 (c)(1),
(2) Date: Sep. 18, 2014

(87) PCT Pub. No.: WO2013/141248
PCT Pub. Date: Sep. 26, 2013

(65) Prior Publication Data
US 2015/0043053 A1      Feb. 12, 2015

(30) Foreign Application Priority Data

Mar. 19, 2012  (JP) ................................. 2012-062561

(51) Int. Cl.
*G02B 26/00* (2006.01)
*G02F 1/1343* (2006.01)
(Continued)

(52) U.S. Cl.
CPC ............ *G02B 26/007* (2013.01); *G02B 26/023* (2013.01); *G02F 1/0316* (2013.01);
(Continued)

(58) Field of Classification Search
CPC .... G02B 26/007; G02B 26/02; G02B 26/023;
G02B 26/026; G02B 26/0841; G02F 1/0105;
G02F 1/0316; G02F 1/13306; G02F 1/1335;
G02F 1/1337; G02F 1/134363; G02F 1/137;
G02F 1/167; G02F 1/29; B03C 5/005
USPC ......... 359/290, 291, 295, 296, 245, 316, 320;
349/15, 33, 43, 44, 47, 123, 141;
216/59, 61
See application file for complete search history.

(56) References Cited

U.S. PATENT DOCUMENTS 4,046,456 A * 9/1977 Bonne ..................... G02F 1/172
310/357
4,707,244 A * 11/1987 Harman, III ......... G01N 27/423
204/430
(Continued)

FOREIGN PATENT DOCUMENTS

JP          S49-79194 A     7/1974
JP          7-13206 A       1/1995
(Continued)

*Primary Examiner* — Loha Ben
(74) *Attorney, Agent, or Firm* — Chen Yoshimura LLP

(57) ABSTRACT

This light modulation panel is provided with: a first substrate having comb electrodes disposed on a uniformly planar electrode with an insulating layer therebetween; a second substrate disposed opposite to the first substrate and provided with a uniformly planar electrode; a light modulation layer obtained by dispersing anisometric members in a medium; and formed between the substrates; and a circuit for changing the direction in which an electric field is applied, which changes the direction of an electric field applied to the light modulation layer.

19 Claims, 42 Drawing Sheets

(51) Int. Cl.
   *G02B 26/02* (2006.01)
   *G02F 1/03* (2006.01)
   *G02F 1/17* (2006.01)
   *G02F 1/155* (2006.01)
   *G02F 1/163* (2006.01)
   G02F 1/01 (2006.01)
   G02F 1/1337 (2006.01)
   G02F 1/137 (2006.01)

(52) U.S. Cl.
   CPC ............... *G02F 1/155* (2013.01); *G02F 1/163* (2013.01); *G02F 1/172* (2013.01); *G02F 1/0105* (2013.01); *G02F 1/137* (2013.01); *G02F 1/1337* (2013.01); *G02F 1/134363* (2013.01); *G02F 2001/134381* (2013.01)

(56) References Cited

U.S. PATENT DOCUMENTS

| | | | |
|---|---|---|---|
| 4,753,517 A * | 6/1988 | Samek | G01D 15/14 359/254 |
| 7,639,332 B2 * | 12/2009 | Miyachi | G02F 1/137 349/129 |
| 7,843,541 B2 * | 11/2010 | Haruyama | G02F 1/133555 349/114 |
| 8,259,269 B2 * | 9/2012 | Itou | G02F 1/134363 349/128 |
| 8,493,532 B2 * | 7/2013 | Sonoda | G02F 1/133788 349/122 |
| 8,692,966 B2 * | 4/2014 | Oka | C09K 19/0258 349/138 |
| 8,698,988 B2 * | 4/2014 | Matsushima | G02F 1/1323 349/106 |
| 2002/0054251 A1 | 5/2002 | Maruyama et al. | |
| 2007/0070489 A1 | 3/2007 | Verhaegh et al. | |

FOREIGN PATENT DOCUMENTS

| | | |
|---|---|---|
| JP | 2000-171783 A | 6/2000 |
| JP | 2003-107438 A | 4/2003 |
| JP | 2005-156811 A | 6/2005 |
| JP | 2007-506151 A | 3/2007 |
| WO | 2005/029171 A1 | 3/2005 |

* cited by examiner (a)

(b)

(a)

(b)

(a)

(b)

(a)

(b)

(c)

(a)

(b)

(a)

(b)

(a)

(b)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a) Silver (Metal) Horizontal Orientation (b) Silver (Metal) Vertical Orientation (c) Silica + Silver (Dielectric-Coated Metal) Horizontal Orientation (d) Silica + Silver (Dielectric-Coated Metal) Vertical Orientation (a)

Lines of Electric Force (b)

(a)

(b)

(a)

(b)

(a)

(b)

(a)

(b)

(a)

(b)

(a)

(b)

(a)

(b)

(a)

(b)

(a)

(b)

(c)

LIGHT-MODULATING PANEL AND LIGHT MODULATOR

TECHNICAL FIELD

The present invention relates to a light modulation panel and a light modulation device.

BACKGROUND ART

A light modulation device that controls the scattering, reflection, and absorption of incident light allows for high contrast and high light-usage rate.

As a light modulation device that changes transmittance of light by applying an electric field, a liquid crystal panel having a liquid crystal layer as a light modulation layer sandwiched between a pair of substrates is well known. Liquid crystal panels, due to their very high contrast, are suitable as display panels.

However, some of the light entering the liquid crystal panel from a backlight is absorbed or reflected as it passes through the liquid crystal panel. In particular, in order to control the transmission of light, a liquid crystal panel is provided with polarizing plates, which allow through only polarization components of specific directions, respectively on surfaces of the pair of substrates opposite to the surfaces facing the liquid crystal layer. Thus, only a portion of the light that enters the liquid crystal panel passes through the polarizing plates, with a large portion of the light being absorbed by the polarizing plates. Thus, the loss of light due to absorption by the polarizing plates is a major factor in the decrease of light usage rate.

In recent years, light modulation devices that differ from liquid crystal panels and that do not require polarizing plates are being developed.

FIGS. 27(a) and 27(b) are cross-sectional views for describing the operational principles of a light modulation device disclosed in Patent Document 1; FIG. 27(a) is a cross-sectional view of a state in which light is absorbed, and FIG. 27(b) is a cross-sectional view of a state in which light is reflected.

As shown in FIGS. 27(a) and 27(b), the light modulation device disclosed in Patent Document 1 includes a light modulation cell 301 that has a pair of substrates 311 and 321, and a dielectric liquid 330 that is introduced between the pair of substrates 311 and 321 and that has plate-shaped particles 331 having a metallic color dispersed therein. Among the pair of substrates 311 and 321, one substrate 311 is provided with a uniformly planar electrode 312 that covers at least the entire pattern to be displayed. The other substrate 321 is provided with comb-shaped segment electrodes 322.

In the state shown in FIG. 27(a), the pattern electrode 312 is set at zero potential by a switch SW11. By connecting switches SW21, SW22, SW31, and SW32 connected to the segment electrodes 322 to the positive side of power sources E1 and E2 in this state, a voltage is applied from the power sources E1 and E2 to the segment electrodes 322.

An electric field in a direction perpendicular to the substrate 321 is formed, and the plate-shaped particles 331 are oriented in the direction perpendicular to the substrate 321. If light is radiated in this state to where the segment electrodes 322 are disposed, the incident light is mostly absorbed by the plate-shaped particles, and this results in black display.

On the other hand, as shown in FIG. 27(b), if the switch SW11 is open, and between segment electrodes 322 connected to the switches SW21 and SW22 corresponding to desired segments, the switch SW21 is connected to the positive side of the power source E1 and the switch SW22 is connected to the negative side of the power source E1, then an electric field parallel to the substrate 321 is formed between the segment electrodes 322 connected between the switches SW21 and SW22, and the plate-shaped particles 331 are parallel to the substrate 321.

As a result, the light that has entered where the segment electrodes 322 connected to the switches SW21 and SW22 are disposed are reflected by the plate-shaped particles 331, and thus, in areas where the segment electrodes 322 are connected to the switches SW21 and SW22, colors specific to the plate-shaped particles 331 are displayed.

FIGS. 28(a) and 28(b) are drawings for describing the operational principles of a light modulation device disclosed in Patent Document 2; FIG. 28(a) is a cross-sectional view of a state in which light is transmitted, and FIG. 28(b) is a cross-sectional view of a state in which light is reflected.

As shown in FIGS. 28(a) and 28(b), the light modulation device disclosed in Patent Document 2 includes: a plate 411 made of an insulating transparent material provided with an electrode 412; a substrate 421 provided with an electrode 422, the plate 411 and substrate 421 facing each other; and rib-shaped spacers 431 and 432 that maintain a constant gap between the plate 411 and the substrate 421.

The light modulation device disclosed in Patent Document 2 includes at least one compartment 401 for storing a particle suspension 442 in which a plurality of anisometric reflection particles 441 are suspended in an insulating fluid, and each compartment 401 is defined by the plate 411, the substrate 421, and the spacers 431 and 432.

The side faces of the respective spacers 431 and 432 are provided with electrodes 451 and 452, and the respective electrodes 451 and 452 are separated from the electrodes 412 and 422 provided on the plate 411 and the substrate 421 by passivation layers 461 and 462.

According to Patent Document 2, by setting the switch 471 connecting the electrode 412 to the electrode 422 in the closed state, setting the switch 472 connecting the spacer 431 and the spacer 432 in the open state, and applying a first voltage V1 greater than a saturation potential of the particle suspension 442, an electric field perpendicular to the plate 411 and the substrate 421 is formed. As a result, the anisometric reflective particles 441 in the compartment 401 are oriented in the direction perpendicular to the plate 411 and the substrate 421, and the particle suspension 442 becomes light-transmissive.

On the other hand, by setting the switch 471 that connects the electrode 412 to the electrode 422 in the open state and setting the switch 472 connecting the spacer 431 and the spacer 432 in the closed state, and applying a second voltage V2 greater than the saturation potential of the particle suspension 442, an electric field parallel to the plate 411 and the substrate 421 is applied. As a result, the anisometric reflective particles 441 in the compartment 401 are oriented in the direction parallel to the plate 411 and the substrate 421, and the particle suspension 442 becomes light-reflective.

In such a light modulation device, it is possible to perform display with excellent contrast by the reflection and absorption of light, and no polarizing plates are used, and thus, the light usage rate can be increased compared to a liquid crystal panel.

RELATED ART DOCUMENTS

Patent Documents

Patent Document 1: Japanese Patent Application Laid-Open Publication, "Japanese Patent Application Laid-Open Publication No. S49-79194 (Published on Jul. 31, 1974)"

Patent Document 2: Japanese Patent Application Laid-Open Publication, "Japanese Patent Application Laid-Open Publication No. 2007-506151 (Published on Mar. 15, 2007)"

SUMMARY OF THE INVENTION

Problems to be Solved by the Invention

However, when a voltage is applied between the uniformly planar electrode 312 and the comb-shaped segment electrodes 322 as shown in Patent Document 1, then an uneven electrical field is formed in the light modulation cell 301.

Thus, the plate-shaped particles 331 concentrate in areas where the electric field is weak or areas where the electric field is strong, depending on the material. Below, a specific example will be shown with reference to FIG. 29.

FIG. 29 is a drawing showing lines of electric force for when a voltage is applied between the pattern electrode 312 and the segment electrodes 322.

The diagonal line portions shown in FIG. 29 are areas where the electric field is weak. In the electric field distribution shown in FIG. 29, if the permittivity of the plate-shaped particles 331 is set to less than the permittivity of the dielectric liquid 330, which is a medium, then the plate-shaped particles 331 gather in the areas where the electric field is weak due to dielectrophoretic force.

As described above, in Patent Document 2, the electrodes 451 and 452 on the side faces of the rib-shaped spacers 431 and 432 apply a horizontal electric field to the particle suspension 442, resulting in the anisometric reflective particles 441 returning to a state in which they are parallel to the plate 411 and the substrate 421, and spacers 431 and 432 of a very complex structure are necessary in order to provide the electrodes 451 and 452 for applying the horizontal electric field. Also, the distance between the electrodes is long, and thus, the voltage to be applied is very high.

Generally, spacers have a simple structure such as a spacer in which photospacers or beads are formed by patterning a resin by photolithography, as is well-known.

However, in Patent Document 2, the side faces of the spacers 431 and 432 need to be coated by ITO (indium tin oxide) and patterned, and a passivation layer 461 and 462 needs to be formed and patterned so that the ITO does not form a short circuit with the electrodes 412 and 422 on the substrate 421. Also, although not explicitly stated, there is a need to connect the electrodes 451 and 452 to lead-out electrodes and TFTs (thin film transistors).

The horizontal electric field generated between the electrodes 451 and 452 provided on the side faces of the spacers 431 and 432 cannot control the orientation of the plate-shaped particles 331 in three dimensions.

If a horizontal electric field is applied to the plate-shaped particles 331, the long axis of each plate-shaped particle rotates so as to coincide with the lines of electric force. However, in three dimensions, as shown in FIG. 30, the orientation thereof at this time is not necessarily restricted such that the plate surface (flake surface) of the plate-shaped particle 331 is parallel to the plate 411 and the substrate 421.

The present invention takes these problems into account, and an object thereof is to provide a light modulation panel that can attain a high rate of light usage with a high contrast and a simple configuration.

Means for Solving the Problems

In order to solve the above-mentioned problems, a light modulation panel according to one aspect of the present invention is a light modulation panel, including: a pair of substrates disposed opposite to each other; and a light modulation layer sandwiched between the pair of substrates, wherein the light modulation layer includes a medium and a plurality of anisometric members such that an area of the anisometric members projected through the anisometric members in a direction normal to the substrates changes, by rotation or deformation of the anisometric members, in response to a direction of an electric field, wherein each of the pair of substrates includes a uniformly planar electrode, wherein at least one of the pair of substrates is provided with at least one comb electrode over the uniformly planar electrode across an insulating layer, and wherein the light modulation panel further includes a circuit that changes the direction of the electric field applied to the light modulation layer.

Also, a light modulation device of one aspect of the present invention includes the light modulation panel.

Effects of the Invention

The light modulation panel and the light modulation device of one aspect of the present invention includes evenly formed uniformly planar electrodes that face each other respectively on the pair of substrates facing each other, and thus, by applying a voltage between these uniformly planar electrodes, it is possible to attain an even vertical electric field, and at least one comb electrode is provided on at least one of the pair of substrates, and thus, as a result of the comb electrode, it is possible to form a horizontal electric field in a direction parallel to the pair of substrates.

Therefore, according to the light modulation panel and the light modulation device, it is possible to provide a light modulation panel and a light modulation device that has a high rate of light usage with a high contrast and a simple configuration without the need for polarizing plates.

BRIEF DESCRIPTION OF THE DRAWINGS

FIGS. 13(a) and 13(b) are cross-sectional views of main portions of the display panel showing states of light progression when the display panel of FIGS. 7(a) and 7(b) are made see-through.

DETAILED DESCRIPTION OF EMBODIMENTS

Figure 1:
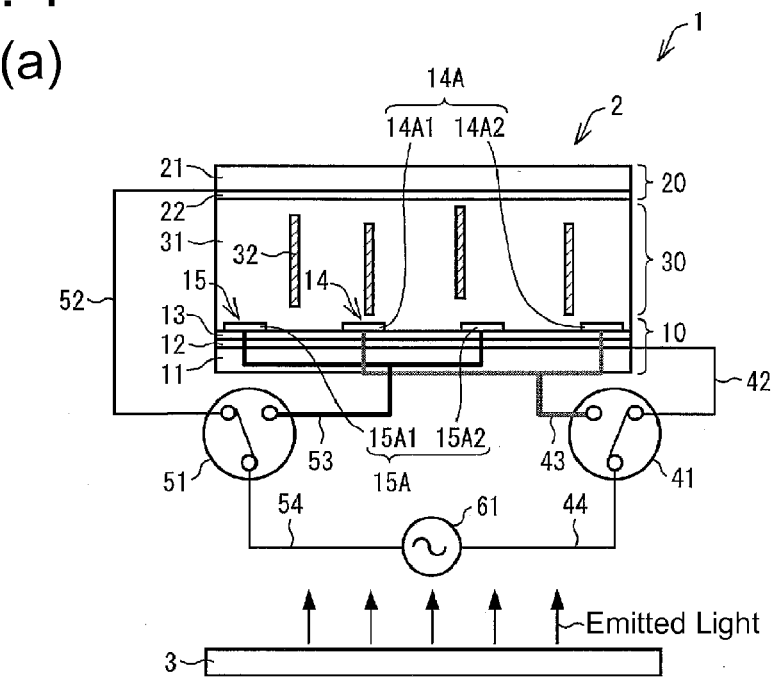
FIGS. 1(a) and 1(b) are cross-sectional views that show a schematic configuration of a display device of Embodiment 1.
Figure 1:
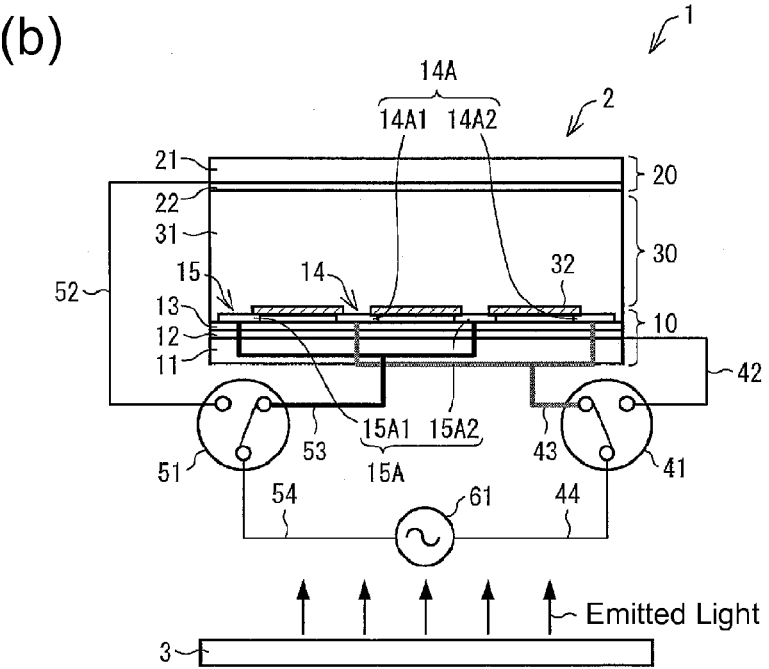

Below, embodiments of the present invention will be explained in detail.

21 Embodiment 1>

An embodiment of the present invention is described below with reference to FIGS. 1(a) to 6(b).

In the present embodiment, a display device is described as an example of the light modulation device below, but the present embodiment is not limited thereto.

<Schematic Configuration of Display Device>

FIGS. 1(a) and 1(b) are cross-sectional views showing a schematic configuration of the display device of the present embodiment; FIG. 1(a) shows a light-transmissive state and FIG. 1(b) shows a light-reflective state.

The display device 1 of the present embodiment, as shown in FIGS. 1(a) and 1(b) includes a display panel 2, a backlight 3 that radiates light to the display panel 2, and driver circuits that are not shown, and the display device 1 is a transmissive display device that performs display by having the light emitted from the backlight 3 pass through the display panel 2.

The configuration of the backlight 3 is the same as in conventional configurations. Therefore, descriptions of the configuration of the backlight 3 will be omitted. As the backlight 3, a backlight of an edge-lit type, a direct-lit planar light source device, or the like can be appropriately used, for example. As the light source of the backlight 3, a fluorescent lamp, an LED, or the like can be appropriately used.

The display panel 2 includes a pair of substrates 10 and 20 disposed opposite to each other, and a light modulation layer 30 disposed between the pair of substrates 10 and 20, and additionally includes relay circuits 41 and 51 (switching circuits) that switch the direction of the electric field to be applied to the light modulation layer 30 by selecting which electrodes apply voltage, and a power source circuit 61.

The display panel 2 has a plurality of pixels arranged in a matrix.

Below, an example is mainly described in which the substrate 10 (first substrate) is disposed towards the backlight 3 (rear side), and the substrate 20 (second substrate) is disposed towards the display surface side (viewer side), but as described later, the present embodiment is not limited to this configuration.

The respective configurations will be described below.

<Substrate 10>

The substrate 10 is an active matrix substrate. The substrate 10 includes, on an insulating substrate 11, various types of signal lines (scan signal line, data signal line, etc.), switching elements such as TFTs (thin film transistors), and an insulating film, and thereon, a lower electrode that is a uniformly planar electrode 12 (first electrode), an insulating layer 13, and upper electrodes including interdigital electrodes 14 and 15 (second and third electrodes; see FIG. 2) are layered in this order.

The configuration of the driver circuits that drive the various types of signal lines (scanning signal line driver circuit, data signal line driver circuit, etc.) have the same configuration as conventional driver circuits.

The uniformly planar electrode 12 is formed in a uniformly planar shape over almost the entire surface of the insulating substrate 11 facing the substrate 20 so as to cover, on the insulating substrate 11, the display region of the substrate 10 (area surrounded by a sealing member).

The insulating layer 13 is formed in a uniformly planar shape over the entire display region of the substrate 10 so as to cover the uniformly planar electrode 12.

Figure 2:
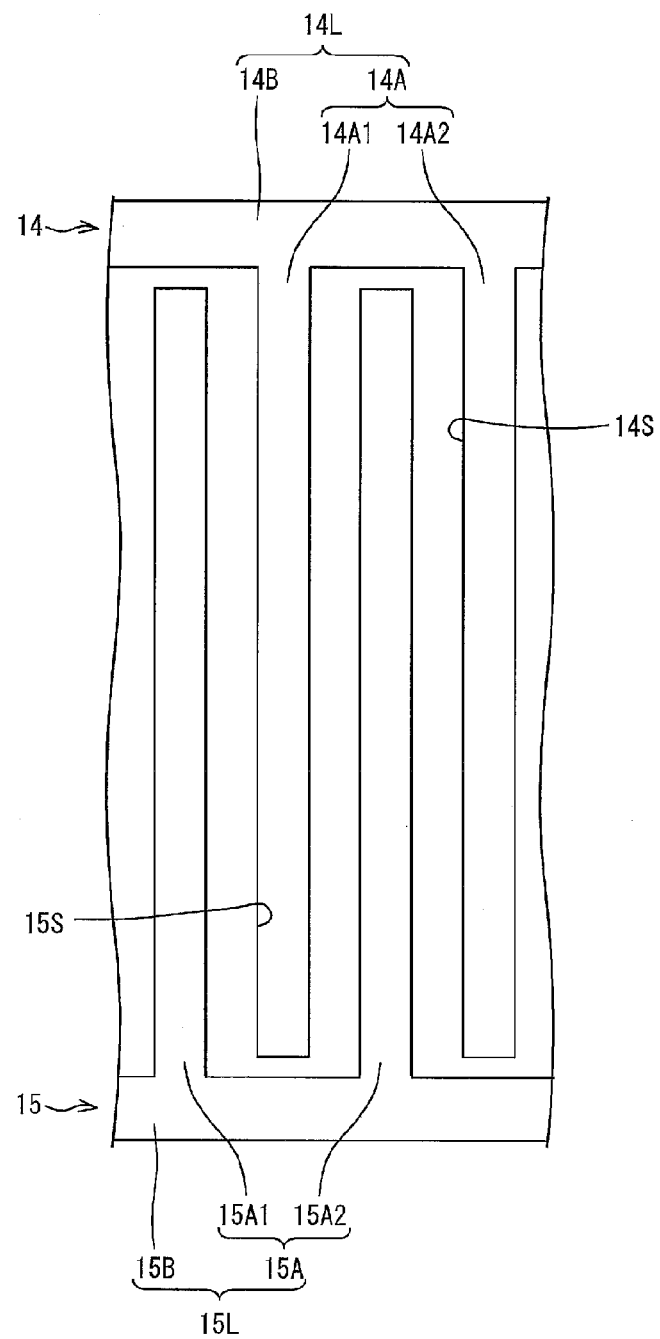
FIG. 2 is a plan view showing a schematic configuration of interdigital electrodes shown in FIGS. 1(a) and 1(b).

FIG. 2 is a plan view of the substrate 10 showing a schematic configuration of the interdigital electrodes 14 and 15.

As shown in FIG. 2, the interdigital electrodes 14 are electrodes having a comb shape including a patterned electrode portion 14L (electrode line) and a gap portion 14S (where the electrode is not formed), and more specifically is constituted of a trunk electrode 14B (trunk line), and branch electrodes 14A (branch lines) that extend from the trunk electrode 14B and correspond to the teeth of a comb.

Similarly, the interdigital electrodes 15 are electrodes having a comb shape including a patterned electrode portion 15L (electrode line) and a gap portion 15S (where the electrode is not formed), and more specifically is constituted of a trunk electrode 15B (trunk line), and branch electrodes 15A (branch lines) that extend from the trunk electrode 15B and correspond to the teeth of a comb.

In FIGS. 1(a) and 1(b), as the cross-sections of the interdigital electrodes 14 and 15, the cross-sections of the branch electrodes 14A and 15A are shown.

The number (m, n) of teeth (branch electrodes 14A and 15A) of the interdigital electrodes 14 and 15 provided in one pixel is not limited, and is determined based on the relation between the pixel pitch and the L/S of the respective interdigital electrodes 14 and 15 (that is, the line (electrode width)/gap (gap between electrodes)). Here, L represents the width of the branch electrodes 14A and 15A constituting the electrode portions 14L and 15L, and S represents the width of the gap portions 14S and 15S.

However, the width of the gap portions 14S and 15S is set wider than that of the branch electrodes 14A and 15A, and as shown in FIGS. 1(a), 1(b), and 2, these interdigital electrodes 14 and 15 are arranged such that the branch electrodes 14A (14A1, 14A2, . . . 14Am; m being an integer of 1 or greater) and the branch electrodes 15A (15A1, 15A2, . . . 15An; n being an integer of 1 or greater), corresponding to teeth of combs, of the respective interdigital electrodes 14 and 15 interlock with each other.

Therefore, the number of branch electrodes 14A and 15A is, in reality, determined based on the relation or the like between the pixel pitch, the width of the respective branch electrodes 14A and 15A, and the gap between adjacent branch electrodes 14A and 15A.

The respective branch electrodes 14A and 15A may be linear in shape, V-shaped, or in a zigzag pattern.

One set of interdigital electrodes 14 (second electrodes) among the interdigital electrodes 14 and 15 is the common electrode, and is connected electrically to a common wiring line formed in the periphery of the display region.

The other set of interdigital electrodes 15 (third electrode) is the pixel electrodes, which are connected to signal lines (scan signal lines, data signal lines) switching elements such as TFTs through drain electrodes that are not shown, and signals based on image signals are applied thereto.

<Substrate 20>

The substrate 20 is an opposite substrate and includes a uniformly planar electrode 22 (fourth electrode) on an insulating substrate 21.

The uniformly planar electrode 22 is formed in a uniformly planar shape over almost the entire surface of the insulating substrate 21 facing the substrate 20 so as to cover, on the insulating substrate 21, the display region of the substrate 20 (area surrounded by a sealing member).

<Materials of Respective Layers on Substrates 10 and 20 and Formation Method Thereof>

Next, an example of the materials of the respective layers on the substrates 10 and 20, and how to form these will be described.

As previously mentioned, the display device 1 of the present embodiment is a transmissive display device, and the substrates 10 and 20 include, as the insulating substrates 11 and 21, transparent substrates such as glass substrates, for example.

The respective electrodes on the substrates 10 and 20, or in other words, the uniformly planar electrodes 12 and 22 and the interdigital electrodes 14 and 15 are made of a transparent conductive film such as ITO (indium tin oxide), IZO (indium zinc oxide), zinc oxide, and tin oxide, for example.

There are no special limitations on the method of forming (laminating) these electrodes, and various conventionally known methods such as sputtering, vacuum deposition, and plasma CVD can be appropriately used. Among these electrodes, there is also no special limitation on how to pattern the interdigital electrodes 14 and 15, and a known patterning method such as photolithography can be used.

There is no special limitation on the thickness of the electrodes, but it is preferable that the thickness be in the range of 100 Å to 2,000 Å.

The insulating layer 13 may be an inorganic insulating film made of an inorganic material such as silicon nitride or silicon dioxide, or an organic insulating film made of an organic insulating material (resin material) such as an acrylic resin.

The thickness of the insulating layer 13 is less than the gap between adjacent electrode portions 14L and 15L (that is, the distance between adjacent branch electrodes 14A and 15A to be the gaps in the upper electrodes including the interdigital electrodes 14 and 15).

The thickness of the insulating layer 13 depends on the type of material the insulating layer 13 is made of (whether it is an inorganic insulating film or an organic insulating film, for example), but the thickness is within the range of 1,000 Å to 30,000 Å.

The thickness of the insulating layer 13 may be appropriately determined based on the material the insulating layer 13 is made of, and there is no special limitation thereon, but it is preferable that insulating layer 13 be thin so as to make it possible for anisometric members 32 within the light modulation layer 30 to be mentioned later to move with greater ease, and to allow the display panel 2 to be made thinner. However, from the perspective of preventing insulation defects and uneven thickness due to lattice defects, it is preferable that the thickness of the insulating layer 13 be 1,000 Å or greater.

There is no special limitation on the method of forming (laminating) the insulating layer 13, and various conventionally known methods can be chosen from among sputtering, vacuum deposition, plasma CVD, coating, and the like, based on the insulating material and the like.

As described above, the laminated body constituted of the uniformly planar electrode, the insulating layer, and the interdigital electrodes can be attained by forming, on the uniformly planar electrode made of a conductive electrode film, the insulating layer made of an inorganic material, a resin, or the like as described above, and forming the interdigital electrodes by forming another conductive electrode film on the insulating layer, patterning and etching the conductive film by a known photoresist such as a photosensitive resin, and removing the photoresist.

As an example of a cell configuration, if flakes having a diameter of 6 µm are used, the interdigital electrodes 14 and 15 can have a width of 3 µm, a gap between electrodes of 5 µm, and a cell thickness of 50 µm.

However, the configuration need not be limited thereto. However, it is preferable that the anisometric members 32 to be mentioned later (flakes, for example) have a larger diameter than the electrode width, thus allowing horizontal orientation where gaps are difficult to be formed between the flakes over the interdigital electrodes having a weak horizontal electric field.

<Light Modulation Layer 30>

The light modulation layer 30 is provided between the substrates 10 and 20, and includes a medium 31 and a plurality of anisometric members 32 contained in the medium 31.

The light modulation layer 30 is formed by bonding together using a sealing agent (not shown) the substrate 10 and the substrate 20 with spacers (not shown) therebetween, and sealing the medium 31 including the anisometric members 32 in the space between the substrates 10 and 20.

The thickness of the light modulation layer 30 (cell thickness) is set to a value greater than the length of each of the anisometric members 32 in the long axis direction, and is set at 80 µm, for example.

<Anisometric Members 32>

The anisometric members 32 are responsive members that exhibit shape anisotropy and rotate or change in shape according to the direction of the electric field. As for display characteristics, the anisometric members 32 are members that, based on the direction in which an electric field is applied to the light modulation layer 30, exhibit a change in projection area (projection area with respect to the substrates 10 and 20) in a plan view (that is, when viewed in the direction normal to the substrates 10 and 20). It is preferable that the projection area ratio (maximum projection area:minimum projection area) be at least 2:1.

The shape and material properties of the anisometric members 32 have no special limitation as long as the projection area of the anisometric member 32 in a plan view changes based on the direction in which the electric field is applied.

The anisometric members 32 can be flakes, cylinders, ellipsoids, or the like. The anisometric members 32 can be made of a metal, a semiconductor, a dielectric body, or a composite thereof. Alternatively, a dielectric multilayer film or a cholesteric resin can be used. If the anisometric members 32 are made of metal, aluminum flakes used in general coating can be used. The anisometric members 32 may be colored. The anisometric members 32 can be aluminum flakes having a diameter of 20 µm and a thickness of 0.3 µm.

Aluminum is typically susceptible to forming aluminum oxide (dielectric body), which is passive. Thus, in the description below, when the term "aluminum flake" or "Al flake" is simply used, this refers to aluminum flakes having surfaces coated in aluminum oxide as in commercially available aluminum flakes.

In the present embodiment, an example is described in which the metal is a dielectric-coated metal (metal coated in non-conductive material) having a surface thereof coated by a dielectric film (passive film). Examples in which the flakes are made only of metal in which the surface thereof is not covered by a dielectric film (passive film) will be described in embodiments below.

It is preferable that the specific weight of the anisometric members 32 be 11 g/cm$^3$ or less, more preferable that the specific weight be 3 g/cm$^3$ or less, and even more preferable that the specific weight be the same as that of the medium 31. This is because if the specific weight of the anisometric members 32 differs greatly from that of the medium 31, there would be a problem that the anisometric members 32 sink or float in the medium 31.

There is no special limitation on the thickness of the anisometric members 32, but the thinner the anisometric members 32 are, the greater the transmittance can be made. Therefore, it is preferable that the thickness of the anisometric members 32 be at least smaller than the gap (gap between electrodes) between the interdigital electrodes 14 and 15 (4 µm or less, for example), and it is more preferable that the thickness of the anisometric members 32 be less than or equal to the wavelength of light (less than or equal to 0.5 µm, for example).

If using flakes for the anisometric members 32, for example, it is preferable that the thickness thereof be less than or equal to 1 µm, and even more preferable that the thickness be less than or equal to 0.1 µm.

<Medium 31>

The medium 31 can be a substance having transparency in the visible light range, and a liquid that generally does not absorb light in the visible light range, a liquid colored by a dye, or the like. It is preferable that the specific weight of the medium 31 be equal to that of the anisometric members 32.

It is preferable that the medium 31 have a low volatility, taking into account the step of sealing the medium 31 inside the cell. The viscosity of the medium 31 relates to the responsiveness thereof, and it is preferable that the viscosity be less than or equal to 5 mPa·s, and in order to prevent the sinking of the anisometric members 32, it is preferable that the viscosity be 0.5 mPa·s or greater.

The medium 31 may be formed of one substance of a mixture of a plurality of substances. Propylene carbonate, NMP (N-methyl-2-pyrrolidone), fluorocarbon, silicone oil, or the like can be used, for example.

<Relay Circuits 41 and 51 and Power Source Circuit 61>

The uniformly planar electrode 12 on the substrate 10 is electrically connected to the relay circuit 41 (first relay circuit) through the power source circuit 61. A wiring line 42 for applying a voltage to the uniformly planar electrode 12 is provided between the uniformly planar electrode 12 and the relay circuit 41.

The uniformly planar electrode 22 on the substrate 20 is electrically connected to the relay circuit 51 (second relay circuit) through the power source circuit 61. A wiring line 52 for applying a voltage to the uniformly planar electrode 22 is provided between the uniformly planar electrode 22 and the relay circuit 51.

The interdigital electrodes 14 and 15 are respectively electrically connected to the power source circuit 61 through the relay circuits 41 and 51. A wiring line 43 for applying a voltage to the interdigital electrodes 14 is provided between the interdigital electrodes 14 and the relay circuit 41. A wiring line 53 for applying a voltage to the interdigital electrodes 15 is provided between the interdigital electrodes 15 and the relay circuit 51.

Also, a wiring line 44 connecting the relay circuit 41 to the power source circuit 61 is provided between the relay circuit 41 and the power source circuit 61. A wiring line 54 connecting the relay circuit 51 to the power source circuit 61 is provided between the relay circuit 51 and the power source circuit 61.

In the present embodiment, the relay circuits 41 and 51 switch electrodes, among the uniformly planar electrodes 12 and 22 and the interdigital electrodes 14 and 15, to which voltage is applied.

In other words, the relay circuits 41 and 51, the power source circuit 61, the respective wiring lines 42 to 44 and 52 to 54 function as electric field application direction changing circuits that change the direction of the electric field applied on the light modulation layer 30, and function as voltage applying units that selectively apply voltage to the uniformly planar electrodes 12 and 22 and the interdigital electrodes 14 and 15. The relay circuits 41 and 51 function as switching circuits (selection circuits) that select (switch) electrodes to which voltage is applied from among the uniformly planar electrodes 12 and 22 and the interdigital electrodes 14 and 15 provided on the substrates 10 and 20.

As shown in FIG. 1(a), for example, the relay circuit 41 performs switching such that the power source circuit 61 is connected to the uniformly planar electrode 12, and the relay circuit 51 performs switching such that the power source circuit 61 is connected to the uniformly planar electrode 22, and thus, a vertical electric field perpendicular to the substrates 10 and 20 is applied to the light modulation layer 30.

On the other hand, as shown in FIG. 1(b), the relay circuit 41 performs switching such that the power source circuit 61 is connected to the interdigital electrodes 14 and the relay circuit 51 performs switching such that the power source circuit 61 is connected to the interdigital electrodes 15, and thus, a horizontal electric field parallel to the substrates 10 and 20 is applied to the light modulation layer 30.

The relay circuits 41 and 51 may perform switching based on switching signals for switching the electrodes to which the voltage is applied, the switching signals being inputted from a signal source that is not shown, or the relay circuits 41 and 51 may perform switching by manual operation.

<Display Method for Display Panel 2 (Driving Method)>

Next, a method of controlling transmittance of light by the light modulation layer 30 and a display method for the display panel 2 will be described in detail. Here, a case in which flake-shaped anisometric members (hereinafter simply referred to as "flakes") are used as the anisometric members 32 will be described as an example.

FIG. 3(a) is a cross-sectional view of a main portion of the display panel 2 in FIG. 1(a) in a light progression state, and FIG. 3(b) is a cross-sectional view of a main portion of the display panel 2 in FIG. 1(b) showing a light progression state. In FIGS. 3(a) and 3(b), the relay circuits 41 and 51 and the power source circuit 61 are not shown. FIGS. 1(b) and 3(b) show, as an example, a state in which the flakes are oriented so as to stick to the substrate 10.

In the present embodiment, as described above, by reversibly switching between a vertical electric field generated between the uniformly planar electrodes 12 and 22 and a horizontal electric field generated between the interdigital electrodes 14 and 15, the orientation of the anisometric members 32 is reversibly switched.

As shown in FIG. 1(a), for example, if a voltage is applied between the even uniformly planar electrodes 12 and 22 that face each other, the flakes rotate such that the long axes thereof are parallel to the lines of electric force due to dielectrophoretic force, Coulomb's force, or electrical energy. In other words, the flakes are oriented such that the long axes thereof are perpendicular to the substrates 10 and 20 (vertical orientation). As a result, light received by the light modulation layer 30 from the backlight 3 passes through the light modulation layer 30 as shown in FIG. 3(a) and is radiated towards the viewer side.

At this time, if a material that reflects visible light such as metal pieces including aluminum flakes and the like is used for the flakes, for example, then by having the reflective surface be oriented vertically so as to be perpendicular to the substrates 10 and 20, the light received by the light modulation layer 30 directly passes through the light modulation layer 30 or is reflected off of the flakes and passes towards the surface opposite to the light receiving side, or in other words, towards the display surface side.

On the other hand, as shown in FIG. 1(b), if a voltage at or above a certain amount is applied to the interdigital electrodes 14 and 15, which interlock with each other and are present on the same plane, then the flakes orient so as to stick to the substrate 10 (horizontal orientation) in the vicinity of the interdigital electrodes 14 and 15 due to electrophoretic force and Coulomb's force.

With this horizontal orientation, the reflective surface of the flakes is oriented parallel to the substrate 10, and incident light is reflected off of the reflective surface and does not pass to the surface opposite to the side from which light is incident. As a result, light traveling from the backlight 3 towards the light modulation layer 30 is blocked by the horizontally oriented flakes.

The degree to which the flakes are oriented can be controlled by the amount of voltage applied. At least a portion of the light traveling from the backlight 3 towards the light modulation layer 30 is blocked by the flake based on the applied voltage. As a result, the transmittance of light (amount of light transmitted) from the backlight 3 incident on the light modulation layer 30 can be changed.

When switching the flakes from vertical orientation to horizontal orientation, the voltage applied between the uniformly planar electrodes 12 and 22 may be set to differ from the voltage applied between the interdigital electrodes 14 and 15 such that the respective voltages are at an optimal value.

However, if, in a state in which a certain voltage that is at or above a threshold for the horizontal orientation of the flakes is being applied from the power source circuit 61 to the uniformly planar electrodes 12 and 22, a relay circuit is used to switch the voltage so as to be applied to the interdigital electrodes 14 and 15, then by simply switching the electrodes to which the voltage is applied, the flakes can be switched from vertical orientation to horizontal orientation.

FIGS. 4(a) and 4(b) are cross-sectional views showing lines of electric force formed between the interdigital electrodes 14 and 15; FIG. 4(a) shows a state in which the voltage applied between the interdigital electrodes 14 and 15 is high, and FIG. 4(b) shows a state in which the voltage applied between the interdigital electrodes 14 and 15 is low.

As shown in FIGS. 4(a) and 4(b), the amount of electrical energy due to the lines of electric force formed between the interdigital electrodes 14 and 15 depends on the amount of voltage applied between the interdigital electrodes 14 and 15.

As shown in FIG. 4(a), when the voltage applied between the interdigital electrodes 14 and 15 is high, at 0.4V/μm, for example, then the flakes are oriented so as to be completely parallel to the lines of electric force having low energy.

On the other hand, when the voltage being applied between the interdigital electrodes 14 and 15 is relatively low, at 0.2V/μm, for example, then the flakes are oriented in a direction perpendicular to the electrodes when viewed in the direction normal to the substrates 10 and 20, and many of the flakes are not stuck to the substrate (specifically, the substrate 10 on which the interdigital electrodes 14 and 15 are formed, and where the flakes are stuck when the voltage is high). The reason is thought to be that the orientation is metastable after being oriented so as to stick to the substrate, and with a low voltage, the flakes do not reach an orientation required for the flakes to stick to the substrate.

The long axis direction of the flake rotates to being perpendicular to the interdigital electrodes 14 and 15 in the direction normal to the substrate by having a voltage applied between the interdigital electrodes 14 and 15. At this time, a voltage at or above a threshold is applied between the interdigital electrodes 14 and 15, and as shown in FIGS. 1(b) and 3(b), the flakes are oriented horizontally so as to stick to the substrate 10.

As shown in FIG. 3(b), in a state in which the flakes are oriented horizontally such that the long axes thereof are parallel to the substrates 10 and 20, the light traveling from the backlight 3 towards the light modulation layer 30 is completely blocked by the flakes, and thus, does not pass through the light modulation layer 30.

The voltage (threshold) necessary to be applied between the interdigital electrodes 14 and 15 in order for the flakes to switch to horizontal orientation, or in other words, for the flakes to be oriented to be parallel to the substrates 10 and 20 is predetermined based on the shape and material of the flakes (anisometric members 32), the substance of the medium 31, the gap between the interdigital electrodes 14 and 15 (gap between electrodes), the thickness of the light modulation layer 30 (cell thickness), and the like.

Therefore, when causing the flakes to rotate so as to be switched between horizontal orientation and vertical orientation as shown in FIGS. 1(a), 1(b), 3(a), and 3(b), a voltage at or above a preset threshold needs to be applied to the interdigital electrodes 14 and 15.

The threshold, as described above, depends on the shape and material of the anisometric members 32, the thickness of the light modulation layer 30 (cell thickness), and the like, but is a value of 0.3V/μm to 1V/μm.

FIG. 5(a) shows a micrograph taken of an orientation state of the flakes in a plan view when a voltage is applied between the uniformly planar electrodes 12 and 22, FIG. 5(b) shows a micrograph taken of an orientation state of the flakes in a plan view when a voltage applied between the interdigital electrodes 14 and 15 is relatively low, and FIG. 5(c) shows a micrograph taken of an orientation state of the flakes in a plan view when a voltage applied between the interdigital electrodes 14 and 15 is relatively high.

Here, the medium 31 is propylene carbonate, the anisometric members 32 are aluminum flakes having a diameter of 6 μm and a thickness of 0.1 μm, and the cell thickness is set at 79 μm. The uniformly planar electrodes 12 and 22 are made of ITO having a thickness of 1000 Å, the insulating layer is made of silicon nitride having a thickness of 1000 Å, and the interdigital electrodes 14 and 15 are made of ITO having a thickness of 1000 Å. The widths of the interdigital electrodes 14 and 15 are respectively set at 3 μm. The gap between adjacent branch electrodes 14A and 15A is set at 5 μm.

In FIG. 5(a), an alternating current voltage (vertical electric field) of 3V was applied between the uniformly planar electrodes 12 and 22.

In FIG. 5(b), the relay circuits 41 and 51 performed switching and an alternating current voltage (horizontal electric field) of 0.2V/μm was applied between the interdigital electrodes 14 and 15.

In FIG. 5(c), an alternating current voltage (horizontal electric field) of 0.4V/μm was applied between the interdigital electrodes 14 and 15.

The frequency in all cases was 60 Hz.

As shown in FIG. 5(a), when a voltage is applied between the uniformly planar electrodes 12 and 22, the edge faces of the flakes can be seen, and thus, as described above, the thinner the anisometric members 32, that is the flakes in this case, are, the greater the transmittance can be made.

<Potential of Respective Electrodes when Flakes are Vertically Oriented>

Taking into consideration the voltage drop in the insulating layer 13 and the light modulation layer 30, which is a driven layer, for example, the potential of the interdigital electrodes 14 and 15 with respect to the uniformly planar electrodes 12 and 22 in a state when the flakes are in a vertical orientation can be set at the same level as areas in the same plane as the interdigital electrodes 14 and 15 but where the interdigital electrodes 14 and 15 are not present.

As a different method, the potential of the interdigital electrodes 14 and 15 can be insulated without being set to a specific potential. At this time, a potential difference does not occur in the area around the uniformly planar electrode 12, which is a conductor, or in other words, between the uniformly planar electrode 12 and the interdigital electrodes 14 and 15, and similar lines of electric force are formed as if the interdigital electrodes 14 and 15 were not present.

<Potential of Respective Electrodes when Flakes are Horizontally Oriented>

The potential of the interdigital electrodes 14 and 15 with respect to the uniformly planar electrodes 12 and 22 when the flakes are in a horizontal orientation can be set to a midpoint value between the values of the potentials applied to the interdigital electrodes 14 and 15, such as 0V, for example.

As a different method, the potential of the uniformly planar electrodes 12 and 22 can be insulated without being set to a specific potential. However, in such a case, there is a risk that the flake is affected by an external charge or the like.

<Effects>

As described above, according to the present embodiment, uniformly planar electrodes 12 and 22 that face each other are provided evenly on the pair of substrates 10 and 20, which face each other, and thus, by applying a voltage between these uniformly planar electrodes 12 and 22, an even vertical electric field is formed, thereby causing the flakes to be in a vertical orientation. Also, by applying a voltage between the interdigital electrodes 14 and 15, it is possible to have the flakes be in a completely horizontal orientation.

In particular, according to the present embodiment, by applying the potential to the respective electrodes, a generally even electric field is attained when a voltage is applied to the uniformly planar electrodes 12 and 22.

According to the present embodiment, the uniformly planar electrodes 12 and 22 are formed as described above on the respective substrates, which face each other, and thus, when a vertical electric field is formed, there are no areas of weak electric field as described in Patent Document 1, and the flakes are oriented vertically without concentrating in certain locations.

Also, whereas providing electrodes for applying a horizontal electric field on spacers as described in Patent Document 2 does not allow the orientation of the flakes to be controlled in a three dimensional manner as described above, if a horizontal electric field is applied by interdigital electrodes as in the present embodiment, the flakes are oriented in an electrically stable manner, and therefore, are oriented horizontally. Thus, according to the present embodiment, it is possible to orient the flakes three dimensionally, and it is possible to control the orientation of the flakes such that the flake surfaces are parallel to the substrates.

Therefore, according to the present embodiment, it is possible to provide a display panel 2 and a display device 1 having a simple configuration, a high contrast, and a high rate of light usage without the need for polarizing plates.

<Modification Example of Substrate Arrangement>

Figure 6:
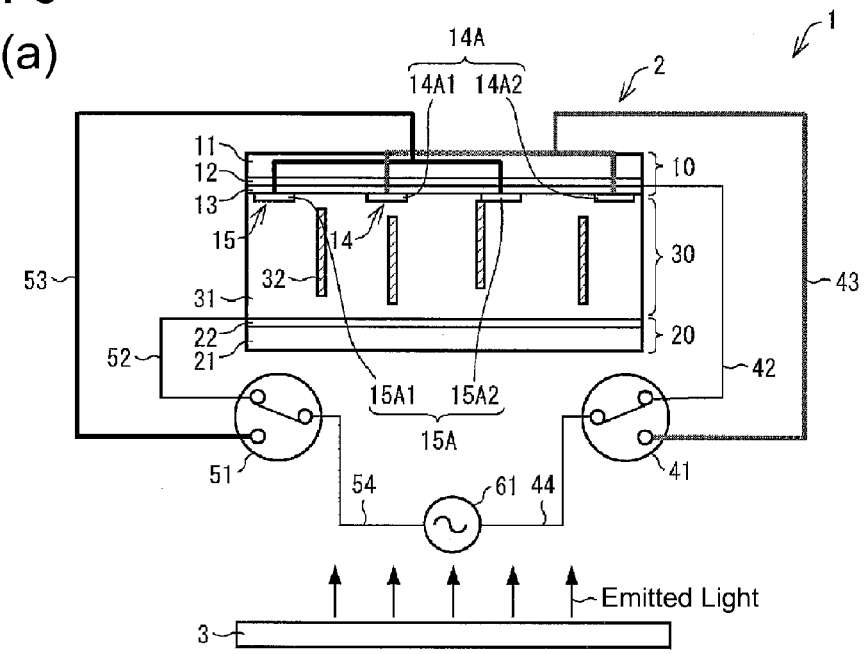
FIGS. 6(a) and 6(b) are cross-sectional views that show a schematic configuration of another display device of Embodiment 1.
Figure 6:
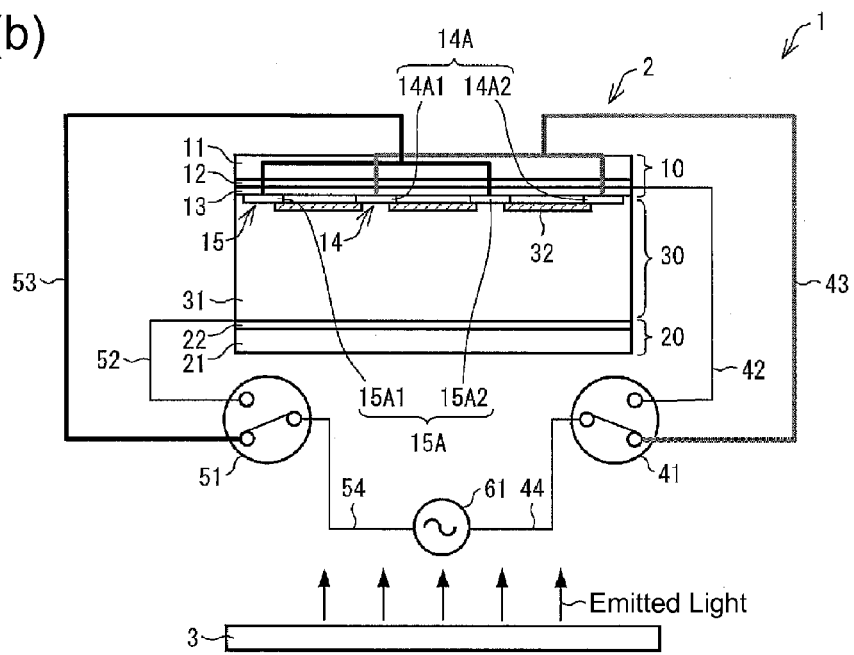

FIGS. 6(*a*) and 6(*b*) are cross-sectional views showing a schematic configuration of another display device 1 of the present embodiment; FIG. 6(*a*) shows a light-transmissive state and FIG. 6(*b*) shows a light-reflective state.

In FIGS. 1(*a*) and 1(*b*), an example was shown of a case in which the substrate 10 on which the interdigital electrodes 14 and 15 are provided is disposed towards the backlight 3, and the substrate 20 facing the substrate 10 is disposed towards the display surface side. However, the present embodiment is not limited thereto, and as shown in FIGS. 6(*a*) and 6(*b*), the substrate 20 may be provided towards the backlight 3 and the substrate 10 may be provided towards the display surface side. In this case, as shown in FIG. 6(*b*), the substrate to which the flakes (anisometric members 32) stick is the opposite to that of a case in which the substrates 10 and 20 are arranged as shown in FIGS. 1(*a*) and 1(*b*).

<Modification Example of Uniformly Planar Electrode 12>

In the present embodiment, an example was described in which the uniformly planar electrode 12 is formed evenly over almost the entire surface of the insulating substrate 11 facing the substrate 20.

However, the uniformly planar electrode 12 may be separated for each pixel. In this case, the uniformly planar electrode 12 is connected to a switching element such as a TFT that is separate from the interdigital electrodes 14, and a signal based on an image signal is applied to the uniformly planar electrode 12.

If the light modulation device is a display device and is provided with a plurality of display regions (pixel areas), the uniformly planar electrode 12 needs to be provided evenly in each display region (each pixel area).

<Embodiment 2>

Another embodiment of the present invention is described as follows with reference to FIGS. 7(*a*) to 13(*b*).

Differences from Embodiment 1 will mainly be described below, and components having the same function as those described in Embodiment 1 are assigned the same reference characters and descriptions thereof will be omitted.

<Schematic Configuration of Display Device>

Figure 7:
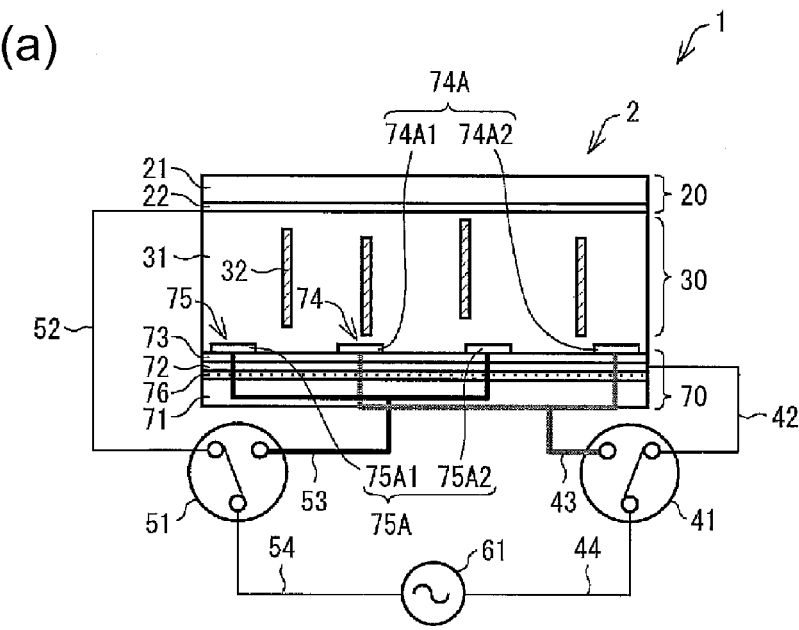
FIGS. 7(a) and 7(b) are cross-sectional views that show a schematic configuration of a display device of Embodiment 2.
Figure 7:
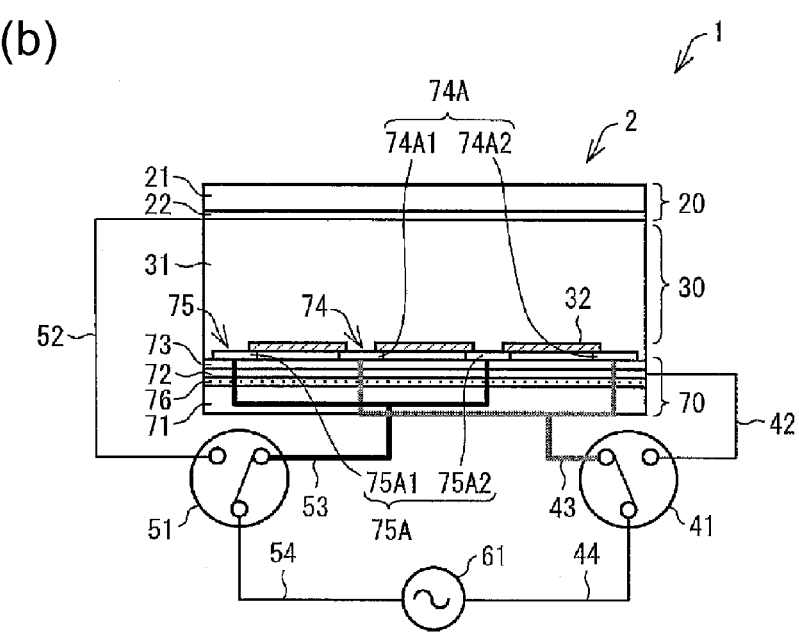

FIGS. 7(*a*) and 7(*b*) are cross-sectional views showing a schematic configuration of a display device 1 of the present embodiment; FIG. 7(*a*) shows a light-absorption state and FIG. 7(*b*) shows a light-reflective state.

As shown in FIGS. 7(*a*) and 7(*b*), the display device 1 of the present embodiment includes a display panel 2 and a driver circuit that is not shown, and is a reflective display device that performs display by reflecting external light incident on the display panel 2.

The display panel 2 includes a pair of substrates 70 and 20 disposed opposite to each other, and a light modulation layer 30 disposed between the pair of substrates 70 and 20, and additionally includes relay circuits 41 and 51 that switch the direction of the electric field to be applied to the light modulation layer 30 by selecting which electrodes apply voltage, and a power source circuit 61.

In the present embodiment also, the display panel 2 has a plurality of pixels arranged in a matrix. Below, a case in which the substrate 70 (first substrate) is disposed to the rear and the substrate 20 (second substrate) is disposed towards the display surface side (viewer side) will be described as an example, but as will be described later, the present embodiment is not limited thereto.

The display device 1 of the present embodiment is a reflective display device, and thus, as long as the insulating substrate and the electrodes of the display surface side substrate are respectively a transparent substrate and transparent electrodes, the insulating substrate and electrodes provided to the rear need not necessarily be transparent, and may alternatively be non-transparent. There is no special limitation on such insulating substrates and electrodes, and general materials used in insulating substrates and electrodes in known display devices can be used. As an example, the electrodes can be made of a vapor deposited aluminum layer, for example.

In the description below, a case in which the insulating substrates 11 and 21 on the substrates 70 and 20, the uniformly planar electrodes 12 and 22, and the interdigital electrodes 14 and 15 are respectively transparent substrates and transparent electrodes as in Embodiment 1 will be described as an example.

The display panel 2 shown in FIGS. 7(*a*) and 7(*b*) has a similar configuration to the display panel 2 shown in FIGS. 1(*a*) and 1(*b*) besides the fact that the substrate 70 is used instead of the substrate 10.

The substrate 70 has a configuration similar to that of the display panel 2 shown in FIGS. 1(*a*) and 1(*b*) except that a light-absorption layer 76 is provided as a light-absorption layer below the uniformly planar electrode 12 in the substrate 10 shown in FIGS. 1(*a*) and 1(*b*).

That is, the substrate 70 of the present embodiment includes various signal lines (scan signal lines, data signal lines, etc.), switching elements such as TFTs, and an insulating film on an insulating substrate 71, and on these elements, the light-absorption layer 76, a lower layer electrode that is a uniformly planar electrode 72 (first electrode), an insulating layer 73, and upper layer electrodes including interdigital electrodes 74 and 75 (second and third electrodes) are layered in this order.

The insulating substrate 71, the uniformly planar electrode 72, the insulating layer 73, and the interdigital electrodes 74 and 75 have modified reference characters for ease of description, but these are respectively the same as the insulating substrate 11, the uniformly planar electrode 12, the insulating layer 13, and the interdigital electrodes 14 and 15 in the display panel 2 shown in FIGS. 1(*a*) and 1(*b*).

Therefore, in the present embodiment, the insulating substrate 71, the uniformly planar electrode 72, the insulating layer 73, and the interdigital electrodes 74 and 75 can be substituted into the description of the insulating substrate 11, the uniformly planar electrode 12, the insulating layer 13, and the interdigital electrodes 14 and 15 of Embodiment 1.

Of course, the description of the electrode portions 14L and 15L, the gap portions 14S and 15S, the trunk electrodes 14B and 15B, and the branch electrodes 14A and 15A in the interdigital electrodes 14 and 15 can be applied to the electrode portions 74L and 75L, the gap portions 74S and 75S, the trunk electrodes 74B and 75B, and the branch electrodes 74A and 75A in the interdigital electrodes 74 and 75.

Therefore, in the present embodiment, descriptions of the insulating substrate 71, the uniformly planar electrode 72, the insulating layer 73, and the interdigital electrodes 74 and 75 are omitted.

<Display Method (Driving Method) in Light-Absorption Layer 76 and Display Panel 2>

The light-absorption layer 76 has a property of absorbing light within at least a certain wavelength range among light entering the light-absorption layer 76. The light-absorption layer 76 may be colored, and is black, for example.

The display method in the display panel 2 will be described in detail. In the present embodiment also, a case in which flakes are used as the anisometric members 32 is described as an example.

Figure 8:
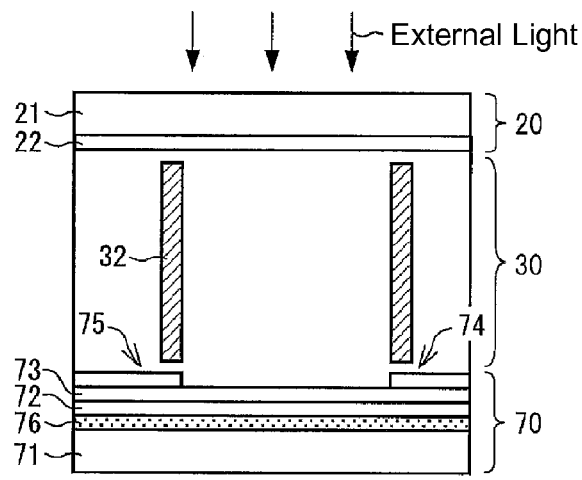
FIG. 8(a) is a cross-sectional view of a main portion of the display panel showing a light-transmissive state in FIG. 7(a)
FIG. 8(b) is a cross-sectional view of a main portion of the display panel showing a light-transmissive state in FIG. 7(b).
Figure 8:
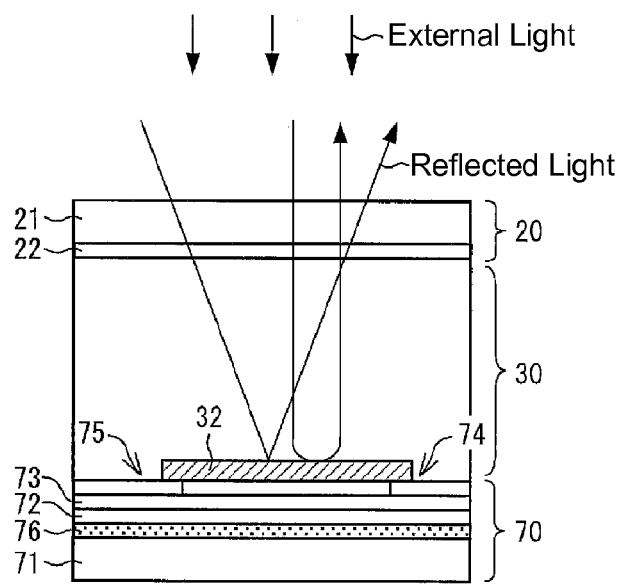

FIG. 8(*a*) is a cross-sectional view of a main portion of the display panel 2 in FIG. 7(*a*) in a light progression state, and FIG. 8(*b*) is a cross-sectional view of a main portion of the display panel 2 in FIG. 7(*b*) showing a light progression state. In FIGS. 8(*a*) and 8(*b*), the relay circuits 41 and 51 and the power source circuit 61 are not shown. FIGS. 7(*b*) and 8(*b*) show, as an example, a state in which the flakes are oriented so as to stick to the substrate 70.

In the present embodiment also, the orientation of the anisometric members 32 can be reversibly changed by reversibly switching between a vertical electric field formed between the uniformly planar electrodes 72 and 22 and a horizontal electric field formed between the interdigital electrodes 74 and 75, as done in Embodiment 1.

As shown in FIG. 7(*a*), if a voltage is applied between the even uniformly planar electrodes 72 and 22 that face each other, the flakes rotate to be in a vertical orientation such that the long axes thereof are parallel to the lines of electric force due to dielectrophoretic force, Coulomb's force, or electrical energy.

Thus, as shown in FIG. 8(*a*), external light that has entered the light modulation layer 30 passes through the light modulation layer 30 and is absorbed by the light-absorption layer 76. As a result, the viewer perceives the black of the light-absorption layer 76 (black display).

On the other hand, as shown in FIG. 7(*b*), when a voltage at or above a certain amount is applied to the interdigital electrodes 74 and 75, which are alternately arranged on the same plane, the flakes enter a horizontal orientation so as to stick to the substrate 70 in the vicinity of the interdigital electrodes 74 and 75 due to electrophoretic force or Coulomb's force, in a manner similar to the display panel 2 shown in FIGS. 1(*a*) and 1(*b*). Thus, as shown in FIG. 8(*b*), external light that has entered the light modulation layer 30 is reflected to where the light came from, or in other words, back to the display surface side. Thus, reflective display is attained.

If a colored layer (light-absorption layer 76) is provided towards the rear surface of the display panel 2 (that is, the rear surface side of the uniformly planar electrode 72 on the substrate 70, which is towards the rear from the perspective of the viewer), when the flakes are in a horizontal orientation, the reflective color of the flakes is perceived, and when the flakes are in a vertical orientation, the colored layer is perceived. If the colored layer is made to be black as described above, for example, then if the flakes are made of metal pieces, then light is reflected off of the metal pieces when the flakes are in a horizontal orientation, and when the flakes are in a vertical orientation, black display is attained.

Furthermore, by setting the average particle diameter (D50) of the flakes (metal pieces), for example, to 20 μm or less, giving the surface of the flakes recesses and protrusions such that the flakes exhibit light-scattering properties, or giving the profile of the flakes recesses and protrusions such that the flakes have an uneven shape, reflected light can be scattered and white display can be achieved.

There is no special limitation on the material for the colored layer (light-absorption layer 76), but black resist or the like are examples thereof.

The thickness of the colored layer may be set as appropriate according to the material of the colored layer or the like, and there is no special limitation on the thickness, but it is preferable that the thickness be within the range of 1 μm to 10 μm, for example, due to such a thickness allowing for sufficient coloration.

There is no special limitation on the size of the recesses and protrusions, but, when viewing the recesses and protrusions from above, or in other words, when viewing the recesses and protrusions in a plan view, it is preferable that the maximum width (diameter) of the bottom surface of the protrusion and the maximum opening width (diameter) of the recess be within the range of 0.1 μm to 50 μm, and that the height (depth) of the recesses and protrusions be within the range of 0.1 μm to 10 μm, because these values will allow sufficient light scattering.

The average diameter can be measured by laser diffraction/scattering. The size of the recesses and protrusions can be measured by a confocal laser scanning microscope.

As described above, in FIG. 8(*b*), the flakes are shown to be oriented so as to stick to the substrate 70.

In such a configuration in which the substrate 70 having the interdigital electrodes 74 and 75 is provided to the rear from the perspective of the viewer and the flakes are oriented towards the substrate 70 on the rear, the viewer perceives that the flakes have accumulated. Thus, in this case, a surface with recesses and protrusions is formed by the plurality of flakes that have accumulated on the surface of the substrate 70, and thus, display with highly light-scattering properties can be attained.

<Modification Example 1 of Display Device>

FIGS. 9(a) and 9(b) are cross-sectional views showing a schematic configuration of another display device 1 of the present embodiment; FIG. 9(a) shows a light-absorption state and FIG. 9(b) shows a light-reflective state.

Figure 9:
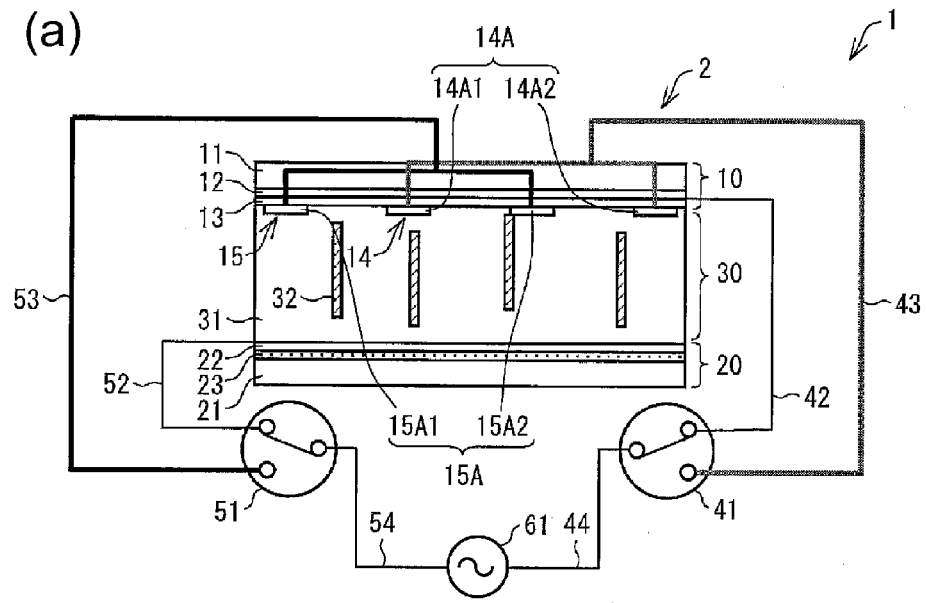
FIGS. 9(a) and 9(b) are cross-sectional views that show a schematic configuration of another display device of Embodiment 2.
Figure 9:
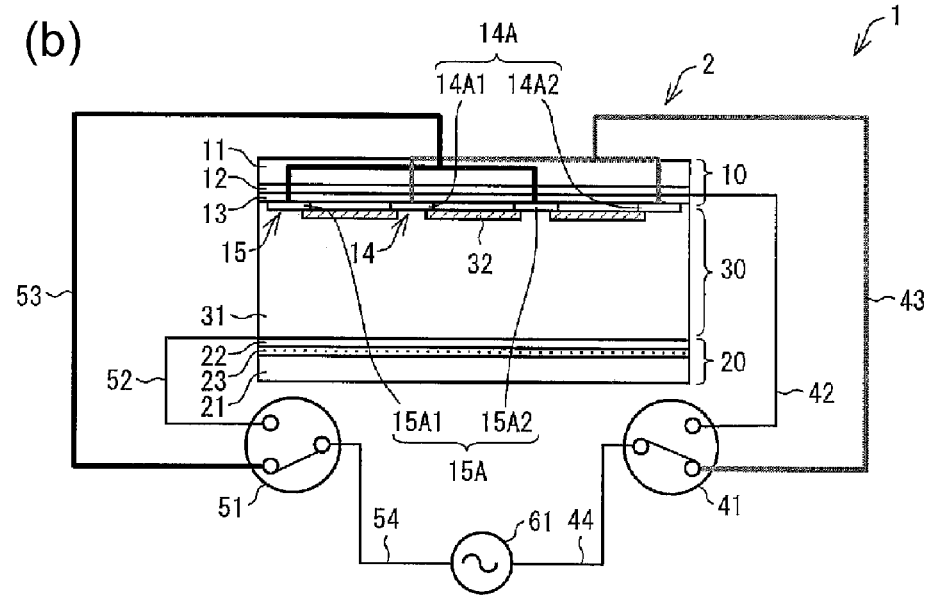
Figure 10:
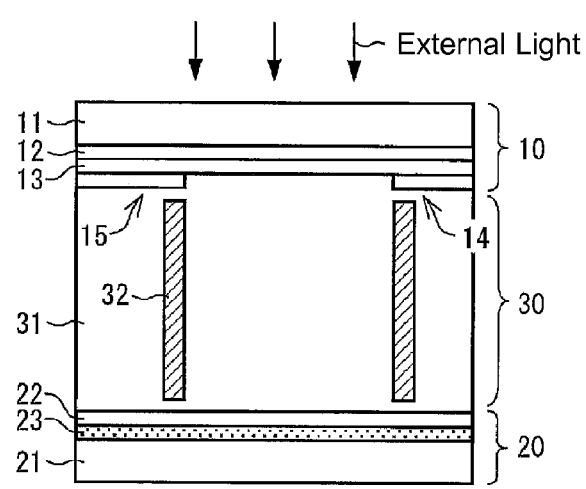
FIG. 10(a) is a cross-sectional view of a main portion of the display panel showing a light-transmissive state in FIG. 9(a)
FIG. 10(b) is a cross-sectional view of a main portion of the display panel showing a light-transmissive state in FIG. 9(b).
Figure 10:
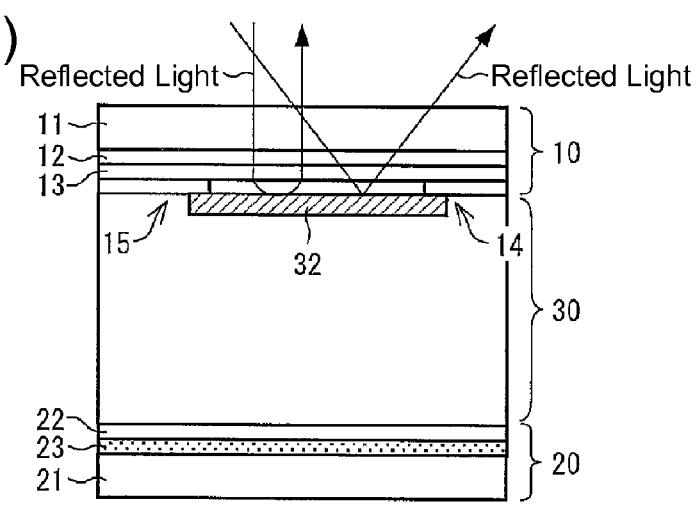

FIG. 10(a) is a cross-sectional view of a main portion of the display panel 2 showing a light progression state of FIG. 9(a), and FIG. 10(b) is a cross-sectional view of a main portion of the display panel 2 showing a light progression state of FIG. 9(b). In FIGS. 10(a) and 10(b) also, the relay circuits 41 and 51 and the power source circuit 61 are not shown. FIGS. 9(b) and 10(b) show, as an example, a state in which the flakes are oriented so as to stick to the substrate 10.

FIGS. 9(a), 9(b), 10(a), and 10(b) show a case in which the substrate 10 on which the interdigital electrodes 14 and 15 are provided is disposed on the display surface side, which is the viewer side, and the substrate 20 facing the substrate 10 is disposed to the rear from the perspective of the viewer.

The display panel 2 shown in FIGS. 9(a), 9(b), 10(a), and 10(b) has a configuration similar to the display panel 2 shown in FIGS. 6(a) and 6(b) other than the fact that the light-absorption layer 23 as a light-absorption layer is provided below the uniformly planar electrode 22 of the substrate 20.

In other words, in the display panel 2 of the present modification example, the substrate 10 has a configuration similar to the substrate 10 of the display panel 2 shown in FIGS. 1(a), 1(b), 6(a), and 6(b), but the substrate 20 has a configuration in which the light-absorption layer 23 and the uniformly planar electrode 22 (fourth electrode) are layered in this order on the insulating substrate 21.

The light-absorption layer 23 is the same as the light-absorption layer 76 other than the fact that the light-absorption layer 23 is provided below the uniformly planar electrode 22 of the substrate 20. Therefore, the description of the light-absorption layer 76 can be applied as is to the light-absorption layer 23, and thus, descriptions of the light-absorption layer 23 will be omitted.

In a configuration in which the substrate 10 having the interdigital electrodes 14 and 15 is disposed on the viewer side and the flakes are oriented towards the substrate 10 on the viewer side, the amount of flakes (anisometric members 32) contained in the medium 31 is large. If the surface of the substrate 10 can be covered in flakes when the flakes are in a horizontal orientation, or in other words, if the amount of flakes included exceeds the amount necessary for a layer of flakes to cover the surface of the substrate 10 facing the substrate 20 when the flakes are in a horizontal orientation, an even surface (even reflective surface) is seen by the viewer due to the reflective surfaces of the respective flakes. Thus, it is possible to attain a highly mirrored display (minor reflection light, mirror reflection display).

<Modification Example 2 of Display Device>

FIGS. 11(a) to 11(c) are cross-sectional views showing a schematic configuration of yet another display device 1 of the present embodiment; FIG. 11(a) shows a light-absorption state; FIG. 11(b) shows a light-reflective state due to light scattering; and FIG. 11(c) shows a light-reflective state due to minor reflection.

The display panel 2 of the present modification example includes a pair of substrates 10 and 70 disposed opposite to each other, and a light modulation layer 30 disposed between the pair of substrates 10 and 70, and additionally includes relay circuits 80 and 90 (switching circuits) that switch the direction of the electric field to be applied to the light modulation layer 30 by selecting which electrodes apply voltage, and a power source circuit 61.

That is, in the present modification example a case is described in which the pair of substrates 10 and 70 facing each other is respectively active matrix substrates such as TFT substrates.

In this case, as shown in FIGS. 11(a) to 11(c), the substrate 70 in which the light-absorption layer 76 is provided below the uniformly planar electrode 72 is disposed towards the rear from the perspective of the viewer, and the substrate 10 that is not provided with a light-absorption layer is disposed towards the display surface side, which is the viewer side.

The substrate 10 and the substrate 70 have already been described, and thus, descriptions thereof will be omitted here.

(Relay Circuits 80 and 90)

The relay circuit 80 (first relay circuit) used in Modification Example 2 includes a first relay circuit portion 81 (first switching circuit portion) and a second relay circuit portion 82 (second switching circuit portion), which are electrically connected to each other.

Similarly, the relay circuit 90 (second relay circuit) used in the present modification example includes a third relay circuit portion 91 (third switching circuit portion) and a fourth relay circuit portion 92 (fourth switching circuit portion), which are electrically connected to each other.

The uniformly planar electrode 72 on the substrate 70 is electrically connected to the power source circuit 61 through the relay circuit 80, or in other words, the first relay circuit portion 81 and the second relay circuit portion 82. A wiring line 83 for applying a voltage to the uniformly planar electrode 72 is provided between the uniformly planar electrode 72 and the relay circuit 80.

The uniformly planar electrode 12 on the substrate 10 is electrically connected to the power source circuit 61 through the relay circuit 90, or in other words, the third relay circuit portion 91 and the fourth relay circuit portion 92. A wiring line 93 for applying a voltage to the uniformly planar electrode 12 is provided between the uniformly planar electrode 12 and the relay circuit 90.

The interdigital electrodes 74 and 75 are respectively electrically connected to the power source circuit 61 through the second relay circuit portion 82 in the relay circuit 80 and the fourth relay circuit portion 92 in the relay circuit 90. A wiring line 84 for applying a voltage to the interdigital electrodes 74 is provided between the interdigital electrodes 74 and the first relay circuit portion 81 of the relay circuit 80. A wiring line 94 for applying a voltage to the interdigital electrodes 75 is provided between the interdigital electrodes 75 and the third relay circuit portion 91 of the relay circuit 90.

The interdigital electrodes 14 and 15 are respectively electrically connected to the power source circuit 61 through the second relay circuit portion 82 in the relay circuit 80 and the fourth relay circuit portion 92 in the relay circuit 90. A wiring line 85 for applying a voltage to the interdigital electrodes 14 is provided between the interdigital electrodes 14 and the second relay circuit portion 82 of the relay circuit 80. A wiring line 95 for applying a voltage to the interdigital electrodes 15 is provided between the interdigital electrodes 15 and the fourth relay circuit portion 92 of the relay circuit 90.

Furthermore, a wiring line 86 that connects the second relay circuit portion 82 of the relay circuit 80 to the power source circuit 61 is provided between the second relay circuit portion 82 and the power source circuit 61. A wiring line 96 that connects the fourth relay circuit portion 92 of the relay circuit 90 to the power source circuit 61 is provided between the fourth relay circuit portion 92 and the power source circuit 61.

In the present embodiment, the relay circuits 80 and 90 are used to switch the electrodes to which voltage is applied among the uniformly planar electrodes 12 and 72, the interdigital electrodes 14 and 15, and the interdigital electrodes 74 and 75.

In other words, the relay circuits 80 and 90, the power source circuit 61, the respective wiring lines 83 to 86 and 93 to 96 function as electric field application direction changing circuits that change the direction of the electric field applied on the light modulation layer 30, and function as voltage applying units that selectively apply voltage to the uniformly planar electrodes 12 and 72, the interdigital electrodes 14 and 15, and the interdigital electrodes 74 and 75. The relay circuits 80 and 90 function as switching circuits (selection circuits) that select (switch) electrodes to which voltage is applied from among the uniformly planar electrodes 12 and 72, the interdigital electrodes 14 and 15, and the interdigital electrodes 74 and 75 provided on the substrates 10 and 70.

As shown in FIG. 11(a), for example, a vertical electric field perpendicular to the substrates 10 and 70 is applied to the light modulation layer 30 by having the relay circuit 80 (first relay circuit portion 81 and second relay circuit portion 82) perform switching such that the power source circuit 61 and the uniformly planar electrode 72 are connected to each other and having the relay circuit 90 (third relay circuit portion 91 and fourth relay circuit portion 92) perform switching such that the power source circuit 61 and the uniformly planar electrode 12 are connected to each other.

As a result, the flakes rotate to be in a vertical orientation such that the long axes thereof are parallel to the lines of electric force due to dielectrophoretic force and Coulomb's force, or electrical energy.

As shown in FIG. 11(b), a horizontal electric field parallel to the substrate 70 is applied to the light modulation layer 30 by having the relay circuit 80 perform switching such that the power source circuit 61 is connected to the interdigital electrodes 74 and having the relay circuit 90 perform switching such that the power source circuit 61 is connected to the interdigital electrodes 75.

If, in this manner, a voltage at or above a certain amount is applied to the interdigital electrodes 74 and 75, which interlock with each other and are on the same plane on the substrate 70 to the rear, the flakes are oriented so as to stick to the substrate 70 (horizontal orientation) in the vicinity of the interdigital electrodes 74 and 75 due to electrophoretic force or Coulomb's force.

As shown in FIG. 11(c), a horizontal electric field parallel to the substrate 10 is applied to the light modulation layer 30 by having the relay circuit 80 perform switching such that the power source circuit 61 is connected to the interdigital electrodes 14 and having the relay circuit 90 perform switching such that the power source circuit 61 is connected to the interdigital electrodes 15.

If, in this manner, a voltage at or above a certain amount is applied to the interdigital electrodes 14 and 15, which interlock with each other and are on the same plane, on the substrate 10 on the display surface side, the flakes are oriented so as to stick to the substrate 10 (horizontal orientation) in the vicinity of the interdigital electrodes 14 and 15 due to electrophoretic force or Coulomb's force.

In the present embodiment also, the first relay circuit portion 81, the second relay circuit portion 82, the third relay circuit portion 91, and the fourth relay circuit portion 92 in the relay circuits 80 and 90 may perform switching by received switching signals by receiving switching signals for switching the electrodes to which a voltage is applied from a signal source that is not shown, and may perform switching manually.

(Display Method (Driving Method) of Display Panel 2 in Modification Example 2)

Figure 11:
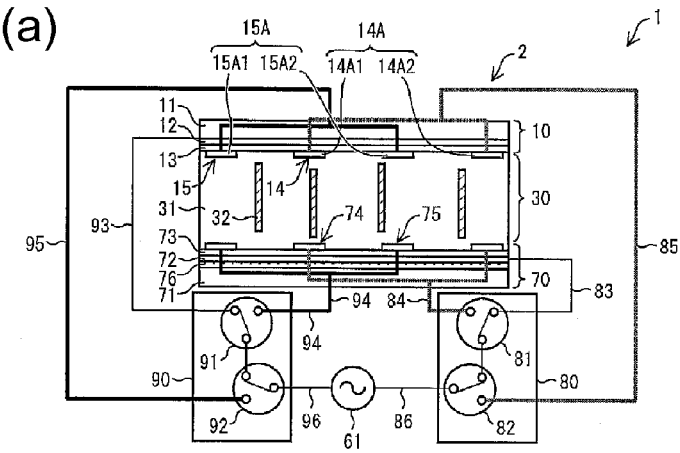
FIGS. 11(a) to 11(c) are cross-sectional views that show a schematic configuration of yet another display device of Embodiment 2.
Figure 11:
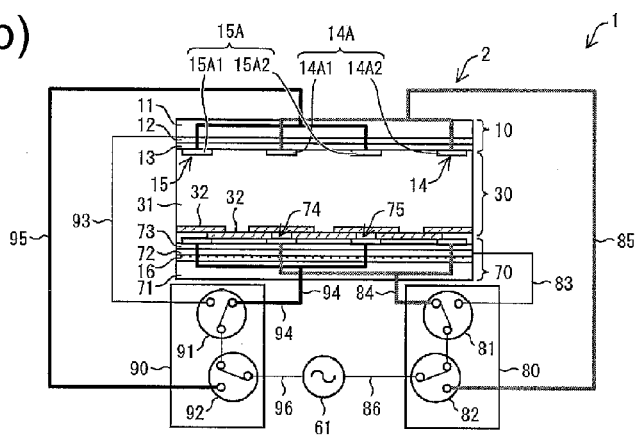
Figure 11:
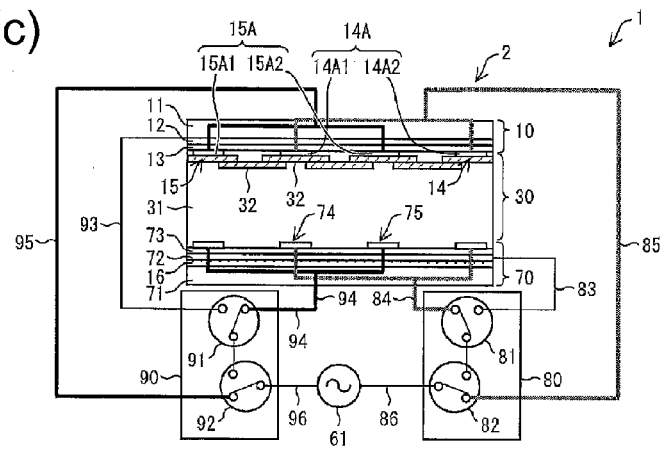
Figure 12:
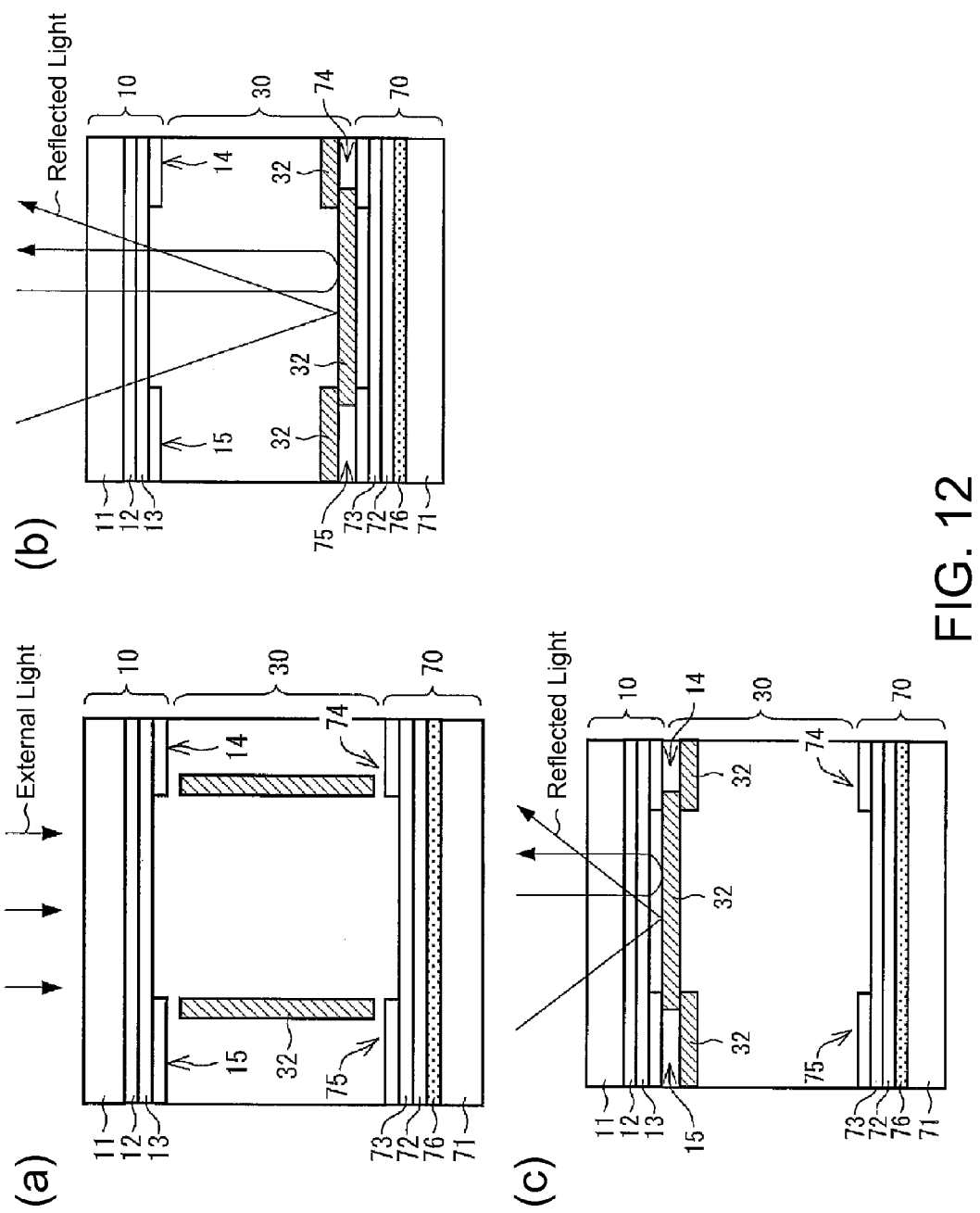
FIG. 12(a) is a cross-sectional view of a main portion of the display panel showing a state of light progression in FIG. 11(a)
FIG. 12(b) is a cross-sectional view of the main portion of the display panel showing a state of light progression in FIG. 11(b)
FIG. 12(c) is a cross-sectional view of the main portion of the display panel showing a state of light progression in FIG. 11(c).

FIG. 12(a) is a cross-sectional view of a main portion of the display panel 2 showing a light progression state in FIG. 11(a), FIG. 12(b) is a cross-sectional view of a main portion of the display panel 2 showing a light progression state in FIG. 11(b), and FIG. 12(c) is a cross-sectional view of a main portion of the display panel 2 showing a light progression state in FIG. 11(c).

In FIGS. 12(a) to 12(c) also, the relay circuits 80 and 90 and the power source circuit 61 are not shown. In FIGS. 11(b) and 12(b), a state in which the flakes stick to the substrate 70 is shown as an example, and in FIGS. 11(c) and 12(c), a state in which the flakes stick to the substrate 10 is shown as an example.

Below, a case in which aluminum (Al) flakes are used as the anisometric members 32 will be described as an example.

As described above, if a voltage is applied between the even uniformly planar electrodes 12 and 72 that face each other, the flakes rotate to be in a vertical orientation such that the long axes thereof are parallel to the lines of electric force due to dielectrophoretic force, Coulomb's force, or electrical energy.

Thus, as shown in FIG. 12(a), external light that has entered the light modulation layer 30 passes therethrough and is absorbed by the light-absorption layer 76. As a result, the viewer perceives the black of the light-absorption layer 76 (black display).

By contrast, in a configuration in which the flakes are oriented towards the substrate 70 to the rear as shown in FIG. 12(b), the viewer sees accumulated flakes, and a surface having recesses and protrusions is formed by the plurality of flakes, and thus, it is possible to attain display with a high degree of light scattering (scattered light, white display).

On the other hand, in a configuration in which the flakes are oriented towards the substrate 10 on the viewer side as shown in FIG. 12(c), if the amount of flakes (anisometric members 32) contained in the medium 31 is large and the surface of the substrate 10 can be covered by flakes when the flakes are in a horizontal orientation, then, as a result of the reflective surfaces of the respective flakes, an even surface (even reflective surface) is perceived. Thus, it is possible to attain a highly mirrored display (mirror reflection light, minor reflection display).

By switching which substrate to which the flakes stick when the flakes are in a horizontal orientation, the characteristics of light emitted from the substrate 10 can be changed.

Therefore, by switching the electrodes to which voltage is applied as in the present modification example, by disposed a black light-absorption layer 76 on the rear surface side, for example, the display device 1 can switch between black display (vertical orientation shown in FIG. 12(a)), white display (horizontal orientation shown in FIG. 12(b)), and minor reflection display (horizontal orientation shown in FIG. 12(c)).

As described above, according to the present embodiment, when performing reflective display (horizontal orientation), by switching the electrodes to which voltage is applied, the anisometric members 32 (Al flakes in this case) can be switched between being oriented towards the display surface side substrate and being oriented towards the rear surface side substrate.

If interdigital electrodes are provided both on the substrate 10 on the display surface side and the substrate 70 on the rear surface side, the voltage applied to the uniformly planar electrodes 12 and 72 and the interdigital electrodes 14, 15, 74, and 75 can be set in a manner similar to that of a configuration in which the uniformly planar electrodes 12 and 22 and the interdigital electrodes 14 and 15 are provided. Namely, when a voltage is to be applied to the uniformly planar electrodes 12 and 72, the interdigital electrodes 14, 15, 74, and 75 are insulated, when a voltage is to be applied to the interdigital electrodes 14 and 15, the uniformly planar electrodes 12 and 72 and the interdigital electrodes 74 and 75 are insulated, and when a voltage is to be applied to the interdigital electrodes 74 and 75, the uniformly planar electrodes 12 and 72 and the interdigital electrodes 14 and 15 are insulated, for example.

<Modification Example 3 of Display Device>

Figure 13:
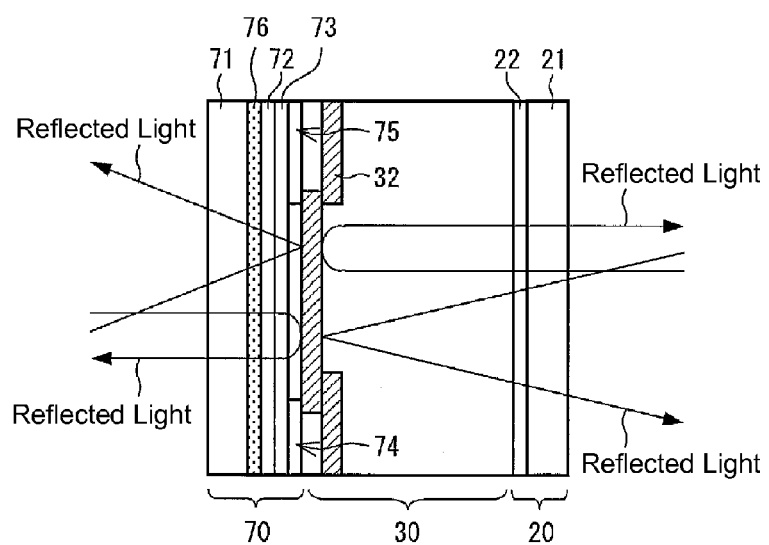
Figure 13:
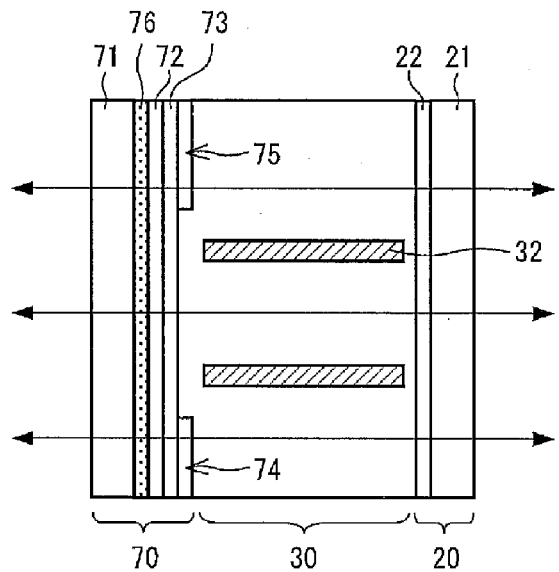

FIGS. 13(a) and 13(b) are cross-sectional views of a main portion of the display panel 2 showing a light progression state when the display panel 2 shown in FIGS. 7(a) and 7(b) is configured as a see-through type.

As shown in FIG. 13(a), in the display device 1 shown in FIGS. 7(a) and 7(b), if the light-absorption layer 76 is a transparent layer or if the light-absorption layer 76 is omitted and the substrates 20 and 70 are transparent substrates, then it is possible to have external light entering the light modulation layer 30 be reflected off of the anisometric members 32 to the rear (towards the substrate 70), and thus, reflective display is possible. In such a case, when the anisometric members 32 are in a horizontal orientation, either the reflective color of the anisometric members 32 or black is perceived by the viewer.

As shown in FIG. 13(b) when the anisometric members 32 are in a vertical orientation, the viewer can see through the display panel 2 to the side opposite to where the viewer is, and thus, a so-called see-through display panel can be attained. In this manner, the display device 1 and the display panel 2 are suitable for display windows, for example.

As shown in FIGS. 13(a) and 13(b), for example, cases were described in which the display device 1 shown in FIGS. 7(a) and 7(b) was provided with a transparent light-absorption layer 76 or not provided with a light-absorption layer 76 at all, but the present embodiment is not limited thereto.

A see-through display panel can be attained by having the light-absorption layer 76 or the light-absorption layer 23 be transparent layers, by omitting the light-absorption layer 76, and by interposing the light modulation layer 30 between a pair of transparent substrates in the display panel 2 shown in FIGS. 9(a) and 9(b) or the display panel 2 shown in FIGS. 11(a) to 11(c) also.

<Other Modification Examples>

If color filters are to be provided by forming color filters on the substrate on the display surface side (substrate 10 in FIGS. 9(a), 9(b), 11(a), and 11(b), for example) in FIGS. 7(a), 7(b), 9(a), 9(b), and 11(a) to 11(c), such as by providing color filters between the substrate 11 and the uniformly planar electrode 12, then, in a configuration in which the flakes are oriented to the substrate 70 on the viewer side as shown in FIGS. 9(b) and 11(c), it is possible to mitigate parallax between the light modulation layer 30 and the color filters. As a result, high quality color display can be attained.

The display device 1 of the present embodiment may have a configuration in which a light-reflective layer that completely reflects or scatters and reflects light is provided instead of a light-absorption layer (light-absorption layer 76 or light-absorption layer 23) on the rear surface side of the display panel 2, with the flakes being made of colored members, the display device 1 performing color display by the flakes when they are in a horizontal orientation, and reflective display by the reflective layer when the flakes are in a vertical orientation.

The display device 1 of the present embodiment can also be disposed on the non-display surface (the body surface or the like, which is not generally the image display surface) of a mobile phone or the like. If, in such a mobile phone, the respective electrodes of the display device 1 are transparent electrodes, when the flakes are in a vertical orientation, the color of the body of the mobile phone can be displayed in the non-display surface, whereas when the flakes are in a horizontal orientation, it is possible to display the color of the flakes in the non-display surface or reflect external light. It is possible to have the flakes be oriented in a horizontal orientation so as to be used as a minor (minor reflection).

<Embodiment 3>

Another embodiment of the present invention is as described with reference to FIGS. 14(a) and 14(b).

Differences from Embodiments 1 and 2 will mainly be described below, and components having the same function as those described in Embodiments 1 and 2 are assigned the same reference characters and descriptions thereof will be omitted.

<Schematic Configuration of Display Device>

Figure 14:
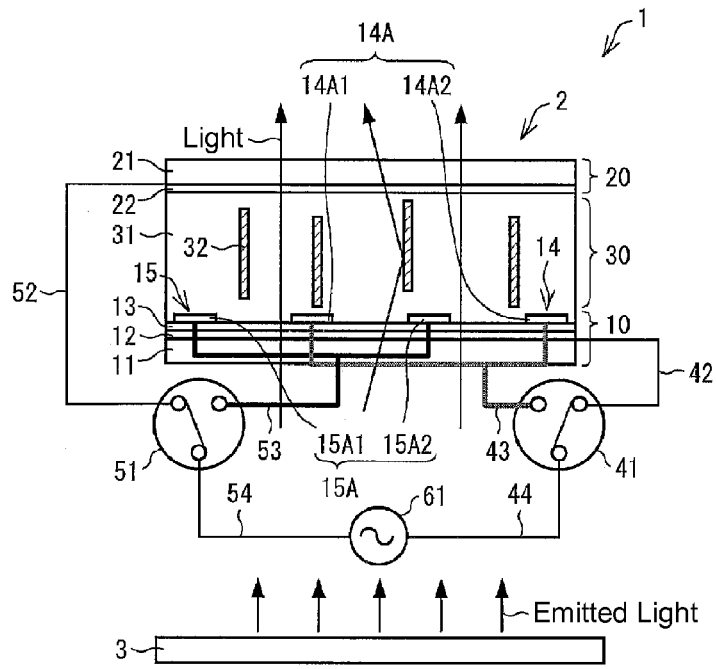
FIGS. 14(a) and 14(b) are cross-sectional views that show a schematic configuration of a display device of Embodiment 3.
Figure 14:
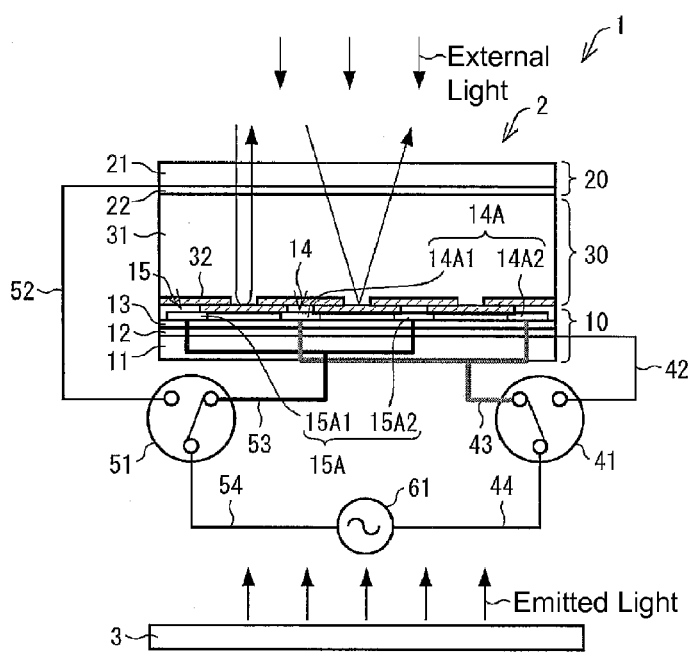

FIGS. 14(a) and 14(b) are cross-sectional views showing a schematic configuration of the display device 1 of the present embodiment; FIG. 14(a) shows a light-transmissive state, and FIG. 14(b) shows a light-reflective state.

The display device 1 of the present embodiment, as shown in FIGS. 14(a) and 14(b), is a so-called transflective display device that includes a display panel 2, a backlight 3 that radiates light to the display panel 2, and driver circuits that are not shown, and that performs display by having light emitted from the backlight 3 pass through the display panel 2 and performs display by reflecting external light entering the light modulation layer 30.

The display panel 2 of the present embodiment, as one example, includes a pair of substrates 10 and 20 disposed opposite to each other, and a light modulation layer 30 disposed between the pair of substrates 10 and 20.

In the present embodiment, an example is described in which the substrate 10 is disposed on the rear surface side of the display panel 2, and the substrate 20 is disposed on the display surface side (viewer side), but as shown in Embodiments 1 and 2, the present embodiment is not limited thereto.

As shown in FIGS. 14(a) and 14(b), the configuration of the substrates 10 and 20 is the same as the substrates 10 and 20 of Embodiment 1.

The configuration of the light modulation layer 30 and the anisometric members 32 is the same as in Embodiment 2. In the present embodiment also, a case will be described as an example in which flakes (Al flakes) are used as an example of the anisometric members 32.

The display device 1 of the present embodiment uses transparent electrodes for the uniformly planar electrodes 12 and 22 and the interdigital electrodes 14 and 15 on the substrates 10 and 20, and uses transparent substrates for the insulating substrates 11 and 21, and thus, as shown in FIG. 14(a), when a voltage is applied between even uniformly planar electrodes 12 and 22 that face each other, the flakes rotate to a vertical orientation such that the long axes of the flakes are parallel to the lines of electric force due to dielectrophoretic force and Coulomb's force, or electrical energy. As a result, light entering the light modulation layer 30 from the backlight 3 passes through the light modulation layer 30 and to the viewer side as shown in FIG. 14(a). In this manner, transmissive display is achieved.

On the other hand, if, as shown in FIG. 14(b), a voltage at or above a certain amount is applied to the interdigital electrodes 14 and 15, which interlock with each other and are on the same plane, the flakes enter a horizontal orientation so as to stick to the substrate 10 in the vicinity of the interdigital electrodes 14 and 15 due to electrophoretic force or Coulomb's force. Thus, the external light that has entered the light modulation layer 30 is reflected by the flakes to the direction from which the light came (display surface side). As a result, reflective display is achieved.

The transflective display device 1 of the present embodiment is not limited to the above-mentioned configuration and may be configured as follows.

The display device 1 performs transmissive display using the backlight in relatively dark locations such as indoors (transmissive mode), whereas it performs reflective display using external light in relatively bright locations such as outdoors (reflective mode). As a result, a high contrast display can be attained regardless of the brightness of the surrounding environment. In other words, the display device 1 can perform display under varying brightness conditions (light environments) regardless of whether the device is indoors or outdoors, and thus, the display device 1 is suitable as a mobile device such as a mobile phone, a PDA (personal digital assistant), or a digital camera.

In such a display device 1, each pixel in the display panel 2 has formed therein a reflective display unit used in reflective mode and a transmissive display unit used in transmissive mode. On the substrate 10 on the rear surface side of the display panel 2, transparent electrodes made of ITO or the like are formed in the transmissive display units as the interdigital electrodes 14 and 15, and reflective electrodes made of aluminum or the like are formed in the reflective display units, and a transparent electrode made of ITO or the like is formed as the uniformly planar electrode 12. On the other hand, the uniformly planar electrode 22 made of ITO or the like, which faces these electrodes, is formed on the substrate 20 on the display surface side. The light modulation layer 30 has therein anisometric members 32, and the anisometric members 32 are made of a material that does not reflect visible light.

The display device 1 also includes sensors for detecting the surrounding brightness, and has a configuration allowing it to switch between transmissive display mode and reflective display mode depending on the surrounding brightness. In such a case, the backlight can be turned off during reflective display mode, thus allowing a reduction in energy consumption.

As described above, the display device 1 of the present embodiment has a configuration that allows it to perform display, switching between reflective display mode and transmissive display mode. Therefore, modifications similar to those of Embodiments 1 and 2 are naturally possible in the present embodiment also.

<Embodiment 4>

Another embodiment of the present invention is as described with reference to FIGS. 15(a) and 15(b).

Differences from Embodiments 1 to 3 will mainly be described below, and components having the same function as those described in Embodiments 1 to 3 are assigned the same reference characters and descriptions thereof will be omitted.

<Schematic Configuration of Display Device>

Figure 15:
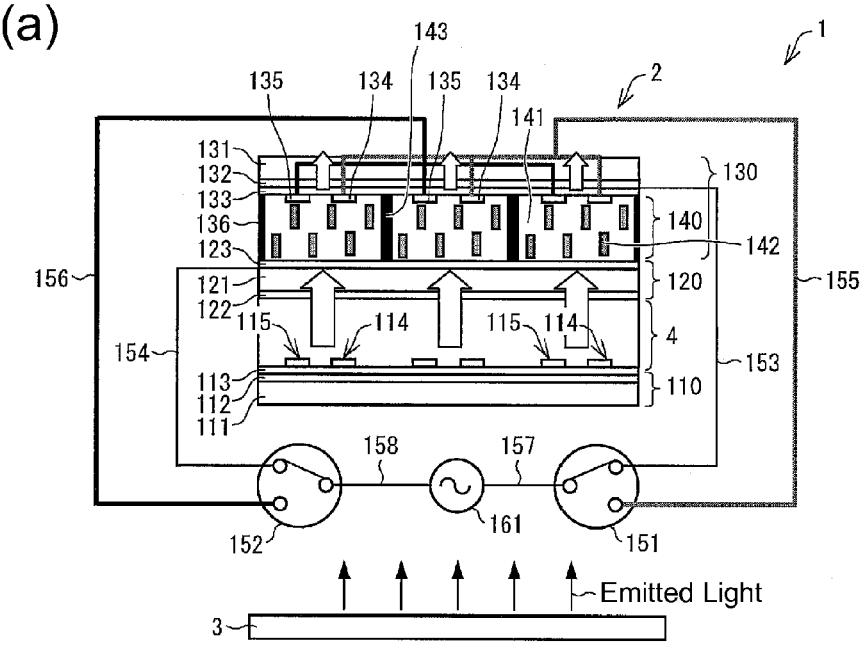
FIGS. 15(a) and 15(b) are cross-sectional views that show a schematic configuration of a display device of Embodiment 4.
Figure 15:
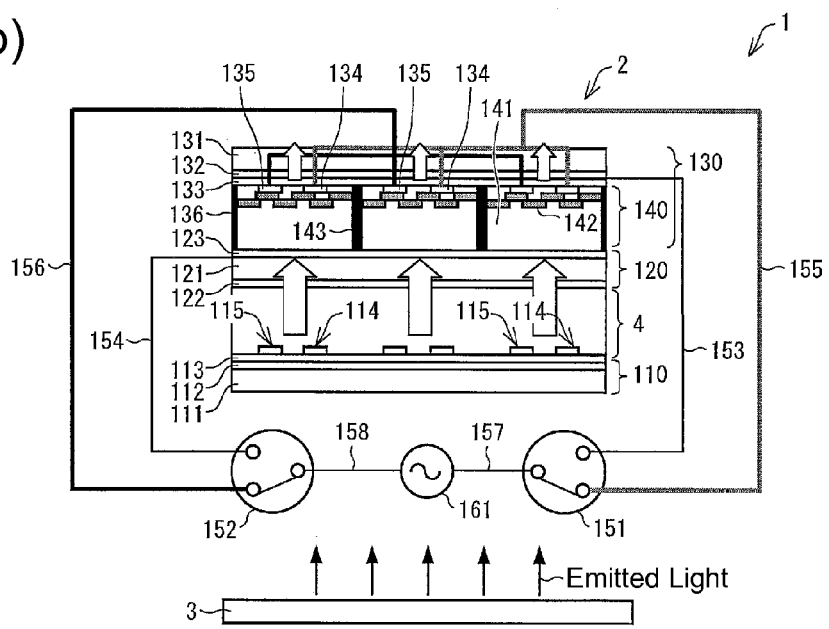

FIGS. 15(a) and 15(b) are cross-sectional views showing a schematic configuration of the display device 1 of the present embodiment; FIG. 15(a) shows a state in which a vertical electric field is applied, and FIG. 15(b) shows a state in which a horizontal electric field is applied.

As shown in FIGS. 15(a) and 15(b), the display device 1 of the present embodiment is a display device that performs color display and includes a display panel 2, a backlight 3 that radiates light to the display panel 2, and driver circuits that are not shown.

The display panel 2 of the present embodiment includes a substrate 110 (first substrate), a substrate 120 (second substrate), a substrate 130 (third substrate), an information display light modulation layer 4 disposed between the substrates 110 and 120, and at least relay circuits 151 and 152 (switching circuits) and a power source circuit 161.

The substrate 110 is disposed on the rear surface side of the display panel 2, the substrate 130 is disposed on the display surface side (viewer side), and the substrate 120 is disposed between the substrate 110 and the substrate 120. The display panel 2 has a plurality of pixels arranged in a matrix.

<Substrate 110>

The substrate 110 is an active matrix substrate, and includes, on an insulating substrate 111, various signal lines (scan signal lines, data signal lines, etc.), switching elements such as TFTs (thin film transistors), and an insulating film, which are not shown, and on these, a lower electrode that is a uniformly planar electrode 112, an insulating layer 113, and upper electrodes including interdigital electrodes 114 and 115 are layered in this order.

For ease of description, the insulating substrate 111, the uniformly planar electrode 112, the insulating layer 113, and the interdigital electrodes 114 and 115 are assigned modified reference characters, but these are respectively the same as the insulating substrate 11, the uniformly planar electrode 12, the insulating layer 13, and the interdigital electrodes 14 and 15 in the display panel 2 shown in FIGS. 1(a) and 1(b).

Therefore, in the present embodiment, descriptions in Embodiment 1 of the insulating substrate 11, the uniformly planar electrode 12, the insulating layer 13, and the interdigital electrodes 14 and 15 can be applied as is to the insulating substrate 111, the uniformly planar electrode 112, the insulating layer 113, and the interdigital electrodes 114 and 115.

Also, descriptions of the electrode portions 14L and 15L, the gap portions 14S and 15S, the trunk electrodes 14B and 15B, and the branch electrodes 14A and 15A in the interdigital electrodes 14 and 15 can naturally be applied to the electrode portions 114L and 115L, the gap portions 114S and 115S, the trunk electrodes 114B and 115B, and the branch electrodes 114A and 115A of the interdigital electrodes 114 and 115.

Thus, in the present embodiment, descriptions of the insulating substrate 111, the uniformly planar electrode 112, the insulating layer 113, and the interdigital electrodes 114 and 115 will be omitted.

In FIGS. 15(a) and 15(b), for ease of description, for ease of description, not all interdigital electrodes 114 and 115 are shown, one set of interdigital electrodes 114 and 115, seen as the cross-sections of the respective branch electrodes, are shown for each color pixel, but the number of teeth of the interdigital electrodes 114 and 115 (branch electrodes 114A and 115A) provided in one pixel, like the interdigital electrodes 14 and 15, can be determined based on the pixel pitch, the L/S relations of the respective interdigital electrodes 114 and 115, and the like.

<Substrate 120>

The substrate 120 includes the uniformly planar electrodes 122 and 123 respectively on the front surface and rear surface of the insulating substrate 121 made of a transparent substrate such as glass.

The uniformly planar electrode 122 is formed evenly over almost the entire surface of the insulating substrate 121 facing the substrate 110.

The uniformly planar electrode 123 is formed evenly over almost the entire surface of the insulating substrate 121 facing the substrate 130.

The insulating substrate 121 and the uniformly planar electrodes 122 and 123 can respectively be designed similarly to the insulating substrate 21 and the uniformly planar electrode 22 on the display panel 2 shown in FIGS. 1(a) and 1(b). Therefore, descriptions of the insulating substrate 121 and the uniformly planar electrodes 122 and 123 will be omitted.

<Substrate 130>

The substrate 130 is an active matrix substrate, and includes, on an insulating substrate 131, various signal lines (scan signal lines, data signal lines, etc.), switching elements such as TFTs (thin film transistors), and an insulating film, which are not shown, and on these, a lower electrode that is a uniformly planar electrode 132, an insulating layer 133, an upper electrode including interdigital electrodes 134 and 135, and a color filter layer 140 are layered in this order.

Like, the insulating substrate 111, the uniformly planar electrode 112, the insulating layer 113, and the interdigital electrodes 114 and 115, the insulating substrate 131, the uniformly planar electrode 132, the insulating layer 133, and the interdigital electrodes 134 and 135 are the same as the insulating substrate 11, the uniformly planar electrode 12, the insulating layer 13, and the interdigital electrodes 14 and 15 of the display panel 2 shown in FIGS. 1(a) and 1(b).

Thus, in the present embodiment, descriptions of the insulating substrate 131, the uniformly planar electrode 132, the insulating layer 133, and the interdigital electrodes 134 and 135 will also be omitted.

Figure 16:
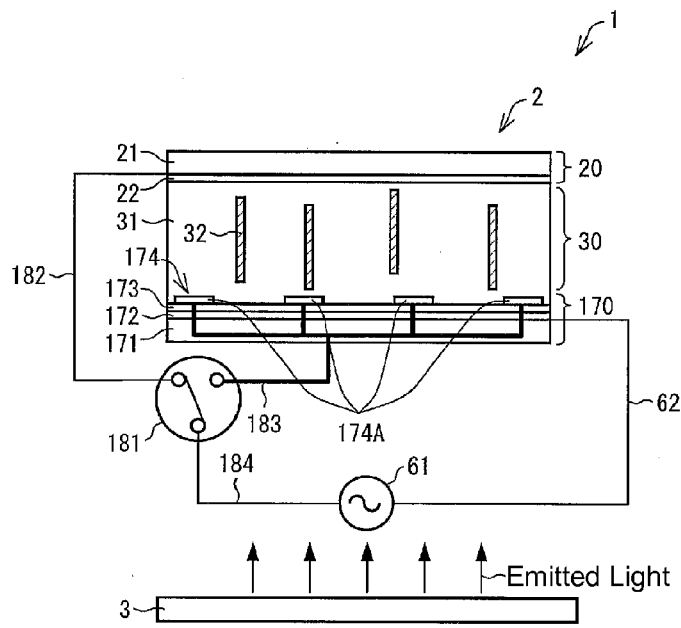
FIGS. 16(a) and 16(b) are cross-sectional views that show a schematic configuration of a display device of Embodiment 5.
Figure 16:
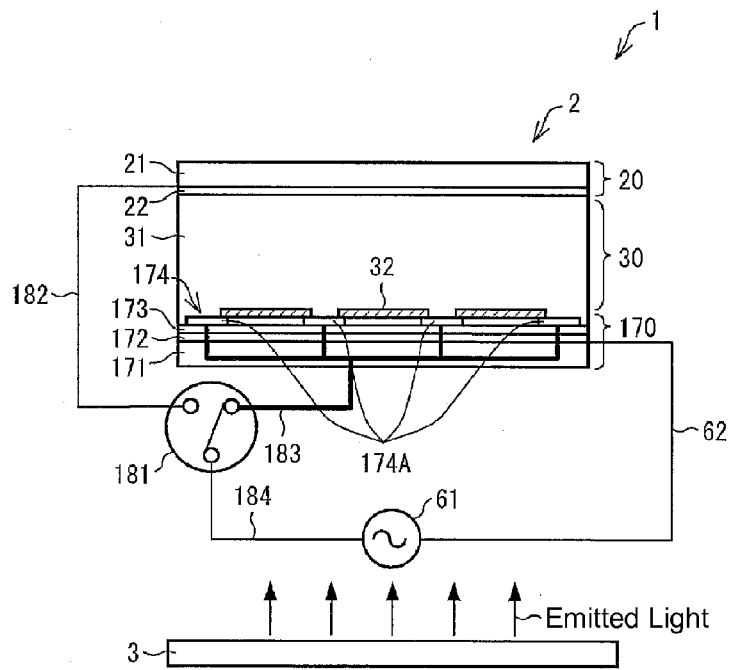

For ease of depiction, in FIGS. 15(a) and 16(a), like the interdigital electrodes 114 and 115, not all the interdigital electrodes 134 and 135 are shown, and one set of interdigital electrodes 134 and 135 seen here as the cross-sections of the branch electrodes are provided per color pixel, but like the interdigital electrodes 14, 15, 114, and 115, the number of teeth of the interdigital electrodes 134 and 135 (branch electrodes 134A and 135A) per pixel is determined based on the pixel pitch, the L/S relation of the respective interdigital electrodes 134 and 135, and the like.

<Color Filter Layer 140>

The color filter layer 140 is a light modulation layer and includes a medium 141, a plurality of anisometric members 142 contained in the medium 141, and ribs 143 for delineating the respective areas corresponding to the pixels.

The anisometric members 142 can include transparent resin flakes that are dyed or a pigmented, such as red (R), green (G), and blue (B) flakes. These flakes are disposed for each color within stripe-shaped ribs 143.

The manufacturing method can be a method in which a mixture of flakes and the medium is given different colors using an inkjet, or the like. Each color region is divided by ribs 143 so as to correspond to each pixel.

<Relay Circuits 151 and 152 and Power Source Circuit 161>

The relay circuits 151 and 152 are switching circuits that switch the direction of the electric field applied to the color filter layer 140 that is the light modulation layer, by selecting the electrodes to which voltage is applied.

The uniformly planar electrode 132 on the substrate 130 is electrically connected to the power source circuit 161 through the relay circuit 151 (first relay circuit). A wiring line 153 is provided between the uniformly planar electrode 132 and the relay circuit 151 to apply a voltage to the uniformly planar electrode 132.

The uniformly planar electrode 123 on the substrate 120 is electrically connected to the power source circuit 161 through the relay circuit 152 (second relay circuit). A wiring line 154 for applying a voltage to the uniformly planar electrode 123 is provided between the uniformly planar electrode 123 and the relay circuit 152.

The interdigital electrodes 134 and 135 are electrically connected to the power source circuit 161 respectively through the relay circuits 151 and 152. A wiring line 155 for applying a voltage to the interdigital electrodes 134 is provided between the interdigital electrodes 134 and the relay circuit 151. A wiring line 156 for applying a voltage to the interdigital electrodes 135 is provided between the interdigital electrodes 135 and the relay circuit 152.

A wiring line 157 connecting the relay circuit 151 to the power source circuit 161 is provided between the relay circuit 151 and the power source circuit 161. A wiring line 158 connecting the relay circuit 152 to the power source circuit 161 is provided between the relay circuit 152 and the power source circuit 161.

In the present embodiment, the relay circuits 151 and 152 switch the electrodes, among the uniformly planar electrodes 123 and 132 and the interdigital electrodes 134 and 135, to which the voltage is applied.

In other words, the relay circuits 151 and 152, the power source circuit 161, and the respective wiring lines 153 to 158 function as electric field application direction changing circuits that change the direction of the electric field applied to the color filter layer 140, and function as voltage applying units that selectively apply voltage to the uniformly planar electrodes 123 and 132 and the interdigital electrodes 134 and 135. The relay circuits 151 and 152 function as switching circuits (selection circuits) that select (switch) the electrode to which voltage is applied from among the uniformly planar electrodes 123 and 132 and the interdigital electrodes 134 and 135 provided on the substrates 120 and 130.

By having the relay circuit 151 perform switching such that the power source circuit 161 and the uniformly planar electrode 132 are connected and having the relay circuit 152 perform switching such that the power source circuit 161 and the uniformly planar electrode 123 are connected, as shown in FIG. 15(a), for example, a vertical electric field perpendicular to the substrates 120 and 130 is applied to the color filter layer 140 (light modulation layer).

On the other hand, by having the relay circuit 151 perform switching such that the power source circuit 161 and the interdigital electrodes 134 are connected and having the relay circuit 152 perform switching such that the power source circuit 161 and the interdigital electrodes 135 are connected, a horizontal electric field parallel to the substrates 120 and 130 is applied to the color filter layer 140 (light modulation layer).

The relay circuits 151 and 152 receive switching signals that switch the electrodes to which voltage is applied from a signal source that is not shown, for example, and thus, perform switching based on the received switching signal.

<Information Display Light Modulation Layer 4>

The information display light modulation layer 4 may have the same configuration as the light modulation layer 30 shown in Embodiments 1 to 3, or may be a layer made of a general display medium such as a liquid crystal layer. If the information display light modulation layer 4 is a liquid crystal layer or the like, then pixel electrodes may be provided instead of the interdigital electrodes 114 and 115 and the uniformly planar electrode 112.

If the light modulation layer 30 is provided as the information display light modulation layer 4, then a relay circuit (not shown) needs to be provided to switch the direction of the electric field applied to the light modulation layer 30, or in other words, the information display light modulation layer 4 by selecting the electrode from among the uniformly planar electrodes 112 and 122 and the interdigital electrodes 114 and 115 to which a voltage is applied.

As described above, the uniformly planar electrodes 112 and 122 and the interdigital electrodes 114 and 115 have the same configuration respectively as the uniformly planar electrodes 12 and 22 and the interdigital electrodes 14 and 15.

Therefore, it is possible to use relay circuits similar to the relay circuits 41 and 51 shown in FIGS. 1(a) and 1(b) as the relay circuits used to switch the direction of the electric field applied to the information display light modulation layer 4 by selecting the electrodes from among the uniformly planar electrodes 112 and 122 and the interdigital electrodes 114 and 115 to which a voltage is applied.

Similarly, the wiring lines connecting the power source circuit, which is the source of voltage applied to the uniformly planar electrodes 112 and 122 and the interdigital electrodes 114 and 115, to the respective relay circuits, the uniformly planar electrodes 112 and 122, and the interdigital electrodes 114 and 115, and wiring lines connected the respective relay circuits to the power source circuit can be configured in a manner similar to the power source circuit 61 and the wiring lines 42 to 44 and 52 to 54 shown in FIGS. 1(a) and 1(b).

<Color Display>

If color display is performed in such a display device 1 and a display panel 2, the flakes are horizontally oriented such that light entering the color filter layer 140 passes through the flakes of the respective colors. On the other hand, when performing black and white display, the flakes are vertically oriented such that light entering the color filter layer 140 directly reaches the viewer. By doing so, when performing transmissive display, for example, it is possible to perform color display, and when displaying black and white content such as electronic books, it is possible to reduce power consumed by the backlight due to being able to mitigate light loss due to the color filters. Also, when performing reflective display, it is possible to perform color display, and in a dark low visibility environment, it is possible to perform display focusing on brightness by performing black and white display.

In this manner, according to the configuration above, it is possible to attain a display device 1 by which it is possible to switch between black and white display and color display.

The insulating substrate 121 and the uniformly planar electrode 123 on the substrate 120, the substrate 130, and the color filter layer 140 that is the light modulation layer sandwiched therebetween can be used as independently as a color filter element, or, as described above, as a color filter element-integrated display panel in which the color filter element is integrally formed with the information display panel.

The color filter layer 140 is not limited to the configuration above, and may include at least some of the following: red anisometric members, green anisometric members, blue anisometric members, cyan (C) anisometric members, magenta (M) anisometric members, and yellow (Y) anisometric members. In addition, the color filter layer 140 may include areas where the anisometric members are not included. In other words, when considering color reproduction when displaying images, it is preferable that the plurality of anisometric members 142 be made of a transparent resin, and that they include at least red (R) anisometric members, green (G) anisometric members, and blue (B) anisometric members.

It is naturally possible to apply modifications similar to those of Embodiments 1 to 3 even when such a light modulation layer 30 is used as color filters.

<Embodiment 5>

Another embodiment of the present invention is as described with reference to FIGS. 16(a), 16(b), and 17.

Differences from Embodiments 1 to 4 will mainly be described below, and components having the same function as those described in Embodiments 1 to 4 are assigned the same reference characters and descriptions thereof will be omitted.

<Schematic Configuration of Display Device>

FIGS. 16(a) and 16(b) are cross-sectional views showing a schematic configuration of the display device 1 of the present embodiment; FIG. 16(a) shows a light-transmissive state, and FIG. 16(b) shows a light-reflective state.

In FIGS. 16(a) and 16(b), a transmissive display device that includes a display panel 2, a backlight 3 that radiates light to the display panel 2, and driver circuits that are not shown, display being performed by having light radiated from the backlight 3 pass through the display panel 2, is described as an example. However, as shown in Embodiments 1 to 4, the present embodiment is not limited thereto.

The display panel 2 of the present embodiment includes a pair of substrates 170 and 20 disposed opposite to each other, and a light modulation layer 30 disposed between the pair of substrates 170 and 20, and also includes a relay circuit 181 (switching circuit) that switches the direction of the electric field applied to the light modulation layer 30 by selecting the electrodes to which voltage is applied, and a power source circuit 61.

In the present embodiment, an example is described in which the substrate 170 is disposed on the rear surface side of the display panel 2, and the substrate 20 is disposed on the display surface side (viewer side), but the present embodiment is not limited thereto.

As shown in FIGS. 16(a) and 16(b), the configuration of the substrates 170 and 20 and the configuration of the light modulation layer 30 is the same as that of the substrates 10 and 20 and the light modulation layer 30 shown in FIGS. 1(a) and 1(b).

<Substrate 170>

The substrate 170 is an active matrix substrate. The substrate 170 has a configuration in which various signal lines (scan signal lines, data signal lines, etc.), switching elements such as TFTs (thin film transistors), and an insulating film are included on an insulating substrate 171, and on these, a lower electrode that is a uniformly planar electrode 172 (first electrode), an insulating layer 173, and an upper electrode including interdigital electrodes 174 (second electrodes) are layered in this order.

The uniformly planar electrode 172 is formed evenly over almost the entire surface of the insulating substrate 171 facing the substrate 20 so as to cover the display region of the substrate 170.

The insulating layer 173 is formed in a uniformly planar shape over the entire display region of the substrate 170 so as to cover the uniformly planar electrode 172.

The configuration of the insulating substrate 171, the uniformly planar electrode 172, and the insulating layer 173 is the same as the insulating substrate 11, the uniformly planar electrode 12, and the insulating layer 13 shown in FIGS. 1(a) and 1(b).

Figure 17:
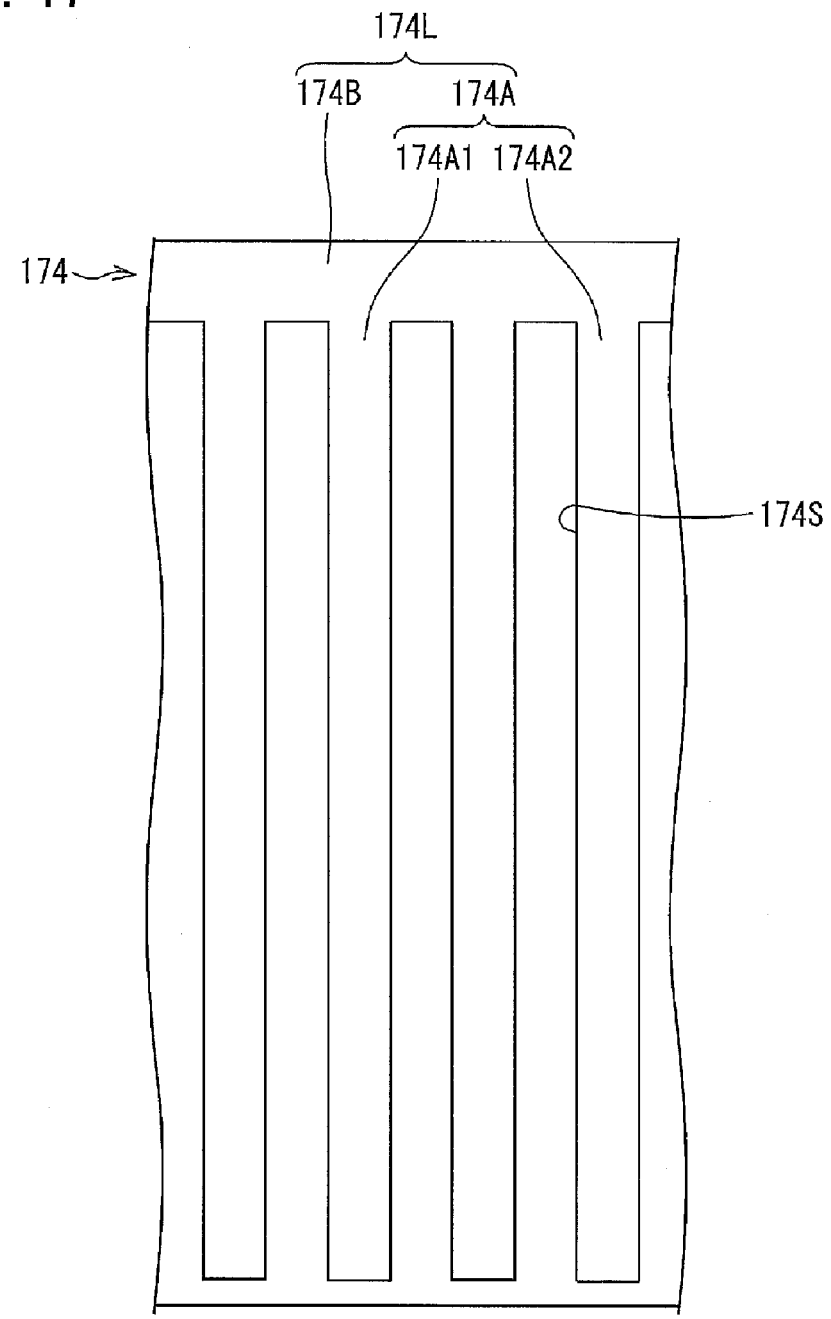
FIG. 17 is a plan view showing a schematic configuration of interdigital electrodes shown in FIGS. 6(a) and 6(b).

FIG. 17 is a plan view of the substrate 170 showing a schematic configuration of the interdigital electrodes 174.

As shown in FIG. 17, the interdigital electrode 174 is a comb-shaped electrode having patterned electrode portions 174L (electrode line) and gap portions 174S (portions where no electrode is formed), and more specifically, is constituted of a trunk electrode 174B (trunk line) and branch electrodes 174A (branch lines) corresponding to the teeth of the comb that extend from the trunk electrode 174B.

In FIGS. 16(a) and 16(b), the cross-sections of the branch electrodes 174A are shown as the cross-section of the interdigital electrode 174.

There is no special limitation on the number of teeth (branch electrodes 14A) of the interdigital electrodes 174 provided per pixel, and the number is determined by pixel pitch, the respective L/S relations of the interdigital electrodes 174, and the like. Here, L refers to the electrode width between adjacent branch electrodes 174A of the electrode portion 174, and S refers to the width of the gap portion 174S.

Therefore, the number of branch electrodes 174A is, in reality, determined by the pixel pitch, the width of the branch electrodes 174A, and the gap between adjacent branch electrodes 174A.

The respective branch electrodes 174A may be linear in shape, V-shaped, or in a zigzag pattern.

The uniformly planar electrode 172 is a common electrode, and is connected to a common wiring line formed in the periphery of the display region.

The interdigital electrodes 174 are pixel electrodes, and are connected to signal lines (scan signal lines, data signal lines) and switching elements such as TFTs through drain electrodes that are not shown, and a signal based on an image signal is applied to the interdigital electrodes 174.

<Relay Circuit 181 and Power Source Circuit 61>

The uniformly planar electrode 22 on the substrate 20 of the present embodiment is electrically connected to the power source circuit 61 through the relay circuit 181. A wiring line 182 is provided between the uniformly planar electrode 22 and the relay circuit 181 to apply a voltage to the uniformly planar electrode 22.

The interdigital electrodes 174 are electrically connected to the power source circuit 61 through the relay circuit 181. A wiring line 183 for applying a voltage to the interdigital electrodes 174 is provided between the interdigital electrodes 174 and the relay circuit 181.

Also, a wiring line 184 connecting the relay circuit 181 to the power source circuit 61 is provided between the relay circuit 181 and the power source circuit 61. Also, a wiring line 54 connecting the relay circuit 51 to the power source circuit 61 is provided between the relay circuit 51 and the power source circuit 61.

On the other hand, the uniformly planar electrode 172 is electrically connected to the power source circuit 61 through the wiring line 62.

In the present embodiment, the electrode to which voltage is applied is switched between the uniformly planar electrode 22 on the substrate 20 and the interdigital electrodes 174 on the substrate 170 using the relay circuit 181.

In other words, the relay circuit 181, the power source circuit 61, and the respective wiring lines 62 and 182 to 184 function as an electric field application direction changing circuit that changes the direction of the electric field applied to the light modulation layer 30, and functions as a voltage applying unit that selectively applies voltage to the uniformly planar electrode 22 and the interdigital electrodes 174. The relay circuit 181 functions as a switching circuit (selection circuit) that selects (switches) the electrode to which voltage is applied between the uniformly planar electrode 22 and the interdigital electrodes 174 provided on the substrates 20 and 170.

As shown in FIG. 16(a), for example, a vertical electric field perpendicular to the substrates 20 and 170 is applied to the light modulation layer 30 by the relay circuit 181 performing switching such that the power source circuit 61 and the uniformly planar electrode 22 are connected and a voltage is applied between the uniformly planar electrodes 22 and 172.

On the other hand, as shown in FIG. 16(b), a horizontal electric field parallel to the substrate 170 is applied to the light modulation layer 30 by the relay circuit 181 performing switching such that the power source circuit 61 and the interdigital electrodes 174 are connected and a voltage is applied between the interdigital electrodes 174 and the uniformly planar electrode 172.

The relay circuits 181 may perform switching based on switching signals for switching the electrodes to which the voltage is applied, the switching signals being inputted from a signal source that is not shown, or the relay circuits 181 may perform switching by manual operation.

<Display Method for Display Panel 2 (Driving Method)>

As described above, according to the present embodiment, as described above, by reversibly switching between a vertical electric field formed between the uniformly planar electrodes 22 and 172 and a horizontal electric field formed between the uniformly planar electrode 172 and the interdigital electrode 174 (so-called fringe field), it is possible to reversibly switch the orientation of the anisometric members 32.

In other words, the display panel 2 and the display device 1 of the present embodiment performs FFS (fringe field switching) as the method of applying an electric field to attain a horizontal orientation.

In the present embodiment also, as shown in FIG. 16(a), for example, when a voltage is applied between the even uniformly planar electrodes 72 and 172, which face each other, the flakes rotate to be in a vertical orientation such that the long axes thereof are parallel to the lines of electric force due to dielectrophoretic force and Coulomb's force, or electrical energy. As a result, light entering the light modulation layer 30 from the backlight 3 passes through the light modulation layer 30 and to the viewer side as shown in FIG. 16(a).

On the other hand, as shown in FIG. 16(b), when a voltage at or above a certain amount is applied between the uniformly planar electrode 172 and the interdigital electrodes 174 provided on the same substrate (in this case, on the substrate 170), the flakes enter a horizontal orientation so as to stick to the substrate 170 in the vicinity of the interdigital electrodes 174 due to electrophoretic force or Coulomb's force. As a result, the light that enters the light modulation layer 30 from the backlight 3 is blocked by the flakes.

In the manner, in the present embodiment also, by switching the electrodes to which voltage is applied, it is possible to change the transmittance of light (amount of transmitted light) entering the light modulation layer 30 from the backlight 3.

When FFS driving is used as the method of applying an electric force in order to attain such a horizontal orientation, the voltage applied to the respective electrodes depends on the material and thickness of the insulating layer 173 or the distance between the interdigital electrodes 174, but it is preferable that this voltage be set to 1V to 10V.

<Design of Respective Layers in Display Panel 2>

Next, one example of design conditions for each layer in the display panel 2 of the present embodiment will be described.

As described above, the configuration of the substrates 10 and 20 and the configuration of the light modulation layer 30 are the same as that of the substrates 10 and 20 and the light modulation layer 30 shown in FIGS. 1(a) and 1(b). The configuration of the insulating substrate 171, the uniformly planar electrode 172, and the insulating layer 173 is the same as the insulating substrate 11, the uniformly planar electrode 12, and the insulating layer 13 shown in FIGS. 1(a) and 1(b).

Therefore, the materials and method of forming these layers can be similar to the materials and method of forming the respective corresponding layers in Embodiment 1.

Also, the material and method of forming the interdigital electrodes 174 can be similar to the material and method of forming the interdigital electrodes 14 of Embodiment 1.

However, if the electrode width of the interdigital electrodes 174 is L, the gap between the electrodes is S, and the cell gap (thickness of light modulation layer 30) is D, then if FFS driving as described above is used, then display is performed using the so-called fringe field with the gap between the electrodes S being less than the electrode width L and the cell gap D.

Therefore, the thickness of the respective layers can be set to be similar to the thickness, electrode width, and electrode gap of the corresponding respective layers in Embodiment 1 but this is set to satisfy the condition above.

According to the present embodiment, it is possible to apply an overall constant voltage during vertical orientation, and it is possible to have a simple circuit configuration for selectively switching between the respective electrodes by performing FFS driving as the voltage applying method to attain such horizontal orientation.

In the present embodiment, an example was described in which the rear surface side substrate is provided with the interdigital electrodes 14, but the interdigital electrodes may naturally be provided on the display surface side substrate, or on both rear surface side and display surface side substrates.

<Embodiment 6>

Figure 18:
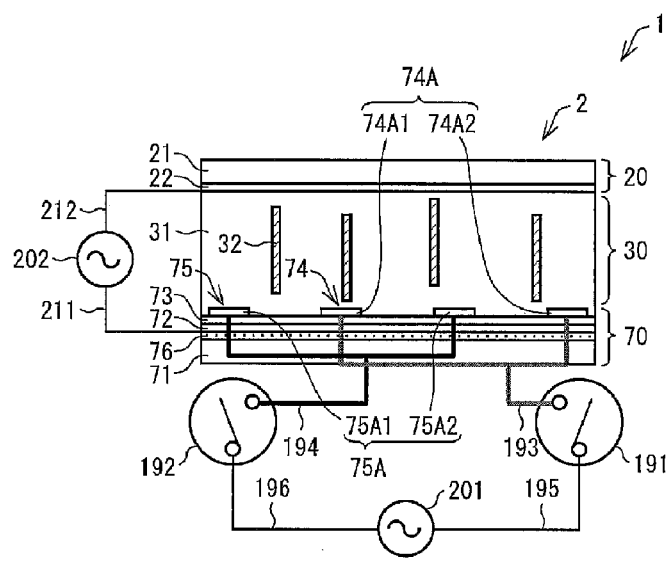
FIGS. 18(a) and 18(b) are cross-sectional views that show a schematic configuration of a display device of Embodiment 6.
Figure 18:
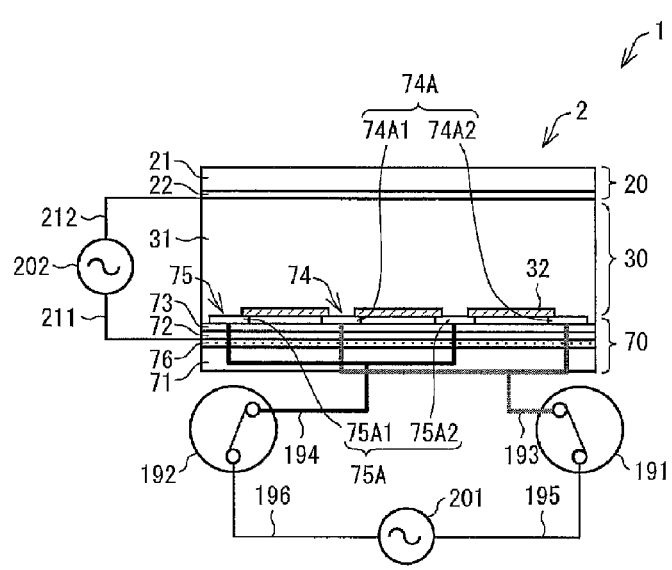

Another embodiment of the present invention is as described with reference to FIGS. 18(a) and 18(b).

Differences from Embodiments 1 to 5 will mainly be described below, and components having the same function as those described in Embodiments 1 to 5 are assigned the same reference characters and descriptions thereof will be omitted.

<Schematic Configuration of Display Device>

FIGS. 18(a) and 18(b) are cross-sectional views showing a schematic configuration of the display device 1 of the present embodiment; FIG. 18(a) shows a light-absorption state, and FIG. 18(b) shows a light-reflective state.

In FIGS. 18(a) and 18(b), a reflective display device that includes a display panel 2 and driver circuits that are not shown, and that performs display by reflecting external light incident on the display panel 2 will be described as an example. However, as shown in Embodiments 1 to 5, the present embodiment is not limited thereto.

The display panel 2 of the present embodiment includes a pair of substrates 70 and 20 facing each other and a light modulation layer 30 disposed between the pair of substrates 70 and 20, and additionally includes switching circuits 191 and 192 and power source circuits 201 and 202.

In the present embodiment, an example is described in which the substrate 70 is disposed on the rear surface side of the display panel 2, and the substrate 20 is disposed on the display surface side (viewer side), but the present embodiment is not limited thereto.

As shown in FIGS. 18(a) and 18(b), the configuration of the substrates 70 and 20 and the configuration of the light modulation layer 30 is the same as that of the substrates 70 and 20 and the light modulation layer 30 shown in FIGS. 7(a) and 7(b).

The configuration of the light modulation layer 30 and the anisometric members 32 is also the same as in Embodiment 2. Therefore, descriptions of these configurations will be omitted.

<Switching Circuits 191 and 192 and Power Source Circuits 201 and 202>

The switching circuits 191 and 192 are switching circuits that switch the direction of the electric field applied to the light modulation layer 30.

The interdigital electrodes 74 on the substrate 70 are electrically connected to the power source circuit 201 through the switching circuit 191 (first switching circuit).

The interdigital electrodes 75 on the substrate 70 are electrically connected to the power source circuit 201 through the switching circuit 192 (second switching circuit).

A wiring line 193 for applying a voltage to the interdigital electrodes 74 is provided between the interdigital electrodes 74 and the switching circuit 191.

A wiring line 194 for applying a voltage to the interdigital electrodes 75 is provided between the interdigital electrodes 75 and the switching circuit 191.

A wiring line 195 connecting the switching circuit 191 to the power source circuit 201 is provided between the switching circuit 191 and the power source circuit 201. A wiring line 196 connecting the switching circuit 192 to the power source circuit 201 is provided between the switching circuit 192 and the power source circuit 201.

The uniformly planar electrode 72 on the substrate 70 and the uniformly planar electrode 22 on the substrate 20 are electrically connected to the power source circuit 202 respectively through wiring lines 211 and 212.

The switching circuits 191 and 192 switch between applying or not applying a voltage from the power source circuit 201 to the interdigital electrodes 74 and 75 to switch between applying or not applying a horizontal electric field to the light modulation layer 30.

That is, the switching circuits 191 and 192, the power source circuit 201, and the respective wiring lines 193 to 196 function as an electric field application direction changing circuit that changes the direction of the electric field applied to the light modulation layer 30, and function as a voltage application circuit that selectively applies a voltage to the interdigital electrodes 74 and 75 when changing the direction of the electric field applied to the light modulation layer 30.

<Display Method for Display Panel 2 (Driving Method)>

In the display panel 2 and the display device 1 of the present embodiment, during light modulation layer driving (that is, when a voltage is applied to the display panel 2; or in other words, when the power to the display panel 2 is switched ON), while a constant voltage is applied from the power source circuit 202 to the uniformly planar electrodes 72 and 22 causing a vertical electric field of constant strength to be applied to the light modulation layer 30 by the uniformly planar electrodes 72 and 22, the switching circuits 191 and 192 and the power source circuit 201 control whether or not a horizontal electric field is applied to the light modulation layer 30, and, in a preferred aspect, the size of the horizontal electric field.

At this time, a voltage to form a horizontal electric field stronger than the vertical electric field is applied to the interdigital electrodes 74 and 75.

If, as shown in FIG. 18(a), the switching circuits 191 and 192 are put in an open state to turn OFF the power, an overall even vertical electric field can be applied to the light modulation layer 30 by the uniformly planar electrodes 72 and 22. As a result, the flakes (anisometric members 32) can be rotated to a vertical orientation such that the long axes thereof are parallel to the lines of electric force.

On the other hand, if, as shown in FIG. 18(b), the switching circuits 191 and 192 are put in a closed state to turn the power ON, then if a horizontal electric field stronger than the vertical electric field is formed by the interdigital electrodes 74 and 75, the orientation of the flakes (anisometric members 32) is determined by the balance between the horizontal electric field and the vertical electric field. Therefore, when a horizontal electric field sufficiently strong in relation to the vertical electric field is applied, the flakes can be put in a horizontal orientation to stick to the substrate 70.

In FIG. 18(b), a case was shown in which the flakes are in a horizontal orientation to stick to the substrate 70, but according to the present embodiment, the orientation of the flakes is determined as described above by the balance in strength between the vertical electric field and the horizontal electric field, and thus, the size of the horizontal electric field when a horizontal electric field is being applied, or in other words, the size of the voltage applied to the interdigital electrodes 74 and 75 can be adjusted (controlled) such that halftone display can be performed with ease.

Only in a case in which a constant strength vertical electric field is always applied to the light modulation layer 30 by the uniformly planar electrodes 72 and 22 in this manner and a mode in which incident light is reflected (reflective display time) is selected is it preferable that the electric field formed by the voltage applied to the uniformly planar electrodes 72 and 22 and the interdigital electrodes 74 and 75 be 0.01 to 0.1V/μm and 0.2 to 1V/μm respectively, for example, when a horizontal electric field stronger than the vertical electric field is applied by the interdigital electrodes 74 and 75, although this depends on the materials used or detailed configurations.

Also, in the present embodiment, only when a constant strength vertical electric field is always applied by the uniformly planar electrodes 72 and 22 on the light modulation layer 30 and a mode in which incident light is reflected (reflective display time) is selected is a horizontal electric field stronger than the vertical electric field applied by the interdigital electrodes 74 and 75, but the present embodiment is not limited thereto. For example, a configuration may be adopted in which a vertical electric field stronger than the horizontal electric field is applied by the uniformly planar electrodes 72 and 22 only when a mode in which incident light is transmitted (see Embodiment 1) or a mode in which incident light is absorbed (see Embodiment 2) is selected, with a constant strength horizontal electric field always being applied to the light modulation layer 30 by the interdigital electrodes 74 and 75, for example.

In other words, as described above, by using a switching circuit, for example, a configuration may be adopted in which either one of a vertical electric field or a horizontal electric field is always applied to the light modulation layer 30 with the other type of electric field being made stronger than the one electric field to switch between an electric field being applied or not applied.

In either case, the orientation of the flakes is determined by the balance in strength between the vertical electric field and the horizontal electric field, and thus, halftone display can be performed with ease.

It is preferable that the electric field formed by the voltage applied to the uniformly planar electrodes 72 and 22 and the interdigital electrodes 74 and 75 respectively be 0.5 to 1V/μm and 0.2 to 0.4V/μm if a vertical electric field stronger than the horizontal electric field is applied by the uniformly planar electrodes 72 and 22 only in a case in which an even strength horizontal electric field is always applied to the light modulation layer 30 by the interdigital electrodes 74 and 75 as described above and a mode is selected in which the light passes through or is absorbed, although the electric field depends on the materials used and detailed configurations.

In the present embodiment also, an example was described in which interdigital electrodes are formed only on one of the substrates, but a configuration may be used in which interdigital electrodes are provided on both substrates sandwiching the light modulation layer 30 and the substrate to which the flakes stick when the flakes are in a horizontal orientation is switched between the one substrate and the other substrate by providing the interdigital electrodes on both substrates with switching circuits such as those described above.

<Embodiment 7>

Another embodiment of the present invention is described as follows with reference to FIGS. 31(a) to 40(b).

Differences from Embodiments 1 to 6 will mainly be described below, and components having the same function as those described in Embodiments 1 to 6 are assigned the same reference characters and descriptions thereof will be omitted.

<Schematic Configuration of Display Device>

FIGS. 31(a) and 31(b) are cross-sectional views showing a schematic configuration of the display device 1 of the present embodiment; FIG. 31(a) shows a light-transmissive state, and FIG. 31(b) shows a light-reflective state.

In FIGS. 31(a) and 31(b), a transmissive display device that includes a display panel 2, a backlight 3 that radiates light to the display panel 2 (see FIGS. 1(a) and 1(b), and driver circuits that are not shown, display being performed by having light radiated from the backlight 3 pass through the display panel 2, is described as an example. However, as shown in Embodiments 1 to 6, the present embodiment is not limited thereto.

As shown in FIGS. 31(a) and 31(b), the configuration of the substrates 10 and 20 in the display device 1 of the present embodiment is the same as that of the substrates 10 and 20 in the display device 1 of Embodiment 1 shown in FIGS. 1(a) and 1(b).

The display device 1 of the present embodiment differs from the display device 1 of Embodiment 1 in terms of the material of the anisometric members 32 in the light modulation layer 30 and the display method (driving method) for the display panel 2.

<Anisometric Members 32>

In Embodiment 1, at least a portion of the anisometric member 32 was made of a dielectric body, whereas in the present embodiment, the anisometric members 32 (metal pieces) are made solely of metal.

One type of metal or a composite including two or more types of metals may be used for the anisometric members 32.

It is possible to choose aluminum flakes used in coating or the like, for example, as the metal pieces. However, as described above, aluminum generally has a tendency to form aluminum oxide, which is passive. Aluminum oxide is a dielectric body, and aluminum flakes having oxidized surfaces are no longer metal-only flakes.

Therefore, general aluminum flakes, even if they are flakes made of metal, are not metal-only flakes, and exhibit behavior that differs from metal-only flakes shown in Embodiment 1, for example, due to being dielectric-coated metal flakes (passive film-coated flakes; dielectric-coated metal flakes having surfaces covered in a dielectric film) in which the surface of the metal has formed thereon a dielectric film (passive film).

Thus, it is preferable that the metal used for the anisometric member 32 of the present embodiment be a metal with a high reflectance that is not susceptible to forming a passive layer. Silver is an example of such a metal.

In the present embodiment also, the projected area of the anisometric member 32 (maximum projected area:minimum projected area), the shape, the specific weight, the thickness, and the like are similar to the anisometric member 32 of Embodiment 1, and thus, descriptions thereof are omitted.

A case in which the anisometric members 32 include flakes made only of metal will be described as an example below in the present embodiment.

<Display Method for Display Panel 2 (Driving Method)>

In the present embodiment also, the orientation of the anisometric members 32 can be reversibly changed by reversibly switching between a vertical electric field formed between the uniformly planar electrodes 12 and 22 and a horizontal electric field formed between the interdigital electrodes 14 and 15, as done in Embodiment 1.

However, the rotation of anisometric members 32 made of a dielectric body with respect to the direction of the electric field is opposite to that of anisometric members 32 made of metal. Thus, if metal-only flakes (metal pieces) as described above are used as the anisometric members 32, then there is a need to reverse the electric field for when the flakes are rotated to a desired orientation compared to a case in which the flakes are made of a dielectric body or a dielectric-coated metal. Therefore, in the present embodiment, the direction of the electric field for when the anisometric members 32 are rotated in a desired direction is opposite to that of Embodiment 1.

Thus, in the present embodiment, if the relay circuits 41 and 51 receive from a signal source that is not shown a switching signal for switching the electrodes to which voltage is applied, for example, then the relay circuits 41 and 51 switch the electrodes to which a voltage is applied in a manner opposite to that of Embodiment 1 during transmissive display and reflective display.

In the present embodiment also, the relay circuits 41 and 51 naturally may perform switching based on switching signals for switching the electrodes to which the voltage is applied, the switching signals being inputted from a signal source that is not shown, or the relay circuits 41 and 51 may perform switching by manual operation.

As shown in FIG. 31(a), in the present embodiment, during transmissive display, the relay circuit 41 performs switching such that the power source circuit 61 and the interdigital electrodes 14 are connected, and the relay circuit 51 performs switching such that the power source circuit 61 and the interdigital electrodes 15 are connected, and thus, a horizontal electric field parallel to the substrates 10 and 20 is applied to the light modulation layer 30 during transmissive display.

If metal pieces that reflect visible light are used as the flakes, then as shown in FIG. 31(a), if a voltage is applied to the interdigital electrodes 14 and 15 that interlock with each other and are formed on the same plane, then dielectrophoretic force, Coulomb's force or electrical energy causes the flakes to enter an orientation such that the long axes thereof are perpendicular to the substrates 10 and 20 (vertical orientation) in the vicinity of the interdigital electrodes 14 and 15. Thus, the reflective surfaces of the flakes are perpendicular to the substrates 10 and 20.

Therefore, the light entering the light modulation layer 30 from the backlight 3 directly passes through the light modulation layer 30, or, after being reflected by the reflective surfaces of the flakes, passes towards the display surface side, which is a surface opposite to the light-receiving side.

On the other hand, as shown in FIG. 31(b), during reflective display, the relay circuit 41 performs switching such that the power source circuit 61 is connected to the uniformly planar electrode 12 and the relay circuit 51 performs switching such that the power source circuit 61 is connected to the uniformly planar electrode 22, and thus, during reflective display, a vertical electric field perpendicular to the substrates 10 and 20 is applied to the light modulation layer 30.

If a voltage is applied in this manner between the uniformly planar electrodes 12 and 22, which are uniform and face each other, then the flakes rotate such that the long axes thereof match a direction perpendicular to the lines of electric force. As a result, the flakes are oriented such that the reflective surfaces thereof are parallel to the substrates 10 and 20 (horizontal orientation). Therefore, the light entering the light modulation layer 30 from the backlight 3 is reflected off of the reflective surfaces of the flakes and does not pass towards the display surface side, which is the surface opposite to the light-receiving side. As a result, light traveling from the backlight 3 towards the light modulation layer 30 is blocked by the horizontally oriented flakes.

<Operational Principles of Anisometric Members 32>

Here, operational principles of the anisometric members 32 will be described below with reference to FIGS. 32(a) to 32(d).

FIGS. 32(a) to 32(d) are graphs showing results of calculating lines of electric force and equipotential lines when horizontal electric fields were respectively applied to light modulation layers 30 in display devices 1 in which metal-only flakes and dielectric-coated metal flakes were used in the anisometric members 32.

In FIGS. 32(a) to 32(b), Y indicates the distance in the thickness direction of the light modulation layer 30 (that is, the thickness direction of the substrates 10 and 20; up-and-down direction in FIGS. 31(a) and 31(b)), and X indicates the distance of a direction perpendicular to the thickness direction of the light modulation layer 30 (that is, the left-and-right direction in FIGS. 31(a) and 31(b), which is the in-plane direction of the substrates).

FIGS. 32(a) and 32(b) show a case in which silver flakes are used as flakes that are made of metal and that are not covered by a dielectric material, and FIGS. 32(c) and 32(d) show a case in which flakes that are silver (metal) coated in silica, which is a dielectric material, are used as the dielectric-coated metal flakes.

FIGS. 32(a) and 32(c) respectively show a state in which the flakes are in a horizontal orientation with a horizontal electric field being applied to the light modulation layer 30, and FIGS. 32(b) and 32(d) respectively show a state in which the flakes are in a vertical orientation with a vertical electric field being applied to the light modulation layer 30. Here, the states in which the flakes are in a horizontal orientation or in a vertical orientation indicate a state in which the long axis direction of the flake is set to be horizontal or vertical in an initialized state (when an electric field is not being applied). In FIGS. 32(a) to 32(d), the interdigital electrodes 15 on the lower substrate 10 are at 0V, and an alternating current (1.5V, 50 Hz) is applied between the interdigital electrodes 14 and the interdigital electrodes 15.

When comparing FIGS. 32(a) and 32(b), FIG. 32(b) shows the lines of electric force being at equal intervals without any major distortion to intersect perpendicularly with the flakes, whereas FIG. 32(a) shows a major distortion in the lines of electric force. In other words, FIG. 32(a) shows a state in which the energy is unstable and the flakes move to be in the vertical orientation shown in FIG. 32(b).

On the other hand, when comparing FIGS. 32(c) and 32(d), the lines of electric force in FIG. 32(c) are substantially parallel to the flake, whereas in FIG. 32(d), the lines of electric force are distorted. In other words, FIG. 32(d) shows a state in which the energy is unstable and the flakes move to be in the horizontal orientation shown in FIG. 32(c).

Also, although this is not shown, even if flakes made only of silica (that is, only a dielectric material) are used instead of flakes in which a dielectric material coats silver, the lines of electric force show a tendency similar to that shown in FIGS. 32(c) and 32(d).

From the results above, it can be seen that the orientation of the flakes changes depending on the material of the flakes.

In FIGS. 32(a) to 32(d), the uniformly planar electrodes 12 and 22 are omitted from depiction, but even if the uniformly planar electrodes 12 and 22 are present, the orientation of the flakes changes depending on the material of the flakes in a manner similar to that of FIGS. 32(a) to 32(d).

As described above, when using flakes made only of metal as in the present embodiment, by applying a horizontal electric field to the light modulation layer 30, as shown in FIG. 32(b), if the flakes are in a vertical orientation and are made of a dielectric material or a dielectric-coated metal, then by applying a horizontal electric field to the light modulation layer 30, the flakes enter a horizontal orientation as shown in FIG. 32(c) and Embodiment 1.

<Advantages of Forming Flakes of Only Metal>

Here, advantages of forming the flakes only of metal will be described. According to the present embodiment, there is less light interference due to the metal not being coated in a dielectric material. Thus, the light does not change in color tone depending on the orientation of the flakes, and viewing angle characteristics improve. Also, in the present embodiment, light absorption by the dielectric material does not occur, which improves reflectance. Furthermore, by forming the flakes only of metal, when the flakes are in a horizontal orientation and parallel to the substrates, there is no light leakage through the dielectric portion. This improves contrast.

Also, by forming the flakes only of metal, as described above, a vertical electric field results in horizontal orientation and a horizontal electric field results in vertical orientation.

<Advantages of Horizontal Orientation of Metal Flakes in Vertical Electric Field and Vertical Orientation of Metal Flakes in Horizontal Electric Field>

Here, as described above, advantages of having the metal flakes be in a horizontal orientation in a vertical electric field and having the metal flakes be in a vertical orientation in a horizontal electric field will be described.

FIGS. 33(a) and 33(b) respectively are cross-sectional views of main parts that schematically show the behavior of flakes when electric fields are applied to the light modulation layer 30 in the present embodiment; FIG. 33(a) shows a state in which a vertical electric field is being applied, and FIG. 33(b) shows a state in which a horizontal electric field is being applied. FIGS. 34(a) and 34(b) respectively are cross-sectional views of main parts that schematically show the behavior of flakes when electric fields are applied to the light modulation layer 30 in a case in which the flakes are made of a dielectric material or a dielectric-coated metal; FIG. 34(a) shows a state in which a vertical electric field is being applied, and FIG. 34(b) shows a state in which a horizontal electric field is being applied.

As shown in FIGS. 33(a), 33(b), 34(a), and 34(b), there is a difference in distribution of the electric field between the vertical electric field and the horizontal electric field. In FIGS. 33(a), 33(b), 34(a), and 34(b), for ease of description, the form of the lines of electric force when the flakes are not present is shown.

As shown in FIGS. 33(a) and 34(a), by having uniformly planar electrodes 12 and 22 formed on the substrates 10 and 20, which face each other, by applying a voltage to the respective uniformly planar electrodes 12 and 22 when a vertical electric field is being formed, a generally uniform electric field can be attained.

Thus, even if the flakes are in a horizontal orientation as shown in FIG. 33(a) or the flakes are in a vertical orientation as shown in FIG. 34(a) when a vertical electric field is being formed, there are no areas of weak electric field such as those shown in Patent Document 1 and flakes do not concentration in certain areas. Thus, when forming a vertical electric field, if the flakes are in a horizontal orientation as shown in FIG. 33(a), there is no concentration of flakes in certain areas, and therefore, no light leakage, and if the flakes are in a vertical orientation as shown in FIG. 34(a), there is no concentration of flakes in certain areas, and therefore, light passes through.

On the other hand, if a horizontal electric field shown in FIGS. 33(b) and 34(b) is formed, then an uneven electric field is formed in the vicinity of the interdigital electrodes 74 and 75 and the interdigital electrodes 14 and 15. This uneven electric field results in the concentration of flakes in certain areas.

Therefore, if flakes that enter a vertical orientation in a vertical electric field and that enter a horizontal orientation in a horizontal electric field such as flakes made of a dielectric material or dielectric-coated metal are used, then when a horizontal electric field is formed, the horizontally oriented flakes sometimes concentrate in areas where the symmetry of the lines of electric force shown is not destroyed, or in other words, they concentrate between the electrodes. In such a case, although this depends on the amount of flakes included, the concentration of flakes in certain areas can result in areas being formed where there are no flakes present. If such areas are formed, this would result in light leakage.

However, if flakes that enter a horizontal orientation in a vertical electric field and that enter a vertical orientation in a horizontal electric field are used, then as shown in FIG. 33(b), if the flakes concentrate in the vicinity of the electrodes due to the uneven electric field, then the flakes concentrate near the electrodes in a vertical orientation. Even in this case, there is a possibility of areas where light does not pass due to the concentration of flakes there. However, because there is no light leakage during horizontal orientation, this does not contribute greatly to a decrease in contrast.

Figure 27:
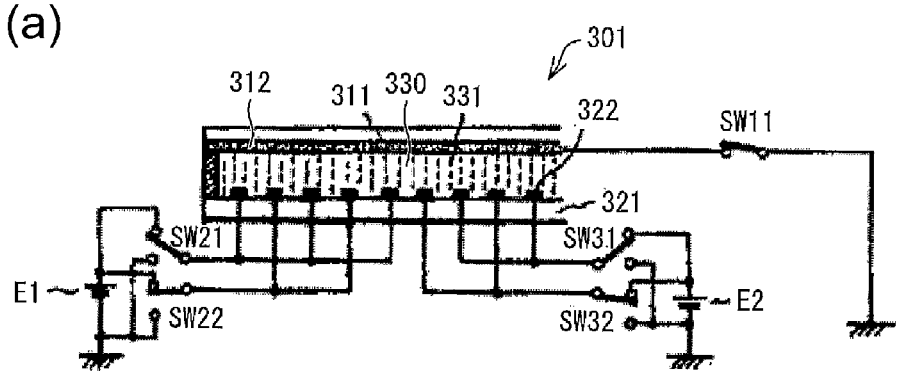
FIGS. 27(a) and 27(b) are cross-sectional view for describing operational principles of the light modulation device disclosed in Patent Document 1.
Figure 27:
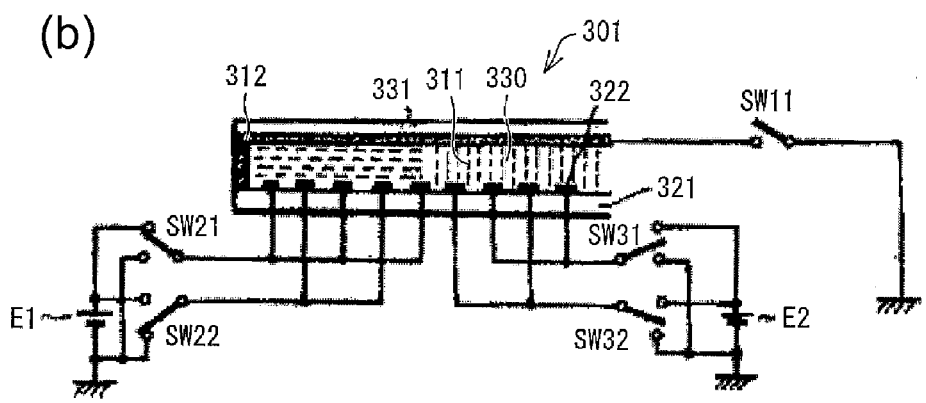
Figure 28:
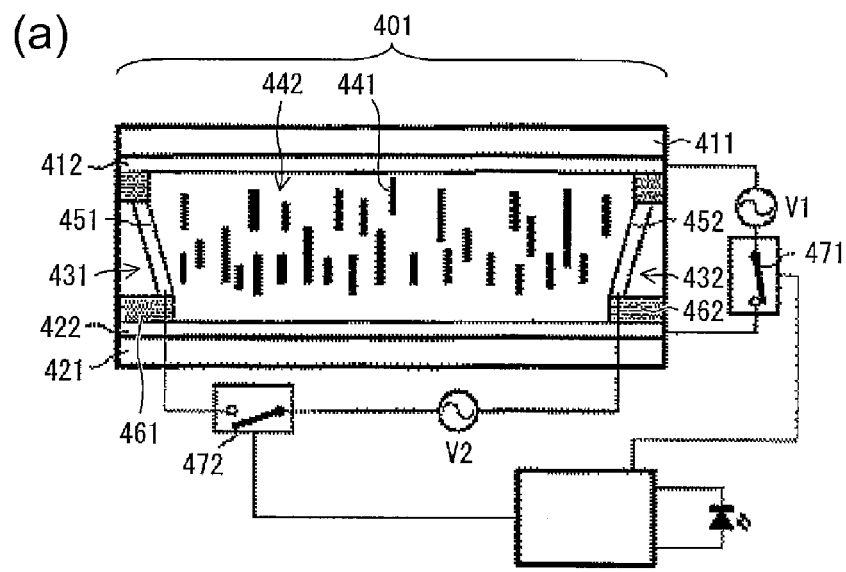
FIGS. 28(a) and 28(b) are cross-sectional view for describing operational principles of the light modulation device disclosed in Patent Document 2.
Figure 28:
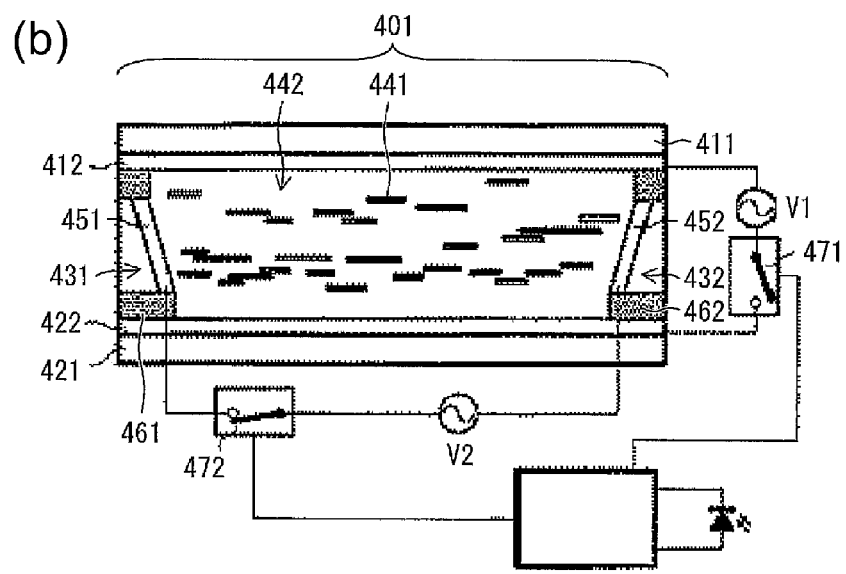
Figure 29:
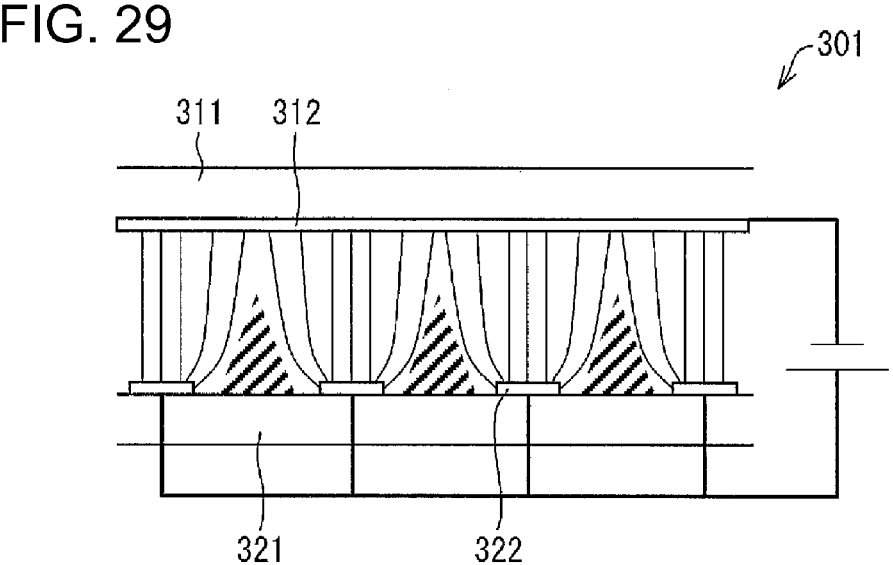
FIG. 29 shows lines of electrical force for when a voltage is applied between the pattern electrode and the segment electrodes in Patent Document 1.
Figure 30:
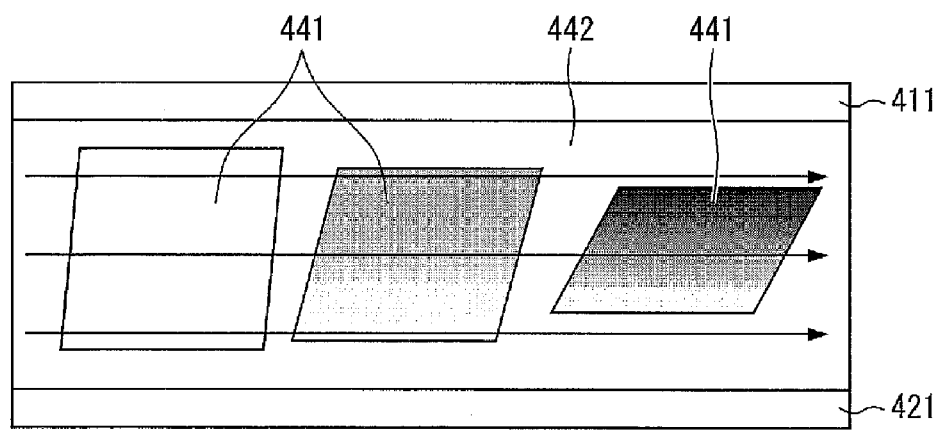
FIG. 30 is a drawing for schematically describing a problem in Patent Document 2.

Patent Document 1 has a problem that plate-shaped particles 331 concentrate in certain areas when a vertical electric field is formed as described above, and additionally has a problem light leakage occurs when the plate-shaped particles 331 are in a horizontal orientation to be parallel with the pair of substrates 311 and 321 as shown in FIG. 27(b), which can reduce contrast.

As in Embodiment 1, according to the present embodiment, not only can the concentration of flakes in certain areas be prevented when a vertical electric field is to be formed, it is possible to prevent a decrease in contrast resulting from light leakage when the flakes are in a horizontal orientation.

<Modification Example of Anisometric Members>

In the present embodiment, a case in which the anisometric members 32 are made only of metal was described. However, the present embodiment is not limited thereto, and as long as anisometric members 32 that enter a horizontal orientation in a vertical electric field and that enter a vertical orientation in a horizontal electric field are attained, the anisometric members 32 may be formed of another material. The driving method of the present embodiment can be applied generally to a case in which such anisometric members 32 are used.

<Modification Example of Schematic Configuration of Display Device and Display Method (Driving Method)>

Also, in the present embodiment, differences with Embodiment 1 were mainly explained as described above. However, the present embodiment is not limited to only the configuration and driving method above.

The point of the present embodiment is that anisometric members 32 made only of metal are used as the anisometric members 32 (flakes, for example), with the anisometric members 32 entering a horizontal orientation in a vertical electric field and entering a vertical orientation in a horizontal electric field.

Therefore, in Embodiments 2 to 6, by using anisometric members 32 made only of metal as the anisometric members 32 and reversing the direction of the electric fields to rotate the anisometric members 32 to be in a desired orientation, or in other words, reversing the electrodes to which a voltage is applied during the respective display modes disclosed in the respective embodiments (specifically, reversing the switching directions of the relay circuits or the switching circuits in the respective embodiments from what is depicted in the drawings of the respective embodiments), it is possible to attain a reflective display device, a transflective display device, a display device that performs color display, FFS driving, and the like.

<Modification Example 1 of Display Device>

FIGS. 35(a) and 35(b) are cross-sectional views showing a schematic configuration of a reflective display device 1 of the present modification example; FIG. 35(a) shows a light-absorption state, and FIG. 35(b) shows a light-reflective state, for example. The display device 1 shown in FIGS. 35(a) and 35(b) uses anisometric members 32 made only of metal, and is similar to the display device 1 shown in FIGS. 7(a) and 7(b) of Embodiment 2 other than the fact that the anisometric members 32 are in a horizontal orientation in a vertical electric field and in a vertical orientation in a horizontal electric field.

In the present modification also, a see-through display panel 2 such as that shown in FIGS. 13(a) and 13(b) can be realized. Although not shown, a see-through display panel 2 can naturally be realized even if another type of reflective display device 1 such as that in Modification Example 2 below is used, like in Embodiment 2.

<Modification Example 2 of Display Device>

FIGS. 36(a) and 36(b) are cross-sectional views showing a schematic configuration of a transflective display device 1 of the present modification example; FIG. 37(a) shows a light-transmissive state, and FIG. 37(b) shows a light-reflective state. The display device 1 shown in FIGS. 37(a) and 37(b) uses anisometric members 32 made only of metal, and is similar to the display device 1 shown in FIGS. 14(a) and 14(b) of Embodiment 3 other than the fact that the anisometric members 32 are in a horizontal orientation in a vertical electric field and in a vertical orientation in a horizontal electric field.

<Modification Example 4 of Display Device>

FIGS. 38(a) and 38(b) are cross-sectional views showing a schematic configuration of a display device 1 that performs color display of the present modification example; FIG. 38(a) shows a light-transmissive state, and FIG. 38(b) shows a light-reflective state. The display device 1 shown in FIGS. 38(a) and 38(b) uses anisometric members 142 made only of metal, and is similar to the display device 1 shown in FIGS. 15(a) and 15(b) of Embodiment 4 other than the fact that the anisometric members 142 are in a horizontal orientation in a vertical electric field and in a vertical orientation in a horizontal electric field.

As described above, if the flakes are given recesses and protrusions, it is possible to perform display of the composite colors of the flakes when the flakes are in a horizontal orientation. Therefore, in the present modification example, by changing the type of metal used in the anisometric members 142, color display based on the composite colors of the anisometric members 142 can be performed.

<Modification Example 5 of Display Device>

FIGS. 39(a) and 39(b) are cross-sectional views showing a schematic configuration of a display device 1 that performs FFS driving of the present modification example; FIG. 39(a) shows a light-transmissive state, and FIG. 39(b) shows a light-reflective state.

The display device 1 shown in FIGS. 39(a) and 39(b) uses anisometric members 32 made only of metal, and is similar to the display device 1 shown in FIGS. 16(a) and 16(b) of Embodiment 5 other than the fact that the anisometric members 32 are in a horizontal orientation in a vertical electric field and in a vertical orientation in a horizontal electric field.

<Modification Example 6 of Display Device>

FIGS. 40(a) and 40(b) are cross-sectional views showing a schematic configuration of a reflective display device 1 of the present modification example; FIG. 40(a) shows a light-absorption state, and FIG. 40(b) shows a light-reflective state, for example.

The display device 1 shown in FIGS. 40(a) and 40(b) also uses anisometric members 32 made only of metal, in which the anisometric members 32 are in a horizontal orientation in a vertical electric field and in a vertical orientation in a horizontal electric field.

As described in Embodiment 6, the orientation of the flakes is determined by the balance in strength between the vertical electric field and the horizontal electric field. In other words, as described above, by using a switching circuit, for example, a configuration may be adopted in which either one of a vertical electric field or a horizontal electric field is always applied to the light modulation layer 30 with the other type of electric field being made stronger than the one electric field to switch between an electric field being applied or not applied.

In Embodiment 6, in a vertical electric field, the anisometric members 32 are in a vertical orientation to be in a light-absorption state, and in a horizontal electric field, the anisometric members 32 are in a horizontal orientation to be in a light-reflective state. Therefore, in Embodiment 6 had a configuration in which a vertical electric field of even strength is always applied to the uniformly planar electrodes 72 and 22, and only when a mode in which incident light is reflected is selected (reflective display time), a horizontal electric field stronger than the vertical electric field is applied by the interdigital electrodes 74 and 75, for example.

In the present modification example, a case will be described as an example below in which a horizontal electric field of even strength is always applied by the interdigital electrodes 74 and 75, and only when a mode in which incident light is reflected is selected (reflective display time), a vertical electric field stronger than the horizontal electric field is applied by the uniformly planar electrodes 72 and 22.

However, in the present modification example also, a configuration may naturally be chosen in which a vertical electric field of even strength is always applied to the light modulation layer 30 by the uniformly planar electrodes 72 and 22, and only when a mode in which incident light is absorbed is selected or only when a mode in which light is transmitted is selected if the substrate 70 is used instead of the substrate 10 is a horizontal electric field stronger than the vertical electric field applied by the interdigital electrodes 74 and 75. In such a case, as can be seen by the Modification Examples 1 to 5 above, for example, in FIGS. 18(*a*) and 18(*b*), for example, the switches in the switching circuits 191 and 192 need to be designed to be switched in the reverse directions.

Figure 40:
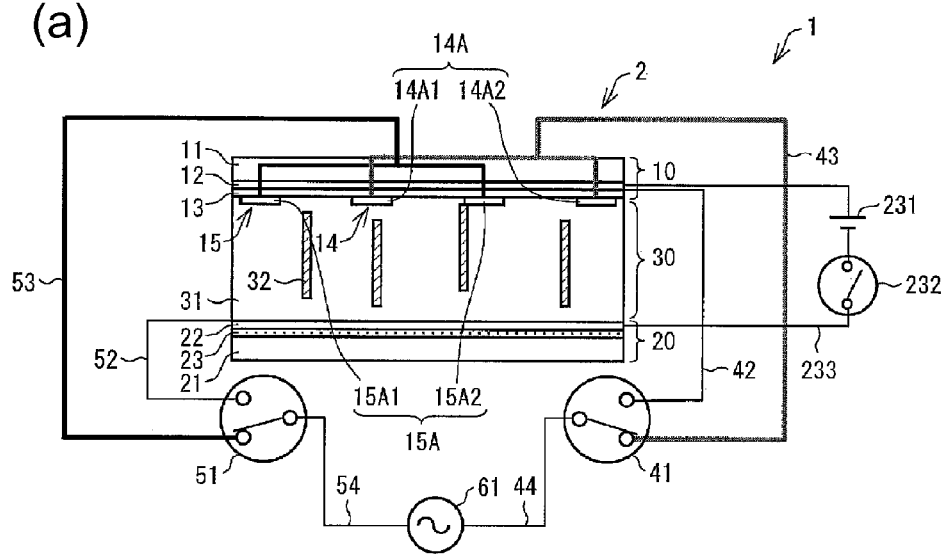
FIGS. 40(a) and 40(b) are cross-sectional views that show a schematic configuration of a display device of Embodiment 8.
Figure 40:
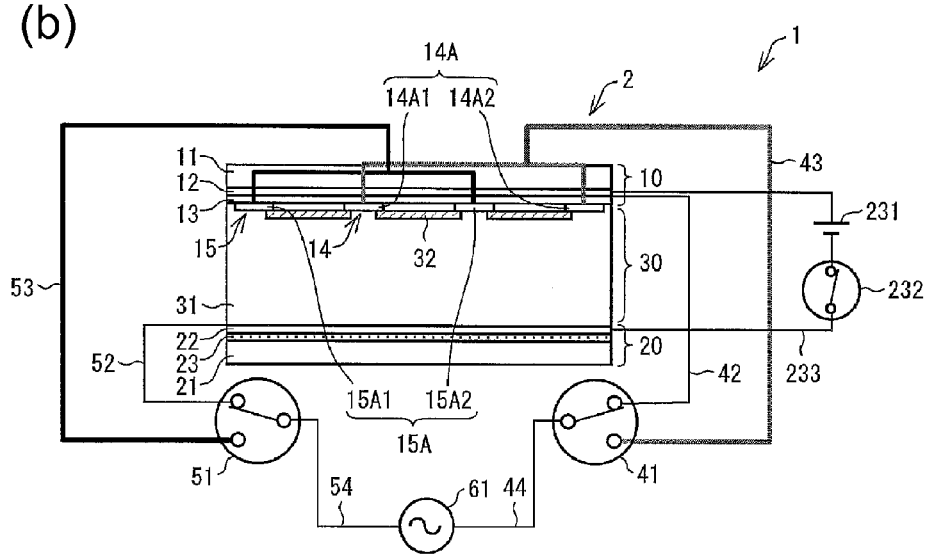

Below, only differences with Embodiment 6 will be described. The display panel 2 of the present embodiment includes switching circuits 221 and 222 and wiring lines 223 to 228 as shown in FIGS. 40(*a*) and 40(*b*) instead of the switching circuits 191 and 192 and the wiring lines 193 to 196, 211, and 212 shown in FIGS. 18(*a*) and 18(*b*).

The uniformly planar electrode 22 on the substrate 20 is electrically connected to the power source circuit 202 through the switching circuit 221 (first switching circuit).

The uniformly planar electrode 72 on the substrate 70 is electrically connected to the power source circuit 202 through the switching circuit 222 (second switching circuit).

A wiring line 223 is provided between the uniformly planar electrode 22 and the switching circuit 221 to apply a voltage to the uniformly planar electrode 22.

A wiring line 224 is provided between the uniformly planar electrode 72 and the switching circuit 222 to apply a voltage to the uniformly planar electrode 22.

A wiring line 225 connecting the switching circuit 221 to the power source circuit 202 is provided between the switching circuit 221 and the power source circuit 202. A wiring line 226 connecting the switching circuit 222 to the power source circuit 202 is provided between the switching circuit 222 and the power source circuit 202.

The interdigital electrodes 74 and 75 on the substrate 70 are electrically connected to the power source circuit 201 through the wiring lines 227 and 228.

In other words, the switching circuits 221 and 222, like the switching circuits 191 and 192, are switching circuits that switch the direction of the electric field applied to the light modulation layer 30. However, in the present modification example, the switching circuits 221 and 222 switch between applying or not applying a voltage from the power source circuit 202 to the uniformly planar electrodes 22 and 72 to switch between applying or not applying a horizontal electric field to the light modulation layer 30. In the present modification example, the switching circuits 221 and 222, the power source circuit 202, and the respective wiring lines 223 to 226 function as an electric field application direction changing circuit that changes the direction of the electric field applied to the light modulation layer 30, and function as a voltage application circuit that selectively applies a voltage to the uniformly planar electrodes 22 and 72 when changing the direction of the electric field applied to the light modulation layer 30.

Thus, as shown in FIG. 40(*a*), in the present modification example, during driving of the light modulation layer (that is, when voltage is applied to the display panel 2, or in other words, when the display panel 2 is powered ON), a constant voltage is always applied from the power source circuit 201 to the interdigital electrodes 74 and 75, causing a horizontal electric field of even strength to always be applied to the light modulation layer 30 by the interdigital electrodes 74 and 75. Meanwhile, as shown in FIG. 40(*b*), the switching circuits 221 and 222 and the power source circuit 202 control whether or not a horizontal electric field is applied to the light modulation layer 30, and in a preferred embodiment, the size of the vertical electric field. In this case, as described above, a voltage is applied to the uniformly planar electrodes 22 and 72 such that a vertical electric field stronger than the horizontal electric field is applied. According to the present modification example, it is possible to perform halftone display with ease as in Embodiment 6.

Embodiment 8>

Another embodiment of the present invention is described as follows with reference to FIGS. 40(*a*) to 43(*d*).

Differences from Embodiments 1 to 7 will mainly be described below, and components having the same function as those described in Embodiments 1 to 7 are assigned the same reference characters and descriptions thereof will be omitted.

In the present embodiment, a case will be described in which the display device 1 has a unit for applying direct current voltage. In the present embodiment, when the anisometric members 32 are in a horizontal orientation, the unit for applying a direct current voltage applies a direct current voltage between uniformly planar electrodes provided on a pair of substrates such that a direct current voltage of a polarity opposite to the polarity of the charge that has built up in anisometric members 32 is applied to a uniformly planar electrode on a substrate among the pair of substrates to which the anisometric members 32 stick.

In the present embodiment also, a case in which flakes are used as the anisometric members 32 is described as an example below.

<Schematic Configuration of Display Device>

FIGS. 40(*a*) and 40(*b*) are cross-sectional views showing a schematic configuration of a reflective display device 1 of the present embodiment; FIG. 40(*a*) shows a light-absorption state, and FIG. 40(*b*) shows a light-reflective state.

The display device 1 shown in FIGS. 40(*a*) and 40(*b*) has a configuration in which a switching circuit 232 and a wiring line 233 that are electrically connected to the power source circuit 231 are provided as the unit for applying direct current voltage between the uniformly planar electrode 12 on the substrate 10 and the uniformly planar electrode 22 on the substrate 20, and has a configuration similar to that of the display device 1 of Embodiment 2 shown in FIGS. 9(*a*) and 9(*b*) other than the fact that the anisometric members 32 are negatively charged metal flakes.

Figure 31:
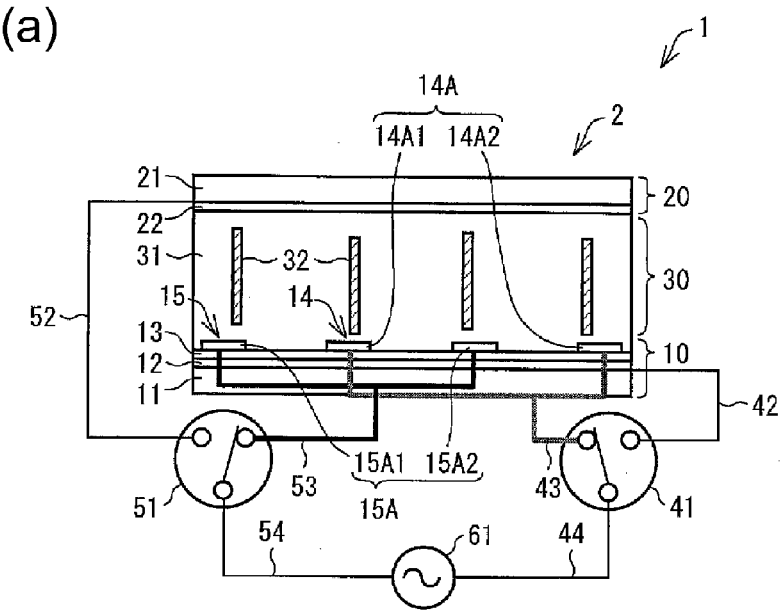
FIGS. 31(a) and 31(b) are cross-sectional views that show a schematic configuration of a display device of Embodiment 7.
Figure 31:
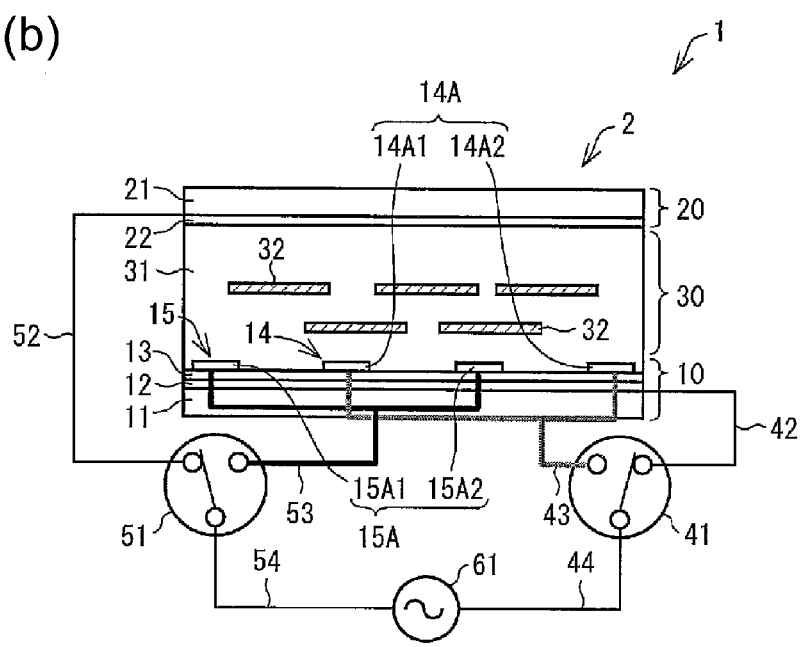
Figure 32:
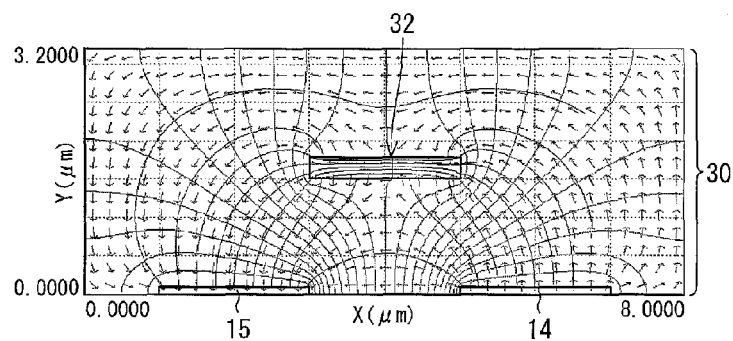
FIGS. 32(a) to 32(d) are graphs showing the results of calculating lines of electric force and equipotential lines in the light modulation layer of a display device using flakes made only of metal or made of dielectric-coated metal.
Figure 32:
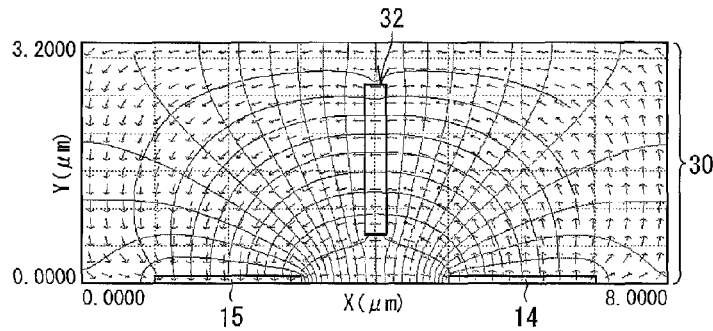
Figure 32:
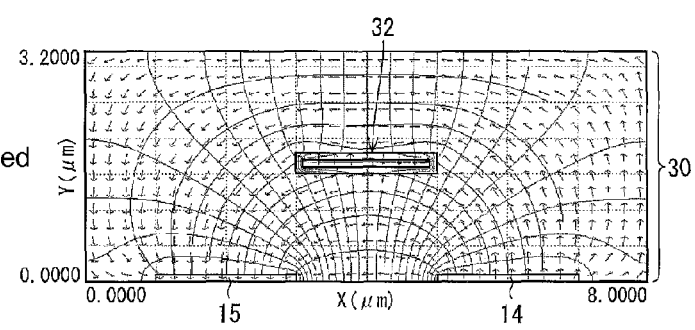
Figure 32:
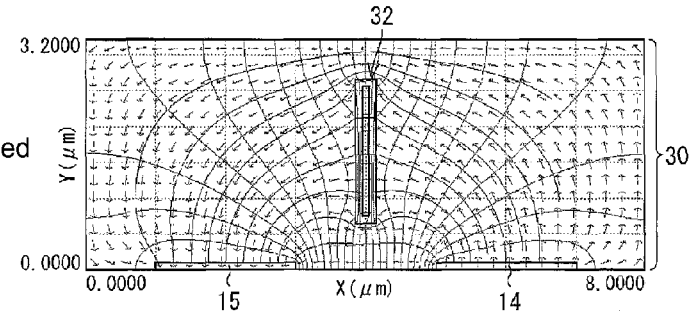
Figure 33:
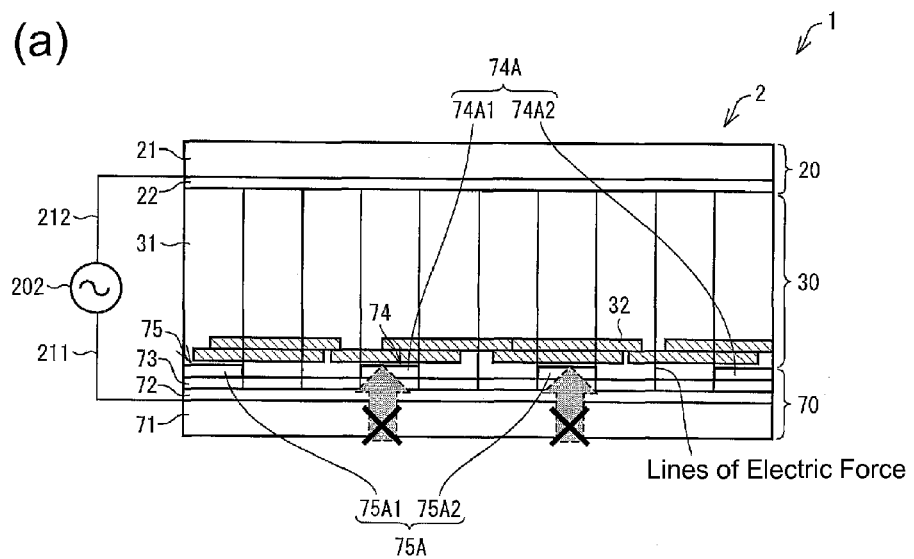
FIGS. 33(a) and 33(b) are cross-sectional views main portions that schematically show the behavior of flakes when an electric field is applied to the light modulation layer of Embodiment 7.
Figure 33:
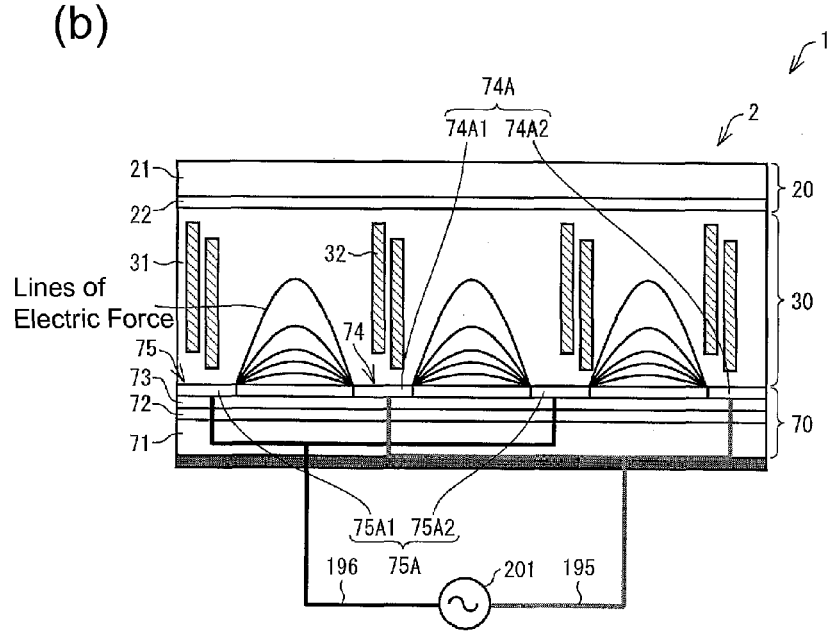
Figure 34:
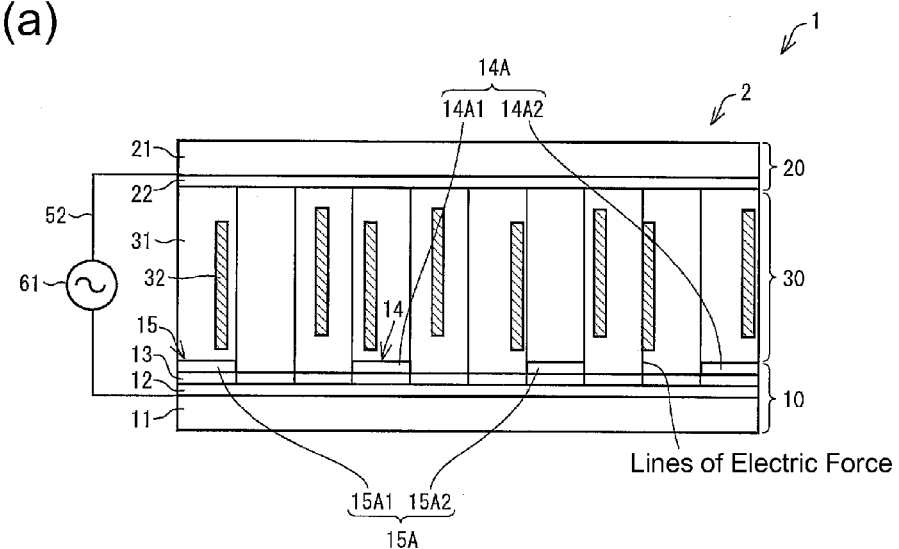
FIGS. 34(a) and 34(b) are cross-sectional views of main portions that schematically show the behavior of flakes when an electric field is applied to the light modulation layer when flakes made of a dielectric body or a dielectric-coated metal.
Figure 34:
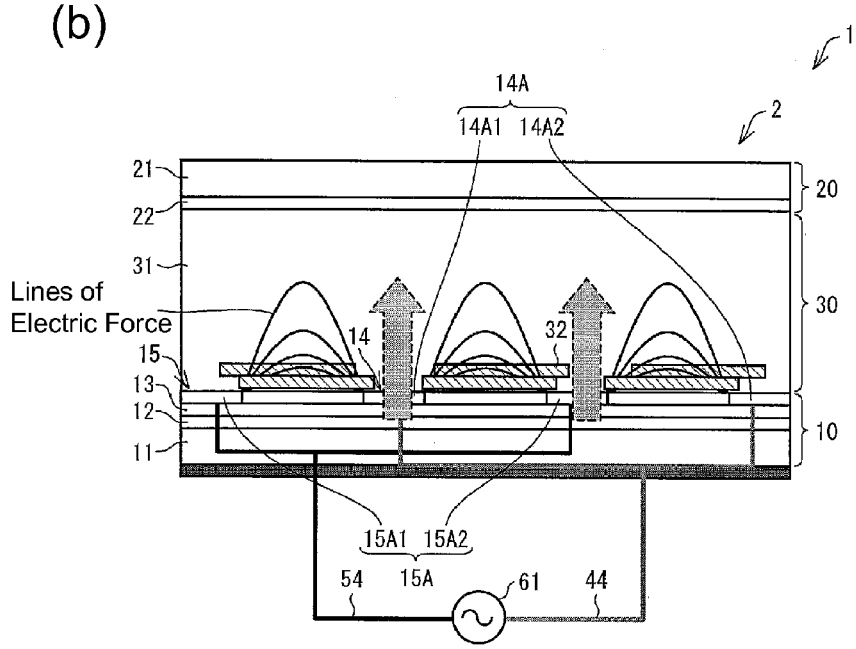
Figure 35:
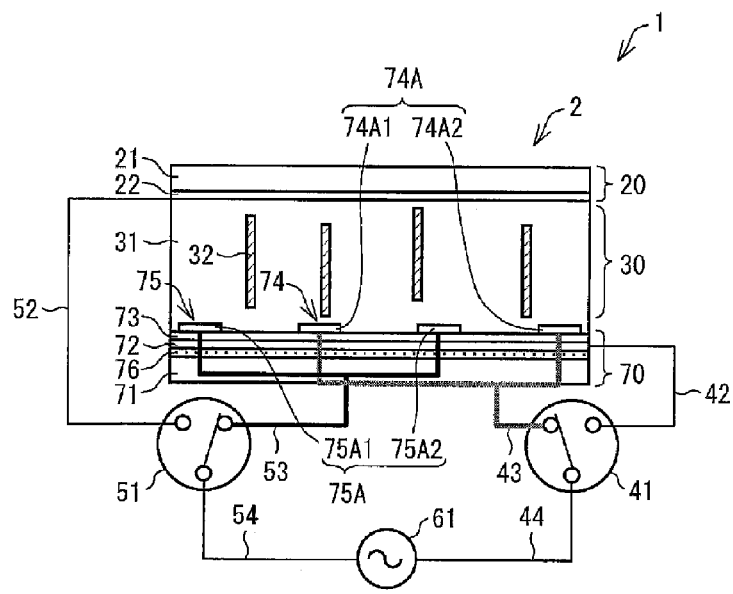
FIGS. 35(a) and 35(b) are cross-sectional views that show a schematic configuration of a reflective display device of Modification Example 1 of Embodiment 7.
Figure 35:
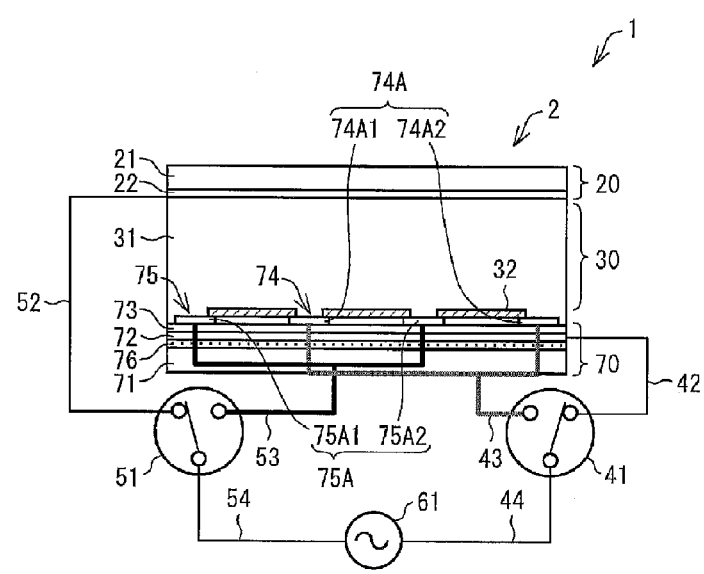
Figure 39:
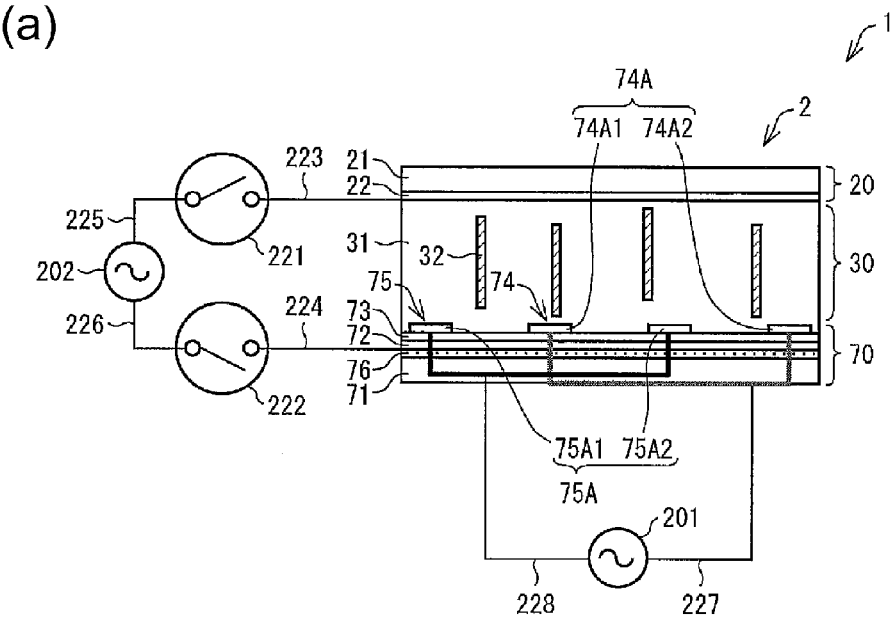
FIGS. 39(a) and 39(b) are cross-sectional views that show a schematic configuration of a reflective display device of Modification Example 5 of Embodiment 7.
Figure 39:
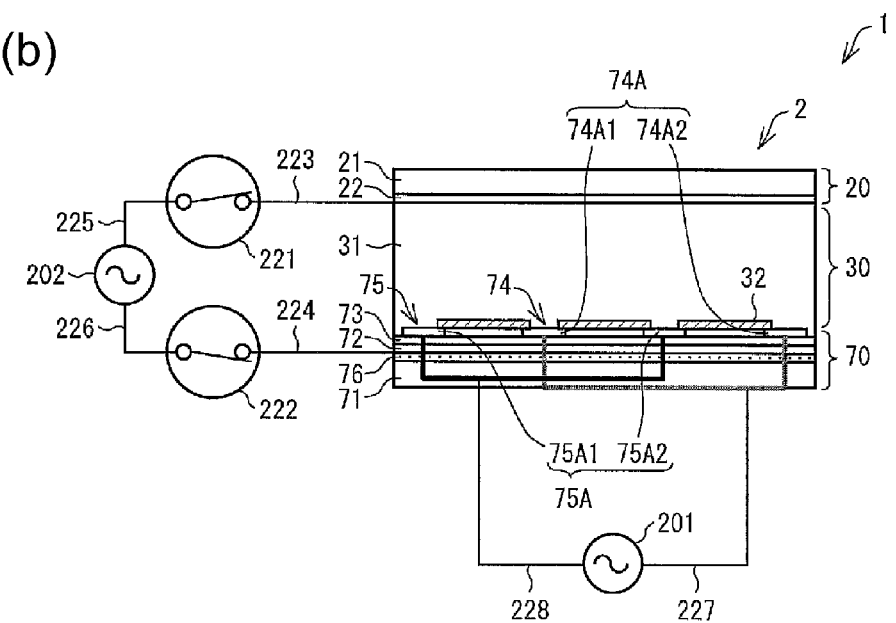

In FIGS. 33(*a*) and 33(*b*) to FIGS. 39(*a*) and 39(*b*), an example is shown in which the anisometric members 32 are stuck to one of the pair of substrates when the anisometric members 32 are in a horizontal orientation. However, if the anisometric members 32 are metal flakes, then due to the fact that the metal flakes are in a horizontal orientation in a vertical electric field, unlike a case in which the dielectric-coated flakes are in a horizontal orientation in a horizontal electric field, the metal flakes do not stick to one substrate simply through the application of the vertical electric field, and normally, the metal flakes are floating in a horizontal orientation as shown in FIG. 31(*b*) (if one end thereof is fixed as will be described in a modification example, the non-fixed end floats in a horizontal orientation).

Figure 36:
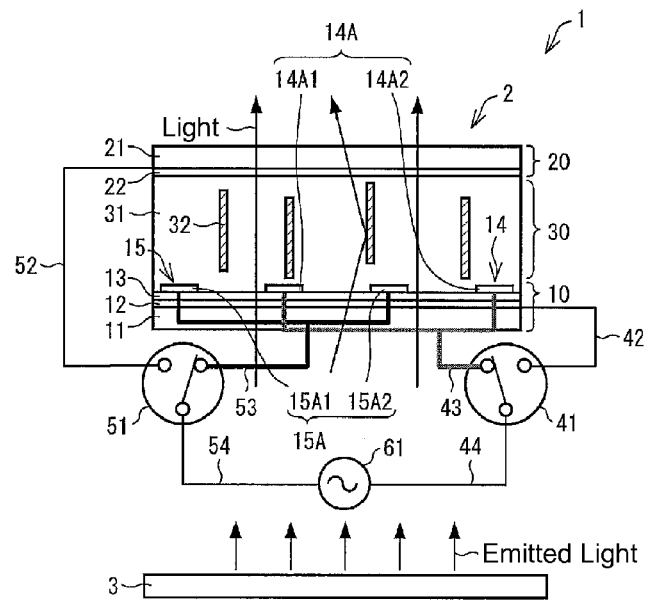
FIGS. 36(a) and 36(b) are cross-sectional views that show a schematic configuration of a transflective display device of Modification Example 2 of Embodiment 7.
Figure 36:
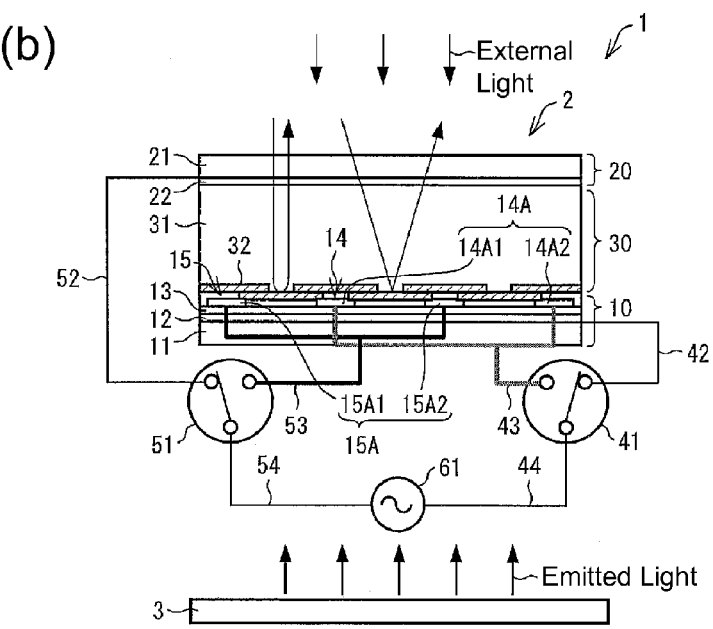
Figure 37:
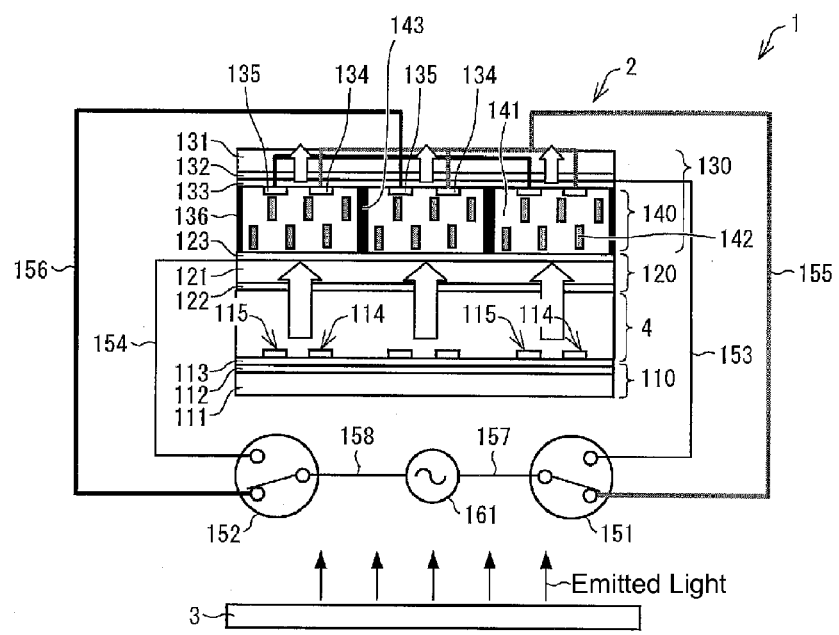
FIGS. 37(a) and 37(b) are cross-sectional views that show a schematic configuration of a display device that performs color display of Modification Example 3 of Embodiment 7.
Figure 37:
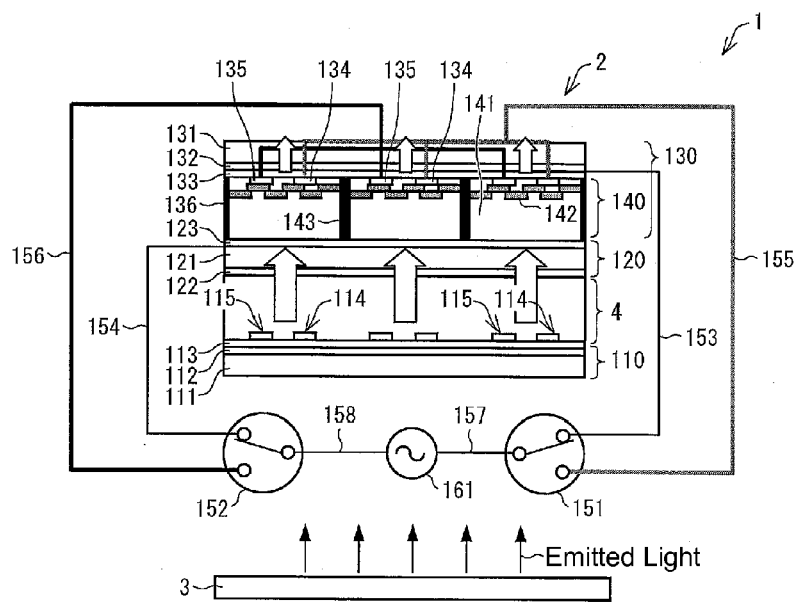
Figure 38:
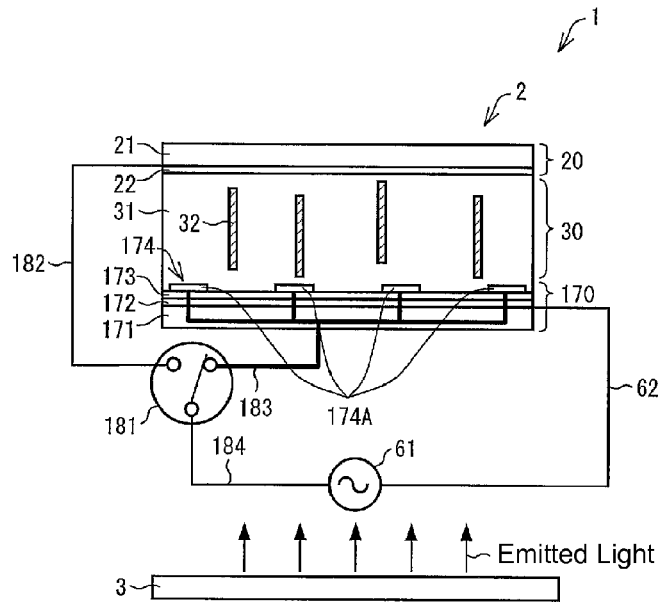
FIGS. 38(a) and 38(b) are cross-sectional views that show a schematic configuration of a display device that performs FFS driving of Modification Example 4 of Embodiment 7.
Figure 38:
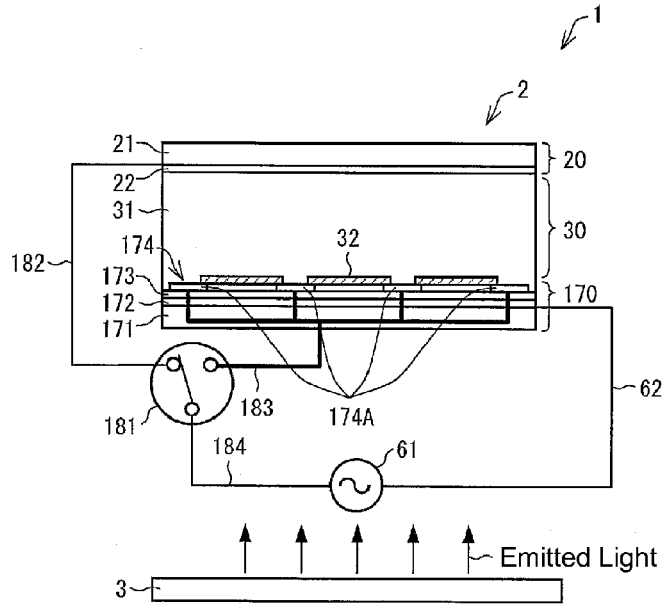

In the present embodiment, as described above, the uniformly planar electrodes 12 and 22 on the upper and lower substrates 10 and 20 are provided with a unit for applying a direct current voltage, and as shown in FIG. 36(*b*), when a vertical electric field is being applied, an alternating current voltage is applied between the uniformly planar electrodes 12 and 22, and at the same time, a positive direct current voltage is applied to the upper uniformly planar electrode 12 as a direct current offset voltage. As a result, due to dielectrophoresis, the anisometric members 32, which are negatively charged, can be pulled towards the upper substrate 10. Therefore, even if metal flakes are used for the anisometric members 32, the anisometric members 32 can be put in a horizontal orientation so as to stick to one substrate 10 among the pair of substrates 10 and 20, and at this time, the anisometric members 32 can be put in a horizontal orientation to stick to the upper substrate 10 against gravitational pull.

In this case, there is no special limitation on the size of the alternating current voltage and the direct current voltage applied between the uniformly planar electrodes 12 and 22.

When a horizontal electric field is being applied, the direct current voltage may continue to be applied, but alternatively may not be applied as shown in FIG. 36(*a*). At this time, the anisometric members 32 are in a vertical orientation due to the horizontal electric field, but if the anisometric members 32 are present towards the substrate 20 facing the interdigital electrodes 14 and 15, then the actual horizontal electric field is weak in that area. Thus, it is preferable that the anisometric members 32 be oriented so as to stick to the substrate 10 having the interdigital electrodes 14 and 15.

In the example above, the relay circuits 41 and 51, the power source circuit 61, and the wiring lines 42 to 44 and 52 to 54 function as an electric field application direction changing circuit that changes the direction of the electric field applied to the light modulation layer 30, and function as a voltage application circuit that applies an alternating current voltage selectively to the uniformly planar electrodes 12 and 22 when changing the direction of the electric field applied to the light modulation layer 30. Also, the relay circuits 41 and 51 function as switching circuits (selection circuits) that select (switch) the electrode, among the uniformly planar electrodes 12 and 22 and the interdigital electrodes 14 and 15 provided on the substrates 10 and 20, to which the alternating current voltage is applied, and the power source circuit 231, the switching circuit 232, and the wiring line 233 function as the unit for applying a direct current voltage.

In the present embodiment also, if the display device 1 is of a reflective type as described above, then instead of a light-absorption layer (light-absorption layer 76 or light-absorption layer 23), a light-reflective layer that performs minor reflection or scattering reflection is provided on the rear surface side of the display panel 2, and the flakes are given recesses and protrusions, causing the flakes to be able to perform composite color display during horizontal orientation and performing reflective display by the reflective layer during vertical orientation.

<Modification Example 1 of Display Device>

In the example described above, a case was described in which anisometric members 32 were made only of metal, similar principles apply when the anisometric members 32 are made of dielectric-coated flakes.

Figure 41:
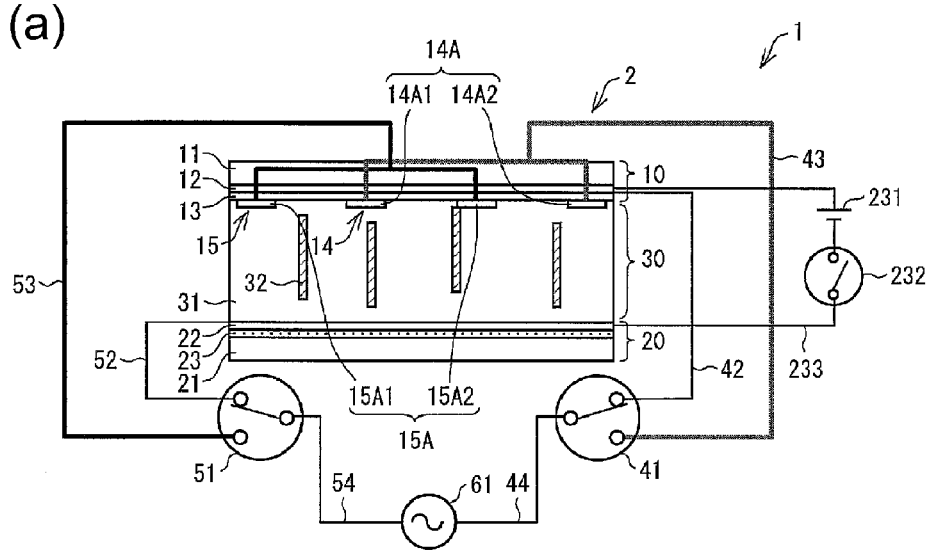
FIGS. 41(a) and 41(b) are cross-sectional views that show a schematic configuration of a display device of Modification Example 1 of Embodiment 8.
Figure 41:
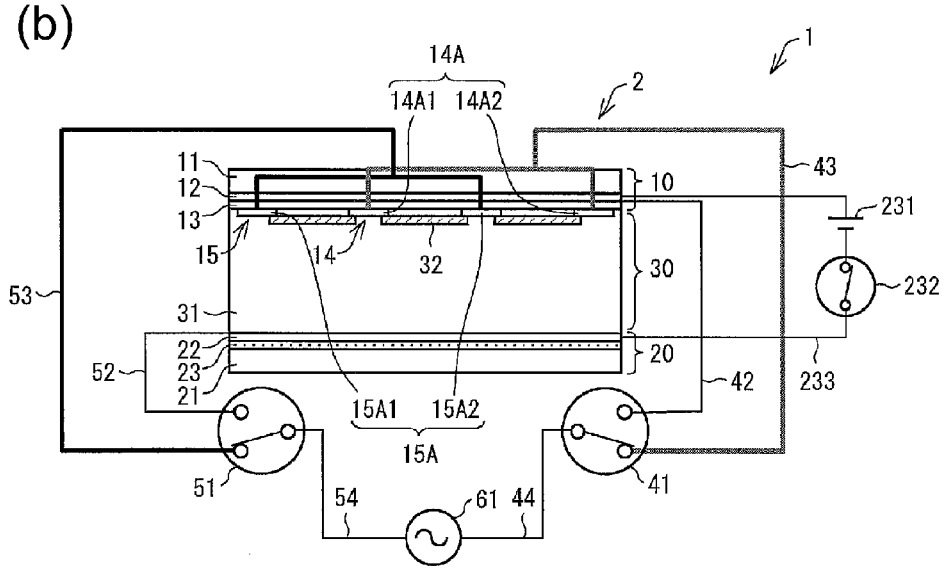

FIGS. 41(*a*) and 41(*b*) are cross-sectional views showing a schematic configuration of a reflective display device 1 of the present modification example; FIG. 41(*a*) shows a light-absorption state, and FIG. 41(*b*) shows a light-reflective state, for example.

If negatively charged dielectric-coated flakes are used as the anisometric members 32, then, as shown in FIG. 41(*b*), an alternating current is applied horizontally, that is, between the interdigital electrodes 14 and 15, and at the same time, a positive direct current voltage is applied to the upper uniformly planar electrode 12 as a direct current offset voltage.

As a result, the anisometric members 32 are put in a horizontal orientation due to the horizontal electric field and are drawn towards the upper substrate 10 by electrophoresis.

In the present modification example also, if the anisometric members 32 are present towards the substrate 20 facing the interdigital electrodes 14 and 15, the actual horizontal electric field is weaker in that area. Thus, it is preferable that the anisometric members 32 be oriented so as to stick to the substrate 10 having the interdigital electrodes 14 and 15.

According to the present modification example, the anisometric members 32 gather towards the upper substrate 10 due to direct current voltage, and by the horizontal electric field applied by the interdigital electrodes 14 and 15, the anisometric members 32 are oriented so as to stick to the upper substrate 10. Thus, according to the present modification example, it is possible to cause the anisometric members 32 to stick to the upper substrate 10 at high efficiency.

In this case, the size of the direct current (DC) voltage applied between the uniformly planar electrodes 12 and 22 may be the same as, larger than, or smaller than the size of the alternating current (AC) voltage applied between the interdigital electrodes 14 and 15. However, due to the differing directions of the electric fields, if the direct current voltage is larger than the alternating current voltage, then it is preferable that the voltage difference not be very different, and that they be approximately the same (AC=1.5V, DC=2V, for example).

In the present modification example also, when a vertical electric field is applied, the direct current voltage may continue to be applied, but as shown in FIG. 41(*a*), the direct current voltage may alternatively not be applied.

In the present modification example also, the relay circuits 41 and 51, the power source circuit 61, and the wiring lines 42 to 44 and 52 to 54 function as an electric field application direction changing circuit that changes the direction of the electric field applied to the light modulation layer 30, and function as a voltage application circuit that applies an alternating current voltage selectively to the uniformly planar electrodes 12 and 22 when changing the direction of the electric field applied to the light modulation layer 30. In the present modification example also, the relay circuits 41 and 51 function as switching circuits (selection circuits) that select (switch) which electrode, from among the uniformly planar electrodes 12 and 22 and the interdigital electrodes 14 and 15 provided on the substrates 10 and 20, the alternating current voltage is applied to, and the power source circuit 231, the switching circuit 232, and the wiring line 233 function as the unit for applying a direct current voltage.

In the present embodiment, as described above, a case in which a unit for applying direct current voltage is provided in the display device 1 of Embodiment 2 shown in FIGS. 9(*a*) and 9(*b*) was mainly described as an example. However, the present embodiment is not limited thereto, and similar modifications may be made on another display device 1 of Embodiment 2 or a display device 1 in another embodiment. If interdigital electrodes are provided on one of the pair of substrates, then it is possible to make modifications by a method similar to that described above. Below, a modification example will be described in which interdigital electrodes are provided on both of the pair of substrates.

<Modification Example 2 of Display Device>

Figure 42:
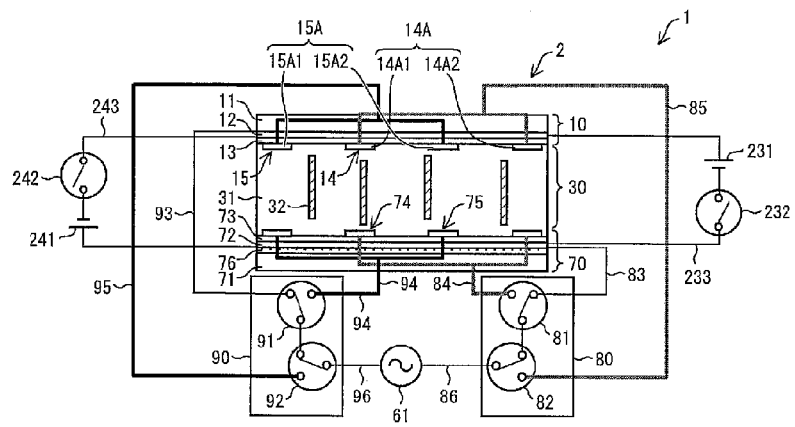
FIGS. 42(a) to 42(c) are cross-sectional views that show a schematic configuration of a display device of Modification Example 2 of Embodiment 8.
Figure 42:
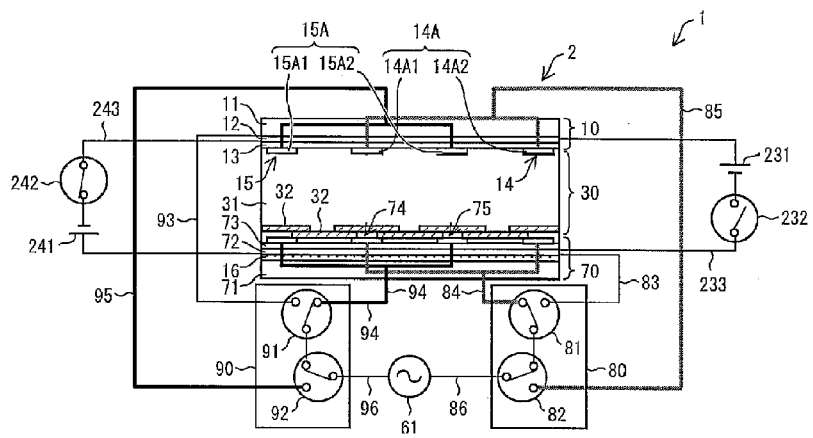
Figure 42:
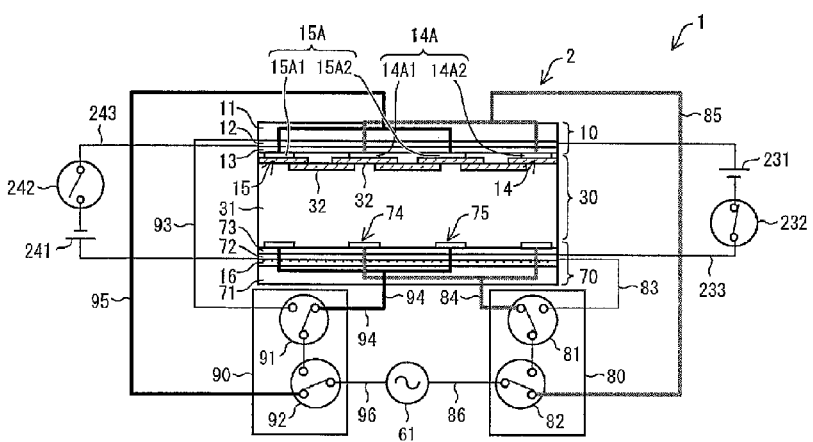

FIGS. 42(*a*) to 42(*c*) are cross-sectional views showing a schematic configuration of a display device 1 of the present modification example; FIG. 42(*a*) shows a light-absorption state; FIG. 42(*b*) shows a light-reflective state due to light scattering; and FIG. 42(*c*) shows a light-reflective state due to minor reflection.

The display device 1 shown in FIGS. 42(*a*) to 42(*c*) is similar to the display device 1 shown in FIGS. 11(*a*) to 11(*c*) in Embodiment 2 other than the fact that a power source circuit 231, a switching circuit 232, and a wiring line 233 shown in FIGS. 41(*a*) and 42(*b*) are provided as a unit for applying a direct current voltage between the uniformly planar electrode 12 on the substrate 10 and the uniformly planar electrode 72 provided on the substrate 70, that a switching circuit 242 and a wiring line 243 that are electrically connected to the power source circuit 241 are provided, and that the anisometric members 32 are negatively charged dielectric-coated flakes.

As shown in FIG. 42(b), in the present modification example, an alternating current voltage is applied between interdigital electrodes 74 and 75 on the lower substrate 70, and at the same time, a positive direct current voltage is applied as a direct current offset voltage to the uniformly planar electrode 72 on the lower substrate 70 by the power source circuit 241, the switching circuit 242, and the wiring line 243.

As a result, the anisometric members 32 gather towards the lower substrate 70 due to direct current voltage, and by the horizontal electric field applied by the interdigital electrodes 74 and 75, the anisometric members 32 are oriented so as to stick to the lower substrate 70.

Also, as shown in FIG. 42(c), in the present modification example, an alternating current voltage is applied between interdigital electrodes 14 and 15 on the upper substrate 10, and at the same time, a positive direct current voltage is applied as a direct current offset voltage to the uniformly planar electrode 12 on the upper substrate 10 by the power source circuit 231, the switching circuit 232, and the wiring line 233.

As a result, the anisometric members 32 gather towards the upper substrate 10 due to direct current voltage, and by the horizontal electric field applied by the interdigital electrodes 14 and 15, the anisometric members 32 are oriented so as to stick to the upper substrate 10.

Thus, according to the present modification example, it is possible to cause the anisometric members 32 to stick to the upper substrate 10 or to the lower substrate 70 at high efficiency.

In the present modification example also, the size of the direct current (DC) voltage applied between the uniformly planar electrodes 12 and 72 may be the same as, larger than, or smaller than the size of the alternating current (AC) voltage applied between the interdigital electrodes 14 and 15 or the interdigital electrodes 74 and 75. However, in the present modification example also, if the direct current voltage is larger than the alternating current voltage, then it is preferable that the voltages not be very different, and that they be approximately the same.

In the present modification example also, when a vertical electric field is applied, the direct current voltage may continue to be applied, but as shown in FIG. 42(a), the direct current voltage may alternatively not be applied.

In the example above, similar to the display device 1 shown in FIG. 11, the relay circuits 80 and 90, the power source circuit 61, and the wiring lines 83 to 86 and 93 to 96 function as an electric field application direction changing circuit that changes the direction of the electric field applied to the light modulation layer 30 and function as a voltage applying unit that applies an alternating current voltage selectively to the uniformly planar electrodes 12 and 72, the interdigital electrodes 14 and 15, and the interdigital electrodes 74 and 75. The relay circuits 80 and 90 function as switching circuits (selection circuits) that select (switch) the electrode to which alternating current voltage is applied from among the uniformly planar electrodes 12 and 72, the interdigital electrodes 14 and 15, and the interdigital electrodes 74 and 75 provided on the substrates 10 and 70, and as described above, the power source circuits 231 and 241, the switching circuits 232 and 242, and the wiring lines 233 and 243 function as a unit for applying a direct current voltage.

According to the present modification example, like Embodiment 2, the display mode can be switched between display by a light-absorption layer 76 (colored layer) (black display, for example; FIG. 42(a)), white display due to scattering of reflected light (FIG. 42(b)), or mirror reflection display by minor reflection (FIG. 42(c)).

<Modification Example 3 of Display Device>

Figure 43:
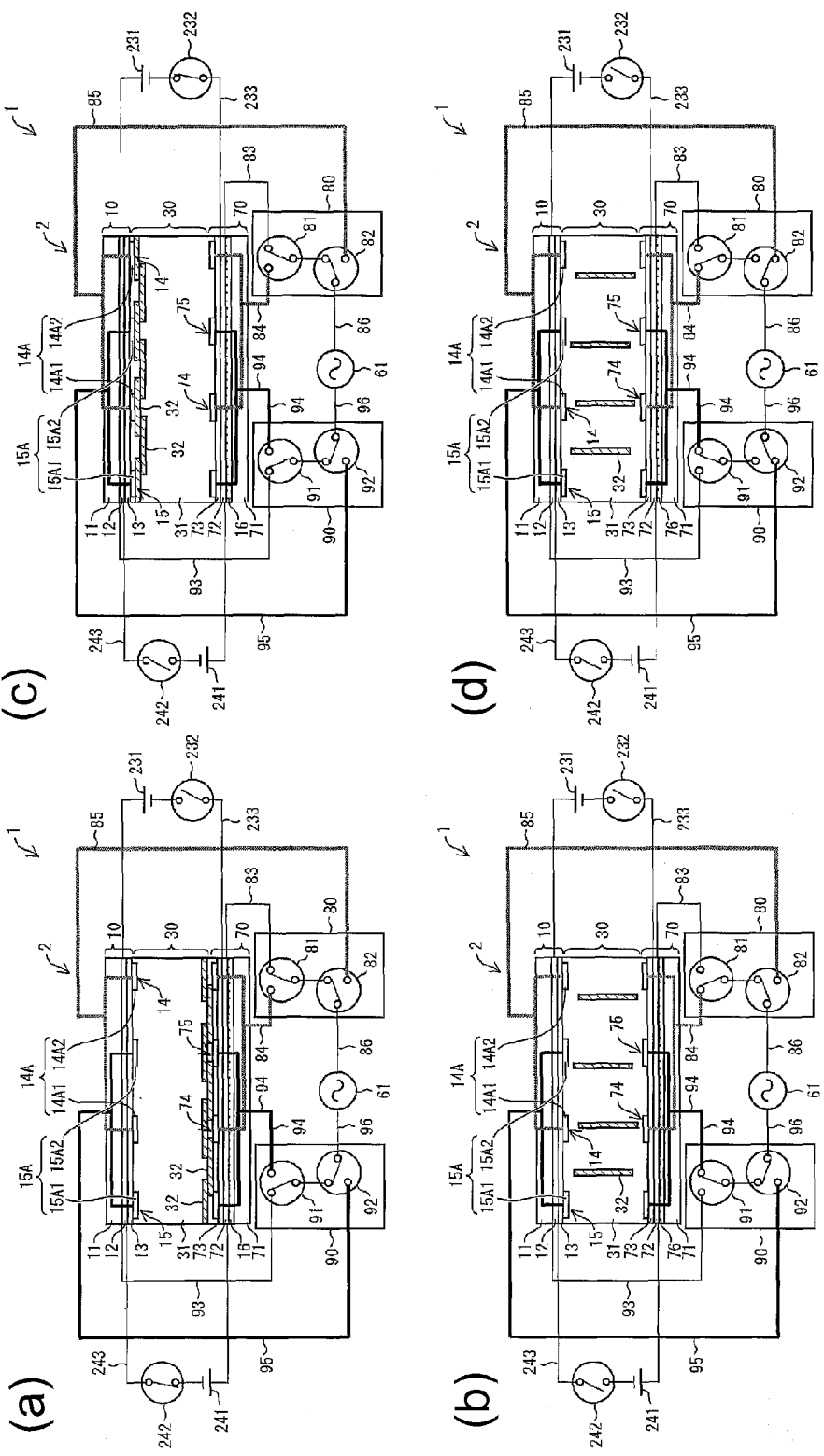
FIGS. 43(a) to 43(d) are cross-sectional views that show a schematic configuration of a display device of Modification Example 3 of Embodiment 8.

FIGS. 43(a) to 43(d) are cross-sectional views showing a schematic configuration of the display device 1 of the present modification example; FIG. 43(a) shows a light-reflective state due to scattering; FIG. 43(c) shows a light-reflective state due to minor reflection, and FIGS. 43(b) and 43(d) show a light-absorption state.

The display device 1 of FIGS. 43(a) to 43(d) has a configuration similar to that of the display device 1 shown in FIGS. 42(a) to 42(c) other than that the anisometric members 32 are negatively charged metal flakes.

In the present modification example, as shown in FIG. 43(a), when a vertical electric field is being applied, an alternating current voltage is applied between the uniformly planar electrodes 12 and 72, and at the same time, a positive direct current voltage as a direct current offset voltage is applied to the uniformly planar electrode 72 on the lower substrate 70 by the power source circuit 241, the switching circuit 242, and the wiring lines 243. As a result, due to electrophoresis, the anisometric members 32 are drawn towards the lower substrate 70, and thus, the anisometric members 32 are in a horizontal orientation so as to stick to the lower substrate 70.

As shown in FIG. 43(b), from this state, an alternating current voltage is applied between the interdigital electrodes 74 and 75 on the substrate 70, which are on the side towards which the anisometric members 32 stick, thus causing the interdigital electrodes 74 and 75 to form a horizontal electric field, resulting in the anisometric members 32 to be in a vertical orientation.

Also, in the present modification example, as shown in FIG. 43(c), when a vertical electric field is being applied, an alternating current voltage is applied between the uniformly planar electrodes 12 and 72, and at the same time, a positive direct current voltage as a direct current offset voltage is applied to the uniformly planar electrode 12 on the upper substrate 10 by the power source circuit 231, the switching circuit 232, and the wiring lines 233. As a result, due to electrophoresis, the anisometric members 32 are drawn towards the upper substrate 10, and thus, the anisometric members 32 are in a horizontal orientation so as to stick to the lower substrate 10.

As shown in FIG. 43(d), from this state, an alternating current voltage is applied between the interdigital electrodes 14 and 15 on the substrate 10, which is the side towards which the anisometric members 32 stick, thus causing the interdigital electrodes 14 and 15 to form a horizontal electric field, resulting in the anisometric members 32 to be in a vertical orientation.

In the present modification example also, when a horizontal electric field is being applied, the direct current voltage may continue to be applied, but alternatively may not be applied as shown in FIGS. 43(b) and 43(d).

In the present modification example, there is no special limitation on the size of the alternating current voltage and the direct current voltage applied between the uniformly planar electrodes 12 and 72.

In FIGS. 43(c) and 43(d), an alternating current is only applied between the interdigital electrodes 14 and 15 on the substrate 10, which is the side to which the anisometric members 32 stick, but an alternating current voltage may be applied both between the interdigital electrodes 14 and 15 and between the interdigital electrodes 74 and 75 on the substrates 10 and 70. By applying an alternating current voltage to the interdigital electrodes on the substrate to which the anisometric members 32 stick, compared to a case in which an alternating current voltage is applied to the interdigital electrodes on the substrate to which the anisometric members 32 are not stuck, it is possible to apply a horizontal electric field efficiently to the anisometric members 32, and thus, it is possible to put the anisometric members 32 in a vertical orientation efficiently.

In the present modification example also, like Modification Example 2, the relay circuits 80 and 90, the power source circuit 61, and the wiring lines 83 to 86 and 93 to 96 function as an electric field application direction changing circuit and as a voltage applying unit that selectively applies an alternating current voltage on the uniformly planar electrodes 12 and 72, the interdigital electrodes 14 and 15, and the interdigital electrodes 74 and 75. The relay circuits 80 and 90 function as switching circuits (selection circuits) that select (switch) the electrode to which alternating current voltage is applied from among the uniformly planar electrodes 12 and 72, the interdigital electrodes 14 and 15, and the interdigital electrodes 74 and 75 provided on the substrates 10 and 70, and the power source circuits 231 and 241, the switching circuits 232 and 242, and the wiring lines 233 and 243 function as a unit for applying a direct current voltage.

<Modification Example of Charging Polarity>

In the present embodiment, a case was described as an example in which the anisometric members 32 are given a negative charge, and a positive direct current voltage is applied as a direct current offset voltage to the uniformly planar electrode 12. However, the anisometric members 32 may be members having a negative charge or a positive charge in the medium 31.

For example, in the example shown in FIGS. 40(*a*) and 40(*b*), the anisometric members 32 may be positively charged with a negative direct current voltage being applied to the uniformly planar electrode 12 as a direct current offset voltage. In such a case, the uniformly planar electrode 12 needs to be connected to the negative end of the power source circuit 62 and the uniformly planar electrode 22 needs to be connected to the positive end. By changing the polarity of the charge in the uniformly planar electrode 12 and the polarity of the charge in the anisometric members 32, the anisometric members 32 can be oriented so as to stick to the substrate 10.

MODIFICATION EXAMPLES

The display devices 1 of the respective embodiments are not limited to the configurations above, and may be given the following configurations. In the description below, an example is described of a specific configuration of the substrates and a specific arrangement of the substrates, but as described above, various modifications can be made on the configuration and arrangement of the substrates.

(Cell Thickness)

It is preferable that the thickness of the light modulation layer (cell thickness) be sufficient for the flakes to enter a vertical orientation as shown in FIG. 1(*b*), for example, but the configuration is not limited thereto, and the thickness may be such that the flakes remain at an intermediate angle (diagonal orientation).

In other words, if the cell thickness is less than the long axis length of the flakes, and the flakes are oriented diagonally at the maximum angle to the substrates, then the light reflected by the flakes may be set so as not to be directly emitted towards the display surface side.

Thus, it is possible to attain a thinner display panel 2 due to being able to reduce the thickness of the light modulation layer 30. Furthermore, it is possible to restrict the movement of the flakes resulting from voltage application, and thus, fast driving is possible.

Figure 19:
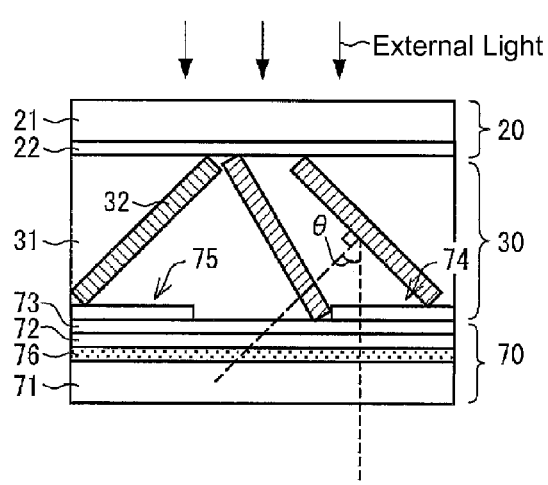
FIGS. 19(a) and 19(b) are cross-sectional views showing a schematic configuration in which the cell thickness is made small in the display panel shown in FIGS. 8(a) and 8(b).
Figure 19:
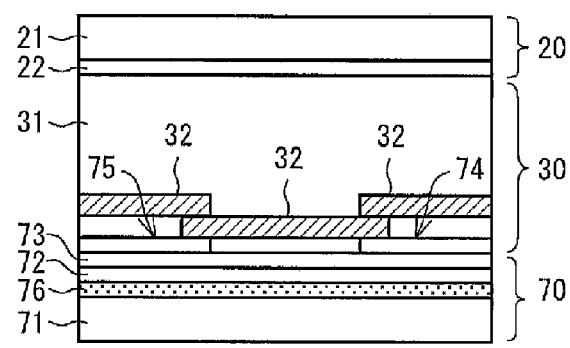

FIGS. 19(*a*) and 19(*b*) are cross-sectional views showing a schematic configuration in which the cell thickness is made small in the display panel 2 shown in FIGS. 8(*a*) and 8(*b*).

In a reflective display device 1 according to Embodiment 2 provided with a black light-absorption layer 76 on the rear surface side of the display panel 2, for example, if the index of refraction of the medium 31 of the light modulation layer 30 is 1.5, then as shown in FIG. 19(*b*), the cell thickness is set such that an angle $\theta$ between the direction normal to the display panel surface and the direction normal to the flake surface is 42° or greater. As a result, the light reflected by the flakes is at least not emitted directly from the viewer side substrate, and thus, an appropriate black display can be performed.

(Fixing of Anisometric Members)

The anisometric members (flakes, for example) are not limited to a configuration in which they rotate freely within the medium of the light modulation layer, and a portion may be fixed to the display surface side substrate or the rear surface side substrate.

Figure 3:
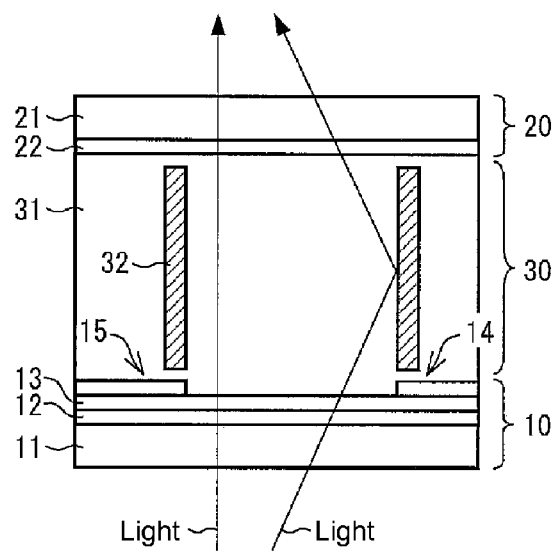
FIG. 3(a) is a cross-sectional view of a main portion of the display panel showing a state of light progression in FIG. 1(a)
FIG. 3(b) is a cross-sectional view of a main portion of the display panel showing a state of light progression in FIG. 1(b).
Figure 3:
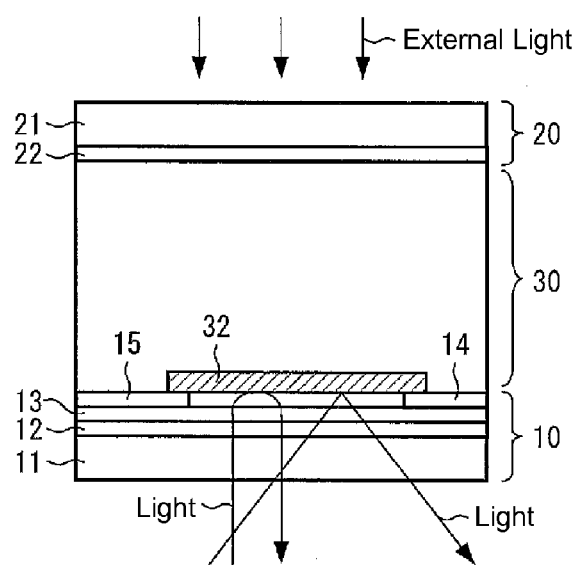
Figure 4:
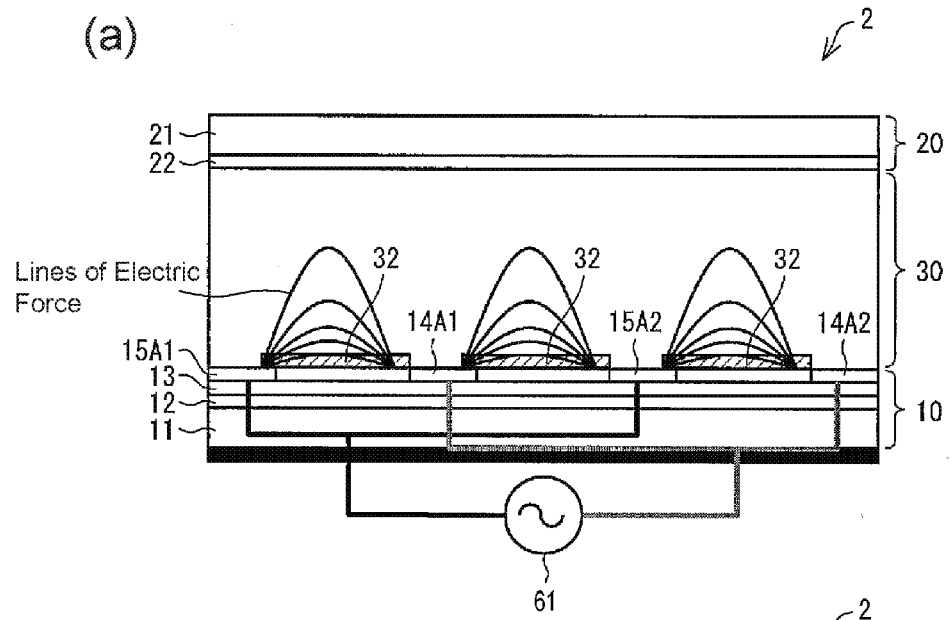
FIGS. 4(a) and 4(b) are cross-sectional views showing lines of electrical force formed between the interdigital electrodes shown in FIG. 1.
Figure 4:
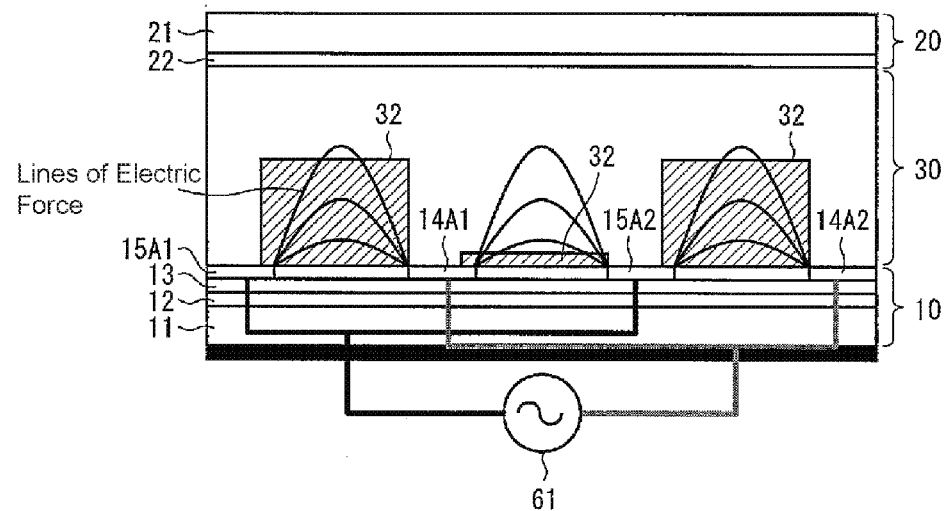
Figure 5:
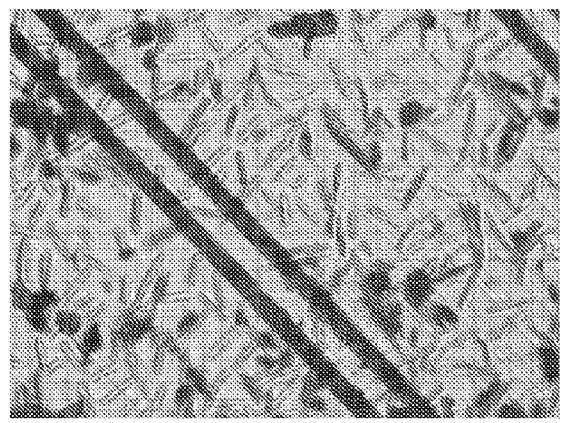
FIG. 5(a) is a drawing that shows a micrograph taken of a flake orientation state in a plan view when a voltage is applied between uniformly planar electrodes.
FIG. 5(b) is a drawing that shows a micrograph taken of a flake orientation state in a plan view when the voltage applied between interdigital electrodes is relatively low.
FIG. 5(c) is a micrograph taken of a flake orientation state in a plan view when the voltage applied between the interdigital electrodes is relatively high.
Figure 5:
Figure 5:
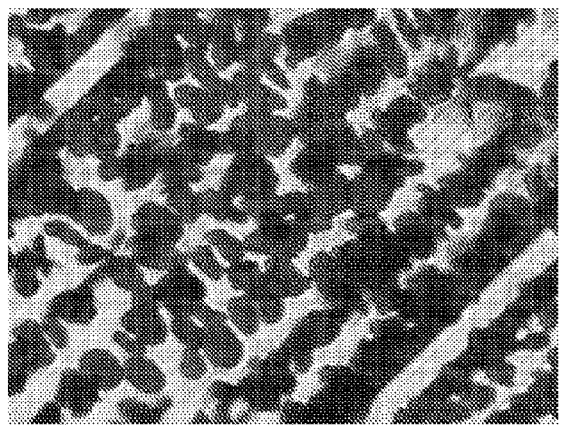
Figure 20:
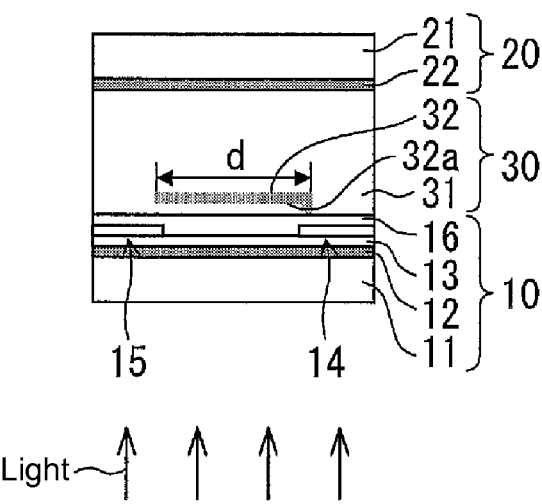
FIGS. 20(a) and 20(b) are cross-sectional views showing a schematic configuration in which the edges of the flakes are fixed to the substrate in the display panel shown in FIGS. 3(a) and 3(b).
Figure 20:
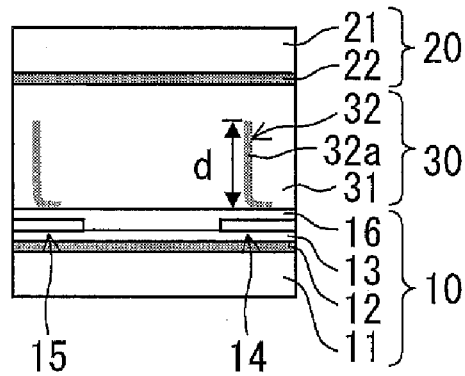

FIGS. 20(*a*) and 20(*b*) are cross-sectional views showing a schematic configuration in which an end of each flake is fixed to the substrate 10 in the display panel 2 shown in FIGS. 3(*a*) and 3(*b*).

An example of a method of manufacturing a display panel 2 in which a portion of each flake is fixed to the substrate 10 will be described here.

Figure 21:
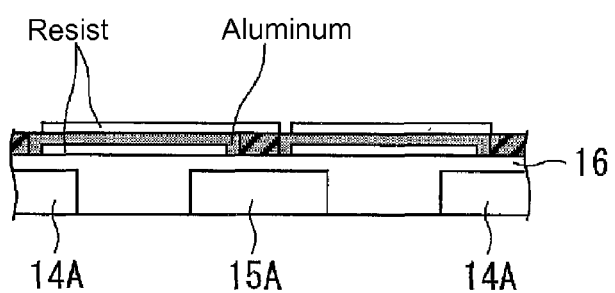
FIGS. 21(a) and 21(b) are cross-sectional views showing a method of manufacturing a display panel in which a portion of the flakes are fixed to the substrate.
Figure 21:
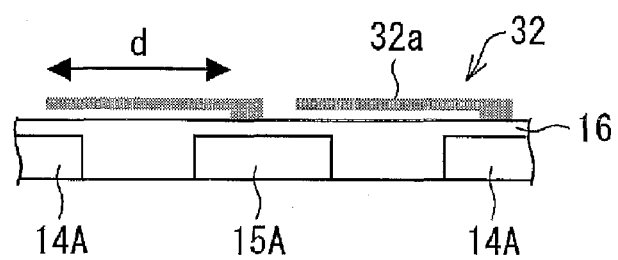

FIGS. 21(*a*) and 21(*b*) are cross-sectional views showing a method of manufacturing a display panel in which a portion of the flakes are fixed to the substrate.

First, as shown in FIG. 21(*a*), an insulating layer 16 is formed over the entire surface of the substrate 10 so as to cover the areas between adjacent branch electrodes 14A and 15A, and then, by CMP (chemical mechanical polishing) or the like, for example, the surface of the insulating layer 16 is planarized.

The insulating layer 16 may be an inorganic insulating film made of an inorganic material such as silicon nitride or silicon dioxide, or an organic insulating film made of an organic insulating material (resin material) such as an acrylic resin. There is no special limitation on the thickness of the insulating layer 16 as long as the interdigital electrodes 14 and 15 and the flakes can be insulated from each other so as not to conduct.

However, the greater the thickness of the insulating layer 16 is, the greater the thickness of the substrate 10 is, and thus, from the perspective of attaining a thinner display panel 2, it is preferable that the insulating layer 16 be just thick enough to ensure sufficient insulation between the interdigital electrodes 14 and 15 and the flakes.

Then, a first resist layer is formed as a patterned resist layer that is formed across adjacent branch electrodes 14A and 15A to an appropriate size depending on the size of the flakes.

Next, by vapor deposition or the like, an aluminum layer, for example, is formed over the insulating layer 16 to cover the first resist layer, and as shown in FIG. 21(*a*), a second resist layer is formed and patterned as a resist layer larger than the first resist layer by a portion required to fix the aluminum to the substrate.

Then, this composite layer is etched to remove the diagonal line portion of the aluminum in FIG. 21(*a*) by an etchant containing phosphoric acid, nitric acid, and acetic acid, for example.

Then, by removing the first and second resist layer using NMP (N-methylpyrrolidone), for example, aluminum bodies having a portion thereof fixed to the substrate 10 (specifically, the respective branch electrodes 14A and 15A of the interdigital electrodes 14 and 15) can be attained.

Then, by using a spacer (not shown) having a length greater than or equal to a length d of a moveable portion 32a of the flakes (anisometric members 32) shown in FIGS. 20(a), 20(b), and 21(b) to ensure enough of a gap between the substrate 10 and the substrate 20 facing the substrate 10 to ensure that the flakes can be in a vertical orientation, a display panel 2 (see FIGS. 2(a) and 2(b)) in which a portion of the flakes is fixed to the substrate 10 can be manufactured, the flakes being reversible oriented vertically and horizontally.

However, the present modification example is not limited thereto, and the size of the spacers (length, diameter) may be set to less than the length of the moveable portions 32a of the flakes (anisometric members 32). If the flakes are oriented diagonally during application of a vertical electric field as shown in FIG. 19(a), the size of the spacers and the length d of the moveable portions 32a need to be appropriately set such that the angle θ described above can be attained.

Like Embodiment 1, the display panel 2 can be put in a light-transmissive state by applying the vertical electric field from the uniformly planar electrodes 12 and 22 to the light modulation layer 30 and changing the shape of the flakes as shown in FIG. 20(b).

On the other hand, like Embodiment 1, the display panel 2 can be put in a light-blocking state by having the interdigital electrodes 14 and 15 apply a horizontal electric field to the light modulation layer 30 and having the flakes return to their original shape to stick to the substrate 10 as shown in FIG. 20(a).

As another configuration, a portion (one end) of the anisometric members 32 (flakes, for example) can be fixed by cord, wire, or the like, such that the flakes rotate around an axis with the fixed end being the center.

By fixing a portion of the anisometric members 32 (one end, for example) in this manner, compared to a state in which the anisometric members 32 are dispersed throughout the medium 31, it is possible to cover the display region of the substrate 10 more reliably with fewer anisometric members 32, and it is possible to attain an excellent light-blocking state or light-reflective state when the anisometric members 32 are put in a horizontal orientation.

In the present modification example, a case was described as an example in which, after forming the insulating layer 16 over the entire surface of the substrate 10, the surface of the insulating layer 16 is planarized, as shown in FIG. 21(a), but the planarization is not necessarily needed. If planarization is not performed, flakes having recesses and protrusions can be formed. In such a case, flakes having high light-scattering qualities can be formed.

(Bowl-Shaped Anisometric Members)

The anisometric members may include bowl-shaped flakes (having a surface with a recess and protrusions).

Figure 22:
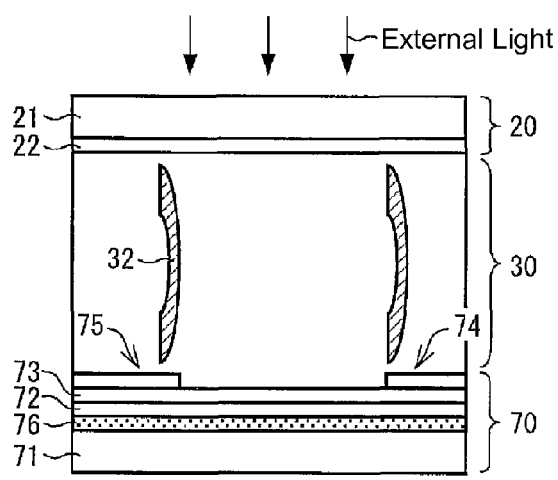
FIGS. 22(a) and 22(b) are cross-sectional views showing a schematic configuration in which bowl-shaped flakes are used in the display panel shown in FIGS. 8(a) and 8(b).
Figure 22:
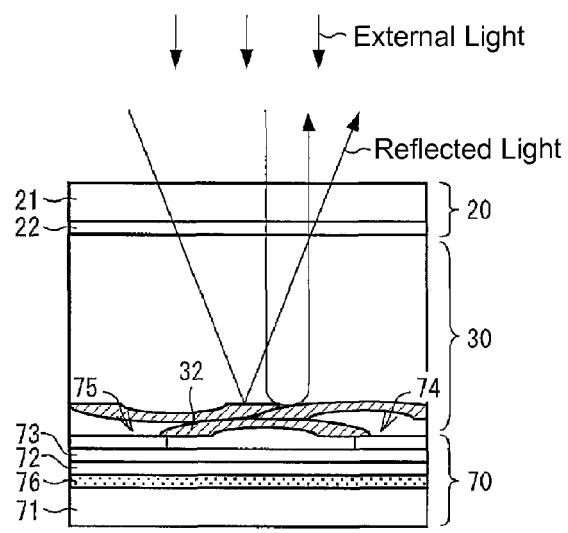
Figure 23:
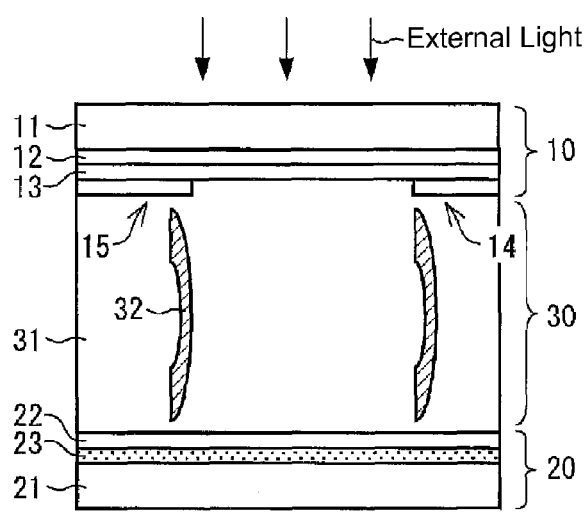
FIGS. 23(a) and 23(b) are cross-sectional views showing a schematic configuration in which bowl-shaped flakes are used in the display panel shown in FIGS. 10(a) and 10(b).
Figure 23:
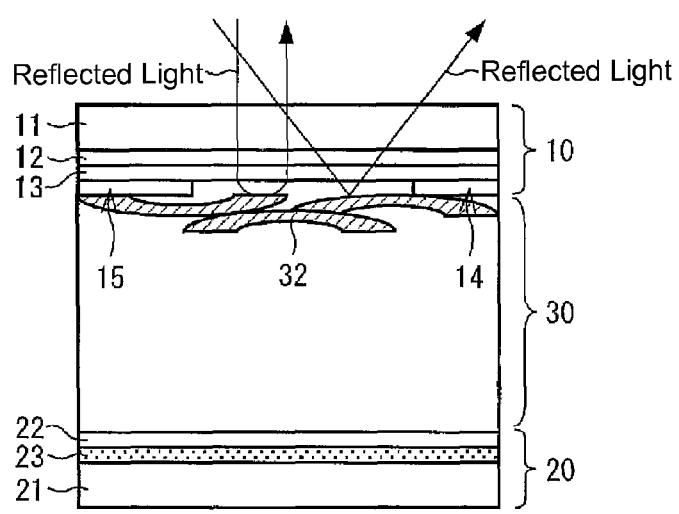

FIGS. 22(a) and 22(b) are cross-sectional views showing a schematic configuration of a case in which bowl-shaped flakes are used in the display panel 2 shown in FIGS. 8(a) and 8(b), and FIGS. 23(a) and 23(b) are cross-sectional views showing a schematic configuration of a case in which bowl-shaped flakes are used in the display panel 2 shown in FIGS. 10(a) and 10(b).

According to the configuration of FIGS. 22(a), 22(b), 23(a), and 23(b), it is possible to improve light-scattering qualities compared to a case in which flat flakes such as those shown in FIGS. 8(a), 8(b), 10(a), and 10(b) are used.

(Fiber-Shaped Anisometric Members)

The anisometric members may have a fiber shape.

Figure 24:
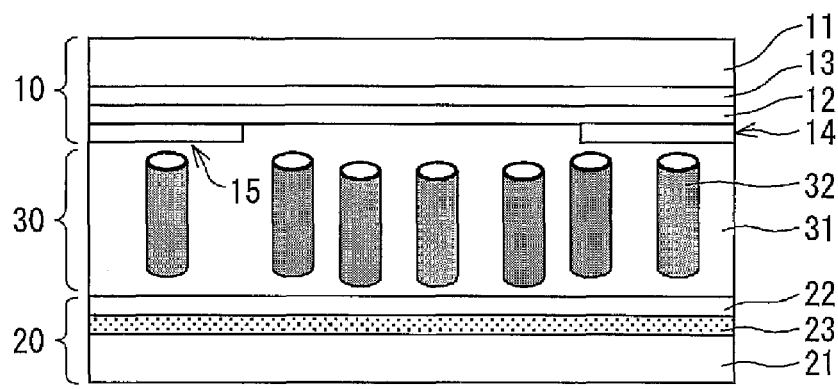
FIGS. 24(a) and 24(b) are cross-sectional views showing a schematic configuration in which fiber-shaped flakes are used in the display panel shown in FIGS. 10(a) and 10(b).
Figure 24:
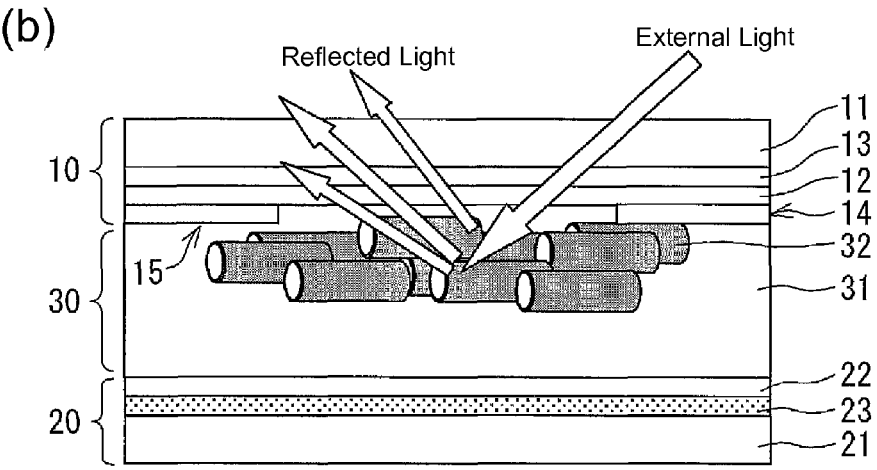

FIGS. 24(a) and 24(b) are cross-sectional views showing a schematic configuration in which fiber-shaped flakes are used in the display panel 2 shown in FIGS. 10(a) and 10(b).

Figure 25:
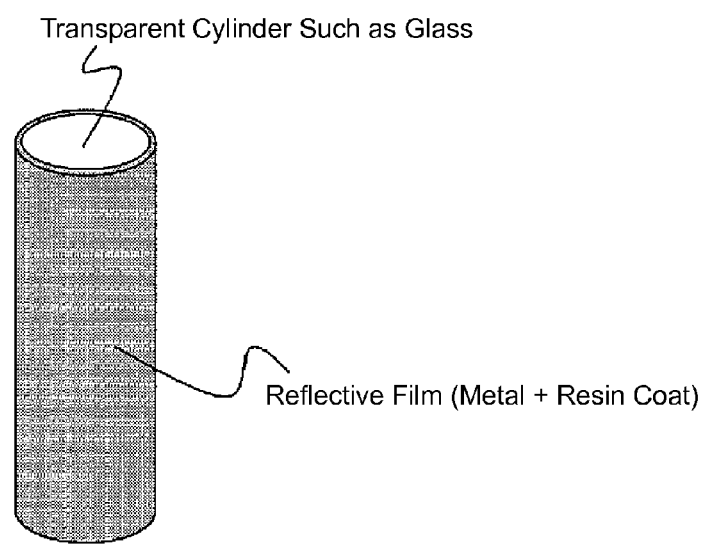
FIG. 25 is a perspective view of a schematic configuration of a anisometric member in which a reflective film is formed on a transparent cylindrical glass.

FIG. 25 is a perspective view of a schematic configuration of a anisometric member in which a reflective film is formed on a transparent cylindrical glass.

The fiber-shaped anisometric members (referred to as fibers) can be made by forming a reflective film (metal or metal and resin coat) formed on a transparent cylindrical glass, as shown in FIG. 25.

FIG. 24(a) shows a state in which a vertical electric field is applied to the light modulation layer 30 to orient the fibers in a vertical orientation, to perform reflective display (white display). During vertical orientation, external light is scattered and reflected by the reflective film on the fibers, thus displaying white.

FIG. 24(b) shows a state in which transmissive display (black display) is performed by putting the fibers in a horizontal orientation by applying a horizontal electric field to the light modulation layer 30. When in a horizontal orientation, the external light is reflected by the fibers, progresses towards the substrate 10, and is absorbed by the light-absorption layer 23, and thus, black is displayed.

(Voltage Applying Method)

The method of applying an electric field to the light modulation layer is not limited to switching the anisometric members between horizontal orientation and vertical orientation, and the anisometric members may be switched between vertical orientation and diagonal orientation or between horizontal orientation and diagonal orientation.

In other words, the degree to which the flakes are oriented can be controlled by the size of the voltage applied between the respective electrodes as described above, for example.

Also, by mixing together flakes of different sizes, for example, the angle of rotation of the respective flakes can differ depending on the size of the flakes.

Therefore, halftone display can be performed by controlling the light transmittance by adjusting the size of the voltage applied between the electrodes (or in other words, the size of the electric field applied to the light modulation layer) or the size, shape, and the like of the anisometric members.

(Diffusion Reflection Layer)

Figure 26:
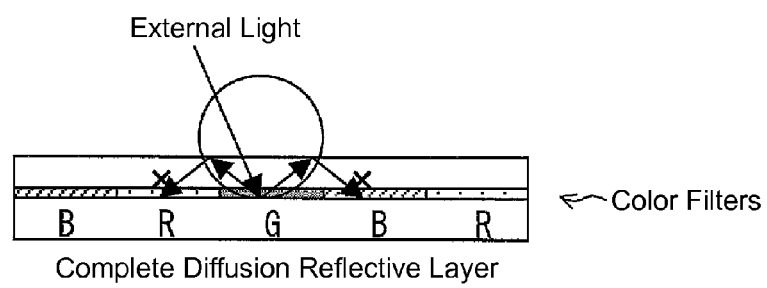
FIG. 26(a) shows a reflective state of light off of conventional color filters.
FIG. 26(b) shows a reflective state of light off of color filters of the present invention.
Figure 26:
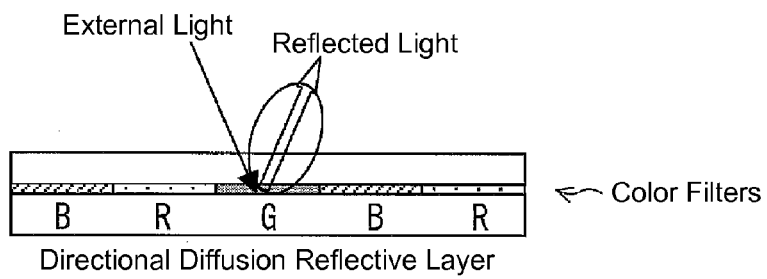

FIG. 26(a) shows a reflective state of light reflecting off of conventional color filters, and FIG. 26(b) shows a reflective state of light reflecting off of color filters of the present invention.

In the reflective display device of Embodiment 2, for example, depending on the size, shape, and flatness of the flakes and the concentration of flakes, the scattering qualities of reflected light can be controlled.

In a display in which white is displayed by scattering due to titanium oxide or the like, such as a microparticle electrophoretic display, the scattering is close to isotropic. By performing color display using color filters in such a scattering display, as shown in FIG. 26(a), light that is scattered and guided at a certain color pixel is absorbed by the color filter of another color pixel, resulting in a large loss of reflected light. By contrast, in the display device 1, as shown in FIG. 26(b), the scattering state can be made such that a uniform directivity is maintained, and thus, it is possible to perform color display of a high display quality using the color filters.

(Substrate)

Also, in the embodiments above, an example was described in which at least one of the display surface side substrate and the rear surface side substrate is an active matrix substrate. However, the configuration of the display panel 2 is not limited thereto.

Simply put, uniformly planar electrodes and interdigital electrodes made of a conductive electrode film such as ITO or an aluminum vapor-deposited layer may be formed on the entirety of both inner surfaces of the substrates that sandwich the driven layer, and the electrodes may be patterned such that segmented display or passive display is possible. As described above, at least one of the substrates may be an active matrix substrate such as a TFT substrate.

At least one of the pair of substrates facing each other across the light modulation layer has formed thereon interdigital electrodes over a uniformly planar electrode across an insulating film. These interdigital electrodes may be formed for each pixel, and can be controlled individually by switching elements such as TFTs.

(Applications)

In the embodiments above, display panels and display devices were the main examples described for the light modulation panel and the light modulation device, but the light modulation panel and the light modulation device is not limited to being used as a display panel and a display device, and it is possible to apply these to various applications such as light switches and illumination elements, for example, that require the changing of transmittance of light and the coloring of transmitted light using color filter elements described above.

Also, the light modulation panels of the respective embodiments above can be applied to switching panels for two-dimensional and three-dimensional display, for example. Specifically, a light modulation panel having the same configuration as the reflective display panel 2 in Embodiment 2, for example is disposed as a switching panel on the front surface of a normal liquid crystal display panel. In such a light modulation panel, flakes that are colored black are arranged in stripes, and during two-dimensional display, the flakes are put in a vertical orientation such that the image displayed on the entire surface of the liquid crystal display panel can be seen, whereas during three-dimensional display, the flakes are put in a horizontal orientation to form stripes such that a three-dimensional image can be seen by displaying a right-side image and a left-side image in the liquid crystal display panel. As a result, it is possible to realize a liquid crystal display device by which it is possible to switch between two-dimensional display and three-dimensional display. The configuration above can be applied to a liquid crystal display device that is multiview, including dual view.

Summary

As described above, the light modulation panel according to a first aspect of the present invention is a light modulation panel, including: a pair of substrates disposed opposite to each other; and a light modulation layer sandwiched between the pair of substrates, the light modulation layer including a medium and a plurality of anisometric members such that an area of the anisometric members projected through the anisometric members in a direction normal to the substrates changes, by rotation or deformation of the anisometric members, in response to a direction of an electric field, each of the pair of substrates including a uniformly planar electrode, at least one of the pair of substrates being provided with at least one comb electrode over the uniformly planar electrode across an insulating layer, the light modulation panel further including a circuit that changes the direction of the electric field applied to the light modulation layer.

The light modulation panel includes uniformly patterned electrodes that are even and that face each other, respectively on a pair of substrates that face each other, and thus, when a voltage is applied between these uniformly patterned electrodes, an even vertical electric field (that is, an even electric field in a direction perpendicular to the pair of substrates) is formed without areas where the electric field is weak like in Patent Document 1, and thus, there is no concentration of anisometric members in any one area.

Also, in the light modulation panel, at least one of the pair of substrates has formed thereon at least one interdigital electrode, and thus, as a result of the interdigital electrode, a horizontal electric field in a direction parallel to the pair of substrates can be formed. Thus, a simple configuration can be attained without the need for spacers having a very complex structure to provided electrodes for applying a horizontal electric field as in Patent Document 2.

If electrodes for applying a horizontal electric field are provided on spacers as in Patent Document 2, then as described previously, it is impossible to control the orientation of the flakes in three dimensions, whereas if a horizontal electric field is applied using interdigital electrodes as described above, then the anisometric members take on an electrically stable orientation. Thus, according to the configuration above, it is possible to orient the anisometric members in three dimensions.

Therefore, according to the configuration above, it is possible to provide a light modulation panel having a simple structure, by which it is possible to attain high contrast and a high rate of light usage.

In the first aspect, it is preferable that, in the light modulation panel according to a second aspect of the present invention, the circuit that changes the direction of the applied electric field include a selection circuit that selects electrodes, among the electrodes provided on the pair of substrates, to which voltage is to be applied.

In the second aspect, it is preferable that, in the light modulation panel according to a third aspect of the present invention, a plurality of the comb electrodes be provided on at least one of the pair of substrates, and that the selection circuit select electrodes to which voltage is applied such that voltage is applied to one set of electrodes that includes either the uniformly planar electrodes provided on the pair of substrates, or between the comb electrode and the uniformly planar electrode provided on the same substrate as each other among the pair of substrates.

According to the configurations above, by selecting the electrodes, among the electrodes provided on the pair of substrates, to which voltage is to be applied, it is possible to change the electric field applied to the light modulation layer with ease.

In the third aspect, it is preferable that, in the light modulation panel according to a fourth aspect of the present invention, the anisometric members have a charge, that the selection circuit select electrodes to which alternating current voltage is applied such that alternating current voltage is applied to one set of electrodes that includes either the uniformly planar electrodes provided on the pair of substrates, or between the comb electrode and the uniformly planar electrode provided on the same substrate as each other among the pair of substrates, that the light modulation panel further include a direct current voltage application unit that applies a direct current voltage between the uniformly planar electrodes provided on the pair of substrates such that a direct current voltage of a polarity opposite to the charge in the anisometric members is applied to the uniformly planar electrode on one of the pair of substrates to which the anisometric members stick when the anisometric members are oriented in a direction parallel to surfaces of the pair of substrates, and that the anisometric members stick to either one of the pair of substrates when the anisometric members are oriented in the direction parallel to the surfaces of the pair of substrates.

According to this configuration, when putting the anisometric members in a horizontal orientation, it is possible to efficiently cause the anisometric members to stick to either of the pair of substrates regardless of the type of anisometric members.

In the second aspect, it is preferable that, in the light modulation panel according to a fifth aspect of the present invention, the selection circuit select electrodes to which voltage is applied such that voltage is applied to one set of electrodes that includes either the uniformly planar electrodes provided on the pair of substrates, or between the comb electrode and the uniformly planar electrode provided on the same substrate as each other among the pair of substrates.

Even in such a case, by selecting the electrodes, among the electrodes provided on the pair of substrates, to which voltage is to be applied, it is possible to change the electric field applied to the light modulation layer with ease.

Also, in this case, when applying a vertical electric field to the light modulation layer (when orienting the anisometric members vertically when a vertical electric field causes the anisometric members to be vertically oriented and a horizontal electric field causes the anisometric members to be oriented horizontally, for example) it is possible to apply a generally consistent voltage, and when applying a horizontal electric field to the light modulation layer (when orienting the anisometric members horizontally when a vertical electric field causes the anisometric members to be vertically oriented and a horizontal electric field causes the anisometric members to be oriented horizontally, for example), it is possible to attain a simple configuration for the selection circuit for selectively switching the respective electrodes.

In the first aspect, it is preferable that, in the light modulation panel according to a sixth aspect of the present invention, a plurality of the comb electrodes be provided on at least one of the pair of substrates, that an electric field formed between one set of electrodes that includes either the uniformly planar electrodes provided respectively on the pair of substrates or the comb electrodes provided on the same substrate as each other among the pair of substrates be constantly applied to the light modulation layer during driving of the light modulation layer (that is, when voltage is applied to the light modulation panel, or in other words, when the light modulation panel is powered ON), and that the circuit that changes the direction of the applied electric field include a voltage application circuit that, when the direction of the electric field applied to the light modulation layer is to change, selectively applies a voltage to form an electric field between another set of electrodes stronger than the electric field formed between the one set of electrodes.

According to the configurations above, it is possible to selectively apply between the other set of electrodes an electric field stronger than the electric field applied between the one set of electrodes by the voltage application circuit, and thus, it is possible to change with ease the direction of the electric field applied to the light modulation layer.

Also, in this case, the orientation of the anisometric members is determined by the balance in strength between the vertical electric field and the horizontal electric field. Therefore, by adjusting (controlling) the size of the voltage applied between the other set of electrodes, it is possible to perform halftone display with ease.

In the first to sixth aspects, it is preferable that, in the light modulation panel according to a seventh aspect of the present invention, the light modulation panel be a display panel.

According to this configuration, it is possible to change the transmittance of light by changing the direction of the electric field applied to the light modulation layer. Also, compared to a liquid crystal display device, it is possible to have a higher rate of light usage due to the polarizing plates, required for liquid crystal display panels, not being needed. Therefore, it is possible to attain a display panel having a high rate of light usage with a simple configuration.

In the seventh aspect, it is preferable that, in the light modulation panel according to an eighth aspect of the present invention, the anisometric members be made of a reflective material.

In this case, light entering the light modulation layer directly passes through the light modulation layer when the anisometric members are in a vertical orientation (when a vertical electric field is being applied in a case in which a vertical electric field causes the anisometric members to be oriented vertically and a horizontal electric field causes the anisometric members to be oriented horizontally, for example), or reflect off of the reflective surfaces of the anisometric member oriented diagonally with respect to the surfaces of the pair of substrates, and then pass through the light modulation layer towards the substrate in the direction opposite the direction of incidence of the light. Therefore, the light passing through the light modulation layer is either absorbed or passes through the substrate in accordance with the substrate in the direction opposite to the direction of incidence of the light, and thus, transmissive display is performed.

On this other hand, when the anisometric members are in a horizontal orientation (when a horizontal electric field is applied in a case in which a vertical electric field causes the anisometric members to be oriented vertically and a horizontal electric field causes the anisometric members to be oriented horizontally, for example), due to the anisometric members being in a horizontal orientation parallel to the substrates, the light that has entered the light modulation layer is reflected by the reflective surface of anisometric members. As a result, if light enters the light modulation layer from the side opposite to the viewer side, then this light is blocked, and if the light enters from the viewer side, reflective display is performed. The reflective material can be metal, for example.

In the eighth aspect, it is preferable that, in the light modulation panel according to a ninth aspect of the present invention, a thickness of the light modulation layer be set so as to be less than a length of long axes of the anisometric members, and such that, when the anisometric members are oriented at an incline at a maximum angle with respect to the pair of substrates, light reflected by the anisometric members does not directly travel towards a display surface side.

As a result, it is possible to attain a thin light modulation layer, and thus, it is possible to attain a thin light modulation panel. Additionally, it is possible to control the movement of the anisometric members by applying a voltage, and thus, it is possible to attain faster driving.

In the eighth or ninth aspect, in the light modulation panel according to a tenth aspect of the present invention, a colored layer may be formed on a substrate, among the pair of substrates, disposed opposite to the display surface side.

As a result, when the anisometric members are oriented in parallel with the pair of the substrates (horizontal orientation), the reflective color of the anisometric members is perceived, and when the anisometric members are oriented in a direction perpendicular (normal) to the pair of substrates (vertical orientation), then the colored layer is perceived.

In the eighth or ninth aspect, in the light modulation panel according to an eleventh aspect of the present invention, the pair of substrates may be transparent substrates, see-through display being performed by orienting the anisometric members in a direction perpendicular to the surfaces of the pair of substrates.

In this case, it is possible to attain a see-through display panel in which, when the anisometric members are oriented in parallel with the pair of substrates (horizontal orientation), the reflective color of the anisometric members or black is perceived, and when the anisometric members are oriented in a direction perpendicular (normal) to the pair of substrates (vertical orientation), the area opposite to where the viewer is located can be perceived. Such a display panel is suitable for display windows, for example.

In the eighth to eleventh aspects, it is preferable that, in the light modulation panel according to a twelfth aspect of the present invention, the pair of substrates respectively include the comb electrodes over the uniformly planar electrodes across the insulating layers.

According to this configuration, when the anisometric members are to be put in a horizontal orientation, by switching the set of electrodes to which voltage is applied to between the interdigital electrodes provided on one of the pair of substrates and between the interdigital electrodes provided on the other substrate, the anisometric members can be switched between sticking to the one substrate or the other substrate. As a result, it is possible to change the characteristics of light emitted from the substrate.

If the anisometric members are oriented along the substrate opposite to that facing the viewer (in other words, the rear substrate), then the viewer can see anisometric members piling up, and thus, recesses and protrusions are formed by the plurality of anisometric members, thus allowing a highly light-scattering display to be attained.

On the other hand, when the anisometric members are oriented along the substrate on the viewer side, the reflective surface of the anisometric members are seen by the user as a single plane (planar reflective surface). Thus a highly mirrored display (mirror reflection) can be attained.

In the eighth to twelfth aspects, in the light modulation panel according to a thirteenth aspect of the present invention, the anisometric members may be colored.

As a result, when the anisometric member are oriented in parallel to the pair of substrates (horizontal orientation), colored display can be performed using the anisometric members.

In the first to eighth aspects, it is preferable that, in the light modulation panel according to a fourteenth aspect of the present invention, the light modulation layer function as a color filter, and that the plurality of anisometric members be made of a transparent resin, and include at least red anisometric members, green anisometric members, and blue anisometric members.

As a result, color display can be performed. According to this configuration, the light modulation panel can be used on its own as a color filter element, or in a color filter element-integrated display panel.

In the first to fourteenth aspects, it is preferable that, in the light modulation panel according to a fifteenth aspect of the present invention, the anisometric members be oriented in a direction perpendicular to the surfaces of the pair of substrates when a voltage is applied between the uniformly planar electrodes provided on the pair of substrates, and that the anisometric members be oriented in a direction parallel to the surfaces of the pair of substrates when a voltage is applied between electrodes provided on the same substrate among the pair of substrates.

In this case, when a vertical electric field is formed, no areas where the electric field is weak as in Patent Document 1 are formed, and thus, it is possible to put the anisometric members in a vertical orientation without the anisometric members concentrating in any one area. In other words, in this case, the anisometric members do not concentrate in any one area, and thus, light passes through.

Also, in the light modulation panel, as described above, at least one of the pair of substrates has formed thereon at least one interdigital electrode, and thus, as a result of the interdigital electrode, a horizontal electric field in a direction parallel to the pair of substrates can be formed, and thus, the long axes of the anisometric members can be put in a horizontal orientation to be parallel to the pair of substrates.

If electrodes for applying a horizontal electric field are provided on spacers as in Patent Document 2, then as described previously, it is impossible to control the orientation of the flakes in three dimensions, whereas if a horizontal electric field is applied using interdigital electrodes as described above, then the anisometric members take on an electrically stable orientation, as a result, are put in a horizontal orientation. Thus, according to the configuration above, it is possible to control the orientation of the anisometric members in three dimensions, and it is possible to control the orientation of the anisometric members such that the main surfaces of the anisometric members are parallel to the pair of substrates.

Therefore, according to the configuration above, it is possible to provide a light modulation panel having a simple structure, by which it is possible to attain high contrast and a high rate of light usage.

In the fifteenth aspect, it is preferable that, in the light modulation panel according to a sixteenth aspect of the present invention, the shape-anisotropic members be made of a metal, a semiconductor, a dielectric material, a dielectric multilayer film, or a cholesteric resin.

According to the configuration above, as described above, the anisometric members are in a vertical orientation in a vertical electric field and in a horizontal orientation in a horizontal electric field.

In the first to twelfth aspects, it is preferable that, in the light modulation panel according to a seventeenth aspect of the present invention, the anisometric members be oriented in a direction parallel to the surfaces of the pair of substrates when a voltage is applied between the uniformly planar electrodes provided on the pair of substrates, and that the anisometric members be oriented in a direction perpendicular to the surfaces of the pair of substrates when a voltage is applied between electrodes provided on the same substrate among the pair of substrates.

In this case, no areas where the electric field is weak as in Patent Document 1 are formed, and thus, it is possible to put the anisometric members in a horizontal orientation without the anisometric members concentrating in any one area. In other words, in this case, when forming a vertical electric field, the anisometric members do not concentration in any one area, and thus, light leakage does not occur.

Also, in the light modulation panel, as described above, at least one of the pair of substrates has formed thereon at least one interdigital electrode, and thus, as a result of the interdigital electrode, a horizontal electric field in a direction parallel to the pair of substrates can be formed, and thus, the long axes of the anisometric members can be put in a vertical orientation to be perpendicular to the pair of substrates.

If electrodes for applying a horizontal electric field are provided on spacers as in Patent Document 2, then as described previously, it is impossible to control the orientation of the flakes in three dimensions, whereas if a horizontal electric field is applied using interdigital electrodes as described above, then the anisometric members take on an electrically stable orientation, as a result, are put in a vertical orientation. Thus, according to the configuration above, it is possible to control the orientation of the anisometric members in three dimensions, and it is possible to control the orientation of the anisometric members such that the main surfaces of the anisometric members are perpendicular to the pair of substrates.

Therefore, according to the configuration above, it is possible to provide a light modulation panel having a simple structure, by which it is possible to attain high contrast and a high rate of light usage.

Also, Patent Document 1, besides having the problem that the plate-shaped particles concentrate in certain areas when a vertical electric field is formed as described previously, additionally has a problem that when the plate-shaped particles are oriented such that the long axes thereof are parallel to the pair of substrates, there is a risk of light leakage occurring and contrast decreasing.

However, according to the configuration above, not only is it possible to prevent the concentration of anisometric members in any one area when the vertical electric field is formed, but it is also possible to prevent a decrease in contrast because light leakage does not occur during horizontal orientation of the anisometric members.

In the seventeenth aspect, it is preferable that, in the light modulation panel according to an eighteenth aspect of the present invention, the anisometric members be made only of metal.

By forming the anisometric members of only metal, as described above, the anisometric members can be put in a horizontal orientation in a vertical electric field and in a vertical orientation in a horizontal electric field.

As a result of the anisometric members being made only of metal, there is no light interference resulting from dielectric material or the like, for example. Thus, light does not change in color tone depending on the orientation of the anisometric members, and therefore, viewing angle characteristics are improved. Also, there is no light absorption due to the dielectric material or the like, and thus, reflectance is improved. Furthermore, by forming the anisometric members only of metal, there is no light leakage through the dielectric material or the like when the anisometric members are in a horizontal orientation parallel to the substrates. This improves contrast.

In the first to eighteenth aspects, it is preferable that, in the light modulation panel according to a nineteenth aspect of the present invention, a portion of each of the anisometric members be fixed to a surface of at least one of the pair of substrates facing another of the substrates.

In this manner, by having a portion of each anisometric member fixed to the substrate, compared to a case in which the anisometric members are dispersed throughout the medium, it is possible to attain an excellent light-blocking state or light-reflective state with a smaller amount of anisometric members during horizontal orientation of the anisometric members.

In the first to nineteenth aspects, it is preferable that, in the light modulation panel according to a seventeenth aspect of the present invention, the anisometric members have a flake shape, a columnar shape, or an ellipsoid shape.

In the first to twentieth aspects, in the light modulation panel according to a twenty-first aspect of the present invention, the anisometric members can be formed in a flake shape that has a surface having recesses and protrusions.

As a result, highly light-scattering display can be attained.

It is preferable that a light modulation device of a twenty-second aspect of the present invention include the light modulation panel according to any one of the first to twenty-first aspects.

As a result, it is possible to provide a light modulation device with a simple structure, high contrast, and a high rate of light usage.

In the twenty-second aspect, the light modulation device of a twenty-third aspect may be a transflective display device that further includes a backlight that radiates light to the light modulation panel, in which a reflective display mode that performs display by reflecting external light and a transmissive display mode that performs display by transmitting light from the backlight are included,
in which display is performed by switching between the reflective display mode and the transmissive display mode, in which, in the reflective display mode, display is performed by the external light being reflected by the shape-anisotropic members, and in which, in the transmissive display mode, display is performed by the light from the backlight passing through the light modulation layer.

The present invention is not limited to the embodiments described above, and various modifications can be made without departing from the scope of the claims. Therefore, embodiments obtained by appropriately combining the techniques disclosed in different embodiments are included in the technical scope of the present invention.

INDUSTRIAL APPLICABILITY

The present invention can be used in various applications that require light transmittance to be changed or that require the coloring of transmitted light, such as display panels, display devices, light switches, illumination elements, and color filters used in displays for televisions and the like.

DESCRIPTION OF REFERENCE CHARACTERS 1 display device
2 display panel
3 backlight
4 information display light modulation layer
10, 20, 70, 110, 120, 130, 170 substrate
11, 21, 71, 111, 121, 131, 171 insulating substrate
12, 22, 72, 112, 122, 123, 132, 172 uniformly planar electrode
13, 73, 113, 133, 173 insulating layer
14, 15, 74, 75, 114, 115, 134, 135, 174, 175 interdigital electrode
14A, 15A, 74A, 75A, 114A, 115A, 174A branch electrode
14B, 15B, 74B, 75B, 114B, 115B, 174B trunk electrode
14L, 15L, 74L, 75L, 114L, 115L, 174L electrode portion
14S, 15S, 74S, 75S, 114S, 115S, 174S gap portion
16 insulating layer
23, 76 light-absorption layer
30 light modulation layer
31, 141 medium
32, 142 anisometric member
32a moveable portion
41, 51, 80, 90, 151, 152, 181 relay circuit (electric field application direction changing circuit)
42-44, 52-54, 62, 153-158, 182-184, 193-196, 223-226 wiring line (electric field application direction changing circuit)

233, 243 wiring line (current application unit)
211, 212, 227, 228 wiring line
61, 161 power source circuit (electric field application direction changing circuit)
232, 242 power source circuit (direct current application unit)
81 first relay circuit portion (electric field application direction changing circuit)
82 second relay circuit portion (electric field application direction changing circuit)
83-86, 93-96 wiring line (electric field application direction changing circuit)
91 third relay circuit portion (electric field application direction changing circuit)
92 fourth relay circuit portion (electric field application direction changing circuit)
140 color filter layer (light modulation layer)
143 rib
161, 201, 202 power source circuit (electric field application direction changing circuit)
191, 192, 221, 222 switching circuit (electric field application direction changing circuit)
232, 242 switching circuit (direct current application unit)

What is claimed is:

1. A light modulation panel, comprising: a pair of substrates disposed opposite to each other; and a light modulation layer sandwiched between the pair of substrates,
wherein the light modulation layer includes a medium and a plurality of anisometric members such that an area of the anisometric members projected through the anisometric members in a direction normal to the substrates changes, by rotation or deformation of the anisometric members, in response to a direction of an electric field,
wherein each of the pair of substrates includes a uniformly planar electrode,
wherein at least one of the pair of substrates is provided with at least one comb electrode over the uniformly planar electrode across an insulating layer, and
wherein the light modulation panel further comprises a circuit that changes the direction of the electric field applied to the light modulation layer.

2. The light modulation panel according to claim 1, wherein the circuit that changes the direction of the applied electric field includes a selection circuit that selects electrodes, among the electrodes provided on the pair of substrates, to which voltage is to be applied.

3. The light modulation panel according to claim 2,
wherein a plurality of the comb electrodes are provided on at least one of the pair of substrates, and
wherein the selection circuit selects electrodes to which voltage is applied such that voltage is applied between one set of electrodes that includes either the uniformly planar electrodes provided on the pair of substrates, or the comb electrodes provided on the same substrate among the pair of substrates.

4. The light modulation panel according to claim 3,
wherein the anisometric members have a charge,
wherein the selection circuit selects electrodes to which alternating current voltage is applied such that the alternating current voltage is applied between one set of electrodes that includes either the uniformly planar electrodes provided on the pair of substrates, or the comb electrodes provided on the same substrate as each other among the pair of substrates,
wherein the light modulation panel further comprises a direct current voltage application unit that applies a direct current voltage between the uniformly planar electrodes provided on the pair of substrates such that a direct current voltage of a polarity opposite to the charge in the anisometric members is applied to the uniformly planar electrode on one of the pair of substrates to which the anisometric members stick when the anisometric members are oriented in a direction parallel to surfaces of the pair of substrates, and
wherein the anisometric members stick to either one of the pair of substrates when the anisometric members are oriented in the direction parallel to the surfaces of the pair of substrates.

5. The light modulation panel according to claim 2, wherein the selection circuit selects electrodes to which voltage is applied such that voltage is applied to one set of electrodes that includes either the uniformly planar electrodes provided on the pair of substrates, or between the comb electrode and the uniformly planar electrode provided on the same substrate as each other among the pair of substrates.

6. The light modulation panel according to claim 1,
wherein a plurality of the comb electrodes are provided on at least one of the pair of substrates,
wherein either an electric field formed between one set of electrodes that includes either the uniformly planar electrodes provided respectively on the pair of substrates or the comb electrodes provided on the same substrate as each other among the pair of substrates is constantly applied to the light modulation layer during driving of the light modulation layer, and
wherein the circuit that changes the direction of the applied electric field includes a voltage application circuit that, when the direction of the electric field applied to the light modulation layer is to change, selectively applies a voltage to form an electric field between another set of electrodes stronger than the electric field formed between the one set of electrodes.

7. The light modulation panel according to claim 1, wherein said light modulation panel is a display panel.

8. The light modulation panel according to claim 7, wherein the anisometric members are made of a reflective material.

9. The light modulation panel according to claim 8, wherein a thickness of the light modulation layer is set so as to be less than a length of long axes of the anisometric members, and such that, when the anisometric members are oriented at an incline at a maximum angle with respect to the pair of substrates, light reflected by the anisometric members does not directly travel towards a display surface side.

10. The light modulation panel according to claim 8, wherein a colored layer is formed on a substrate, among the pair of substrates, disposed opposite to the display surface side.

11. The light modulation panel according to claim 9, wherein the pair of substrates are transparent substrates, and see-through display is performed by orienting the anisometric members in a direction perpendicular to the surfaces of the pair of substrates.

12. The light modulation panel according to claim 8, wherein the pair of substrates respectively include the comb electrodes over the uniformly planar electrodes across the insulating layers.

13. The light modulation panel according to claim 8, wherein the anisometric members are colored.

14. The light modulation panel according to claim 1,
wherein the light modulation layer functions as a color filter, and wherein the plurality of anisometric members are made of a transparent resin, and include at least red anisometric members, green anisometric members, and blue anisometric members.

15. The light modulation panel according to claim 1, wherein the anisometric members are oriented in a direction perpendicular to surfaces of the pair of substrates when a voltage is applied between the uniformly planar electrodes provided on the pair of substrates, and the anisometric members are oriented in a direction parallel to the surfaces of the pair of substrates when a voltage is applied between electrodes provided on the same substrate among the pair of substrates.

16. The light modulation panel according to claim 1, wherein the anisometric members are oriented in a direction parallel surfaces of the pair of substrates when a voltage is applied between the uniformly planar electrodes provided on the pair of substrates, and the anisometric members are oriented in a direction perpendicular to the surfaces of the pair of substrates when a voltage is applied between electrodes provided on the same substrate among the pair of substrates.

17. The light modulation panel according to claim 16, wherein the anisometric members are made only of metal.

18. The light modulation panel according to claim 1, wherein a portion of each of the anisometric members is fixed to a surface of at least one of the pair of substrates facing another of the substrates.

19. A light modulation device, comprising the light modulation panel according to claim 1.

* * * * *